(12) United States Patent
Nothum, Jr.

(10) Patent No.: US 12,097,526 B2
(45) Date of Patent: Sep. 24, 2024

(54) WORK-SAVING IMPROVEMENTS FOR FOOD-PROCESS LINES

(71) Applicant: Robert G. Nothum, Jr., Willard, MO (US)

(72) Inventor: Robert G. Nothum, Jr., Willard, MO (US)

(*) Notice: Subject to any disclaimer, the term of this patent is extended or adjusted under 35 U.S.C. 154(b) by 107 days.

(21) Appl. No.: 17/725,834

(22) Filed: Apr. 21, 2022

(65) Prior Publication Data

US 2022/0258199 A1   Aug. 18, 2022

Related U.S. Application Data

(63) Continuation of application No. 17/146,637, filed on Jan. 12, 2021, now abandoned, which is a continuation-in-part of application No. 16/911,866, filed on Jun. 25, 2020, now Pat. No. 11,432,579, and a continuation-in-part of application No. 16/910,568, filed on Jun. 24, 2020, now abandoned, and a continuation-in-part of application No. 15/940,003,
(Continued)

(51) Int. Cl.
| | |
|---|---|
| *B05C 11/10* | (2006.01) |
| *A23P 20/12* | (2016.01) |
| *A23P 20/17* | (2016.01) |
| *A23G 1/54* | (2006.01) |
| *A23G 3/34* | (2006.01) |

(52) U.S. Cl.
CPC .......... *B05C 11/1015* (2013.01); *A23P 20/12* (2016.08); *A23P 20/17* (2016.08); *B05C 11/1034* (2013.01); *A23G 1/54* (2013.01); *A23G 3/0027* (2013.01)

(58) Field of Classification Search
CPC . B65G 21/08; B65G 2201/0202; A23P 20/12; A23P 20/13; A23P 20/17; A23G 1/54; A23G 3/0027; A23G 3/26; A23G 3/2076; A01N 59/16; A01N 2300/00; A01N 25/34; A61L 2/232; A23L 13/03; A01J 27/00; A01J 25/12; A22C 18/00
USPC .................. 99/352–356, 407–409, 485, 494
See application file for complete search history.

(56) References Cited

U.S. PATENT DOCUMENTS

| | | | |
|---|---|---|---|
| 1,462,883 A * | 7/1923 | Cloud ................. | A23G 3/2076 426/293 |
| 3,689,958 A | 9/1972 | Dillon ................. | A22C 21/0007 |

(Continued)

FOREIGN PATENT DOCUMENTS

| | | | | |
|---|---|---|---|---|
| DE | 10 2004 062 137 | 2/2006 | ............. | A23G 3/20 |
| DE | 20 2009 016 645 | 5/2011 | ............. | B65G 47/08 |

(Continued)

*Primary Examiner* — Sarang Afzali
*Assistant Examiner* — Darrell C Ford
(74) *Attorney, Agent, or Firm* — Jonathan A. Bay

(57) ABSTRACT

Work-saving improvements for food-process lines include (1) mounting alternate machines of a food process line on pivot hardware to speed up washing and maintenance operations, (2) mounting the machines on rolling riding gear in order to speed up the activities of building and re-building food process lines of a different series of machines, or (3) isolate the food process line in its own tunnel and hence its own climate-controlled atmosphere to reduce conflicts with running two food process lines side by side where one food process line is a source of air borne allergens.

11 Claims, 76 Drawing Sheets

Related U.S. Application Data filed on Mar. 29, 2018, now Pat. No. 10,889,444, said application No. 16/911,866 is a continuation-in-part of application No. 15/940,003, filed on Mar. 29, 2018, now Pat. No. 10,889,444, said application No. 16/910,568 is a continuation-in-part of application No. 15/940,003, filed on Mar. 29, 2018, now Pat. No. 10,889,444.

(60) Provisional application No. 63/049,794, filed on Jul. 9, 2020, provisional application No. 63/017,208, filed on Apr. 29, 2020, provisional application No. 63/013,020, filed on Apr. 21, 2020, provisional application No. 62/866,124, filed on Jun. 25, 2019, provisional application No. 62/866,121, filed on Jun. 25, 2019, provisional application No. 62/648,613, filed on Mar. 27, 2018, provisional application No. 62/577,375, filed on Oct. 26, 2017, provisional application No. 62/560,392, filed on Sep. 19, 2017, provisional application No. 62/545,634, filed on Aug. 15, 2017, provisional application No. 62/478,822, filed on Mar. 30, 2017.

(56) References Cited

U.S. PATENT DOCUMENTS

| | | | | |
|---|---|---|---|---|
| 4,132,156 | A | 1/1979 | Glaze, Jr. | B31B 50/00 |
| 4,264,634 | A | 4/1981 | Hochandel | A23P 20/12 |
| 4,281,757 | A | 8/1981 | Morton | B65B 35/246 |
| 4,478,140 | A | 10/1984 | Bullock | A47J 37/1214 |
| 4,538,510 | A | 9/1985 | Latimer | B65G 17/08 |
| 4,604,704 | A | 8/1986 | Eaves | G06Q 10/08 |
| 4,852,475 | A | 8/1989 | Yang | A47J 37/1214 |
| 4,936,489 | A | 6/1990 | Blain | A21C 15/002 |
| 4,966,072 | A | 10/1990 | Ellis-Brown | A21B 1/48 |
| 5,129,353 | A | 7/1992 | Koppens | A21C 9/04 |
| 5,172,636 | A | 12/1992 | Theurer | E01B 27/10 |
| 5,546,848 | A | 8/1996 | Naramura | A21C 9/04 |
| 5,664,484 | A * | 9/1997 | Milohanic | A47J 37/044 |
| | | | | 99/407 |
| 5,741,536 | A | 4/1998 | Mauer | A23B 4/0056 |
| 5,846,046 | A | 12/1998 | Warburton | A01D 90/08 |
| 5,847,273 | A | 12/1998 | Zubragel | G01F 13/003 |
| 5,881,639 | A | 3/1999 | Nesheim | A01J 25/12 |
| 6,006,657 | A | 12/1999 | Ikuta | G07F 9/105 |
| 6,588,363 | B1 * | 7/2003 | Burke | A23P 20/18 |
| | | | | 118/308 |
| 6,902,089 | B2 | 6/2005 | Carnevali | B60R 7/14 |
| 7,174,846 | B2 | 2/2007 | Zeegers | A23P 20/12 |
| 7,748,313 | B2 | 7/2010 | Tyndall | A47J 37/044 |
| 7,954,446 | B2 | 6/2011 | Nakane | B05B 12/18 |
| 8,096,259 | B1 | 1/2012 | Nothum, Jr. | A23P 20/12 |
| 8,651,015 | B2 | 2/2014 | Zhu | A23L 3/32 |
| 8,678,886 | B1 | 3/2014 | Nothum, Jr. | A22C 25/08 |
| 8,816,223 | B2 | 8/2014 | Taylor | A47J 37/12 |
| 9,254,000 | B1 * | 2/2016 | Raimondi | A23P 20/12 |
| 10,471,619 | B2 | 11/2019 | Hocker | B26D 5/007 |
| 10,653,157 | B2 | 5/2020 | Shell | A22C 21/0053 |
| 10,834,947 | B2 | 11/2020 | Rognini | A23L 13/03 |
| 11,019,829 | B2 | 6/2021 | Pfannenstiel | A22C 15/00 |
| 2002/0015635 | A1 | 2/2002 | Sinn | B65G 41/008 |
| 2003/0008605 | A1 | 1/2003 | Hartford | A22C 18/00 |
| 2003/0079678 | A1 | 5/2003 | Zeegers | B05C 19/04 |
| 2004/0107845 | A1 | 6/2004 | Sunter | B65B 1/46 |
| 2004/0123566 | A1 | 7/2004 | Limousin | B65B 53/063 |
| 2006/0292271 | A1 | 12/2006 | King | A23G 3/2076 |
| 2009/0223411 | A1 | 9/2009 | Higgins | D06M 13/51 |
| 2009/0294246 | A1 | 12/2009 | Pogue | B65G 17/28 |
| 2011/0311685 | A1 | 12/2011 | Hogan et al. | A23C 19/00 |
| 2012/0015101 | A1 | 1/2012 | O'Hara | A23G 3/26 |
| 2012/0070553 | A1 | 3/2012 | Hockett et al. | A47J 37/12 |
| 2014/0199447 | A1 * | 7/2014 | Elejalde | A23G 3/26 |
| | | | | 426/291 |
| 2015/0053097 | A1 | 2/2015 | Vardakostas | A23P 20/20 |
| 2015/0239591 | A1 | 8/2015 | Bialy | B65G 37/00 |
| 2016/0088859 | A1 | 3/2016 | Ream | A23G 4/18 |
| 2016/0167888 | A1 | 6/2016 | Messina | B65G 41/00 |
| 2016/0309735 | A1 | 10/2016 | Wolf | A23G 3/2092 |
| 2017/0050332 | A1 | 2/2017 | Bauer | A22C 17/0093 |
| 2018/0186576 | A1 | 7/2018 | Torrenga | B65G 21/06 |
| 2019/0328027 | A1 | 10/2019 | Sunter | A23P 20/18 |
| 2020/0205461 | A1 | 7/2020 | Cohen | A23P 20/12 |

FOREIGN PATENT DOCUMENTS

| | | | |
|---|---|---|---|
| EP | 1 127 496 | 2/2000 | A23L 1/31 |
| EP | 2 481 295 | 8/2012 | A23L 1/00 |
| WO | WO-2015178922 A1 * | 11/2015 | A23G 3/0063 |

* cited by examiner

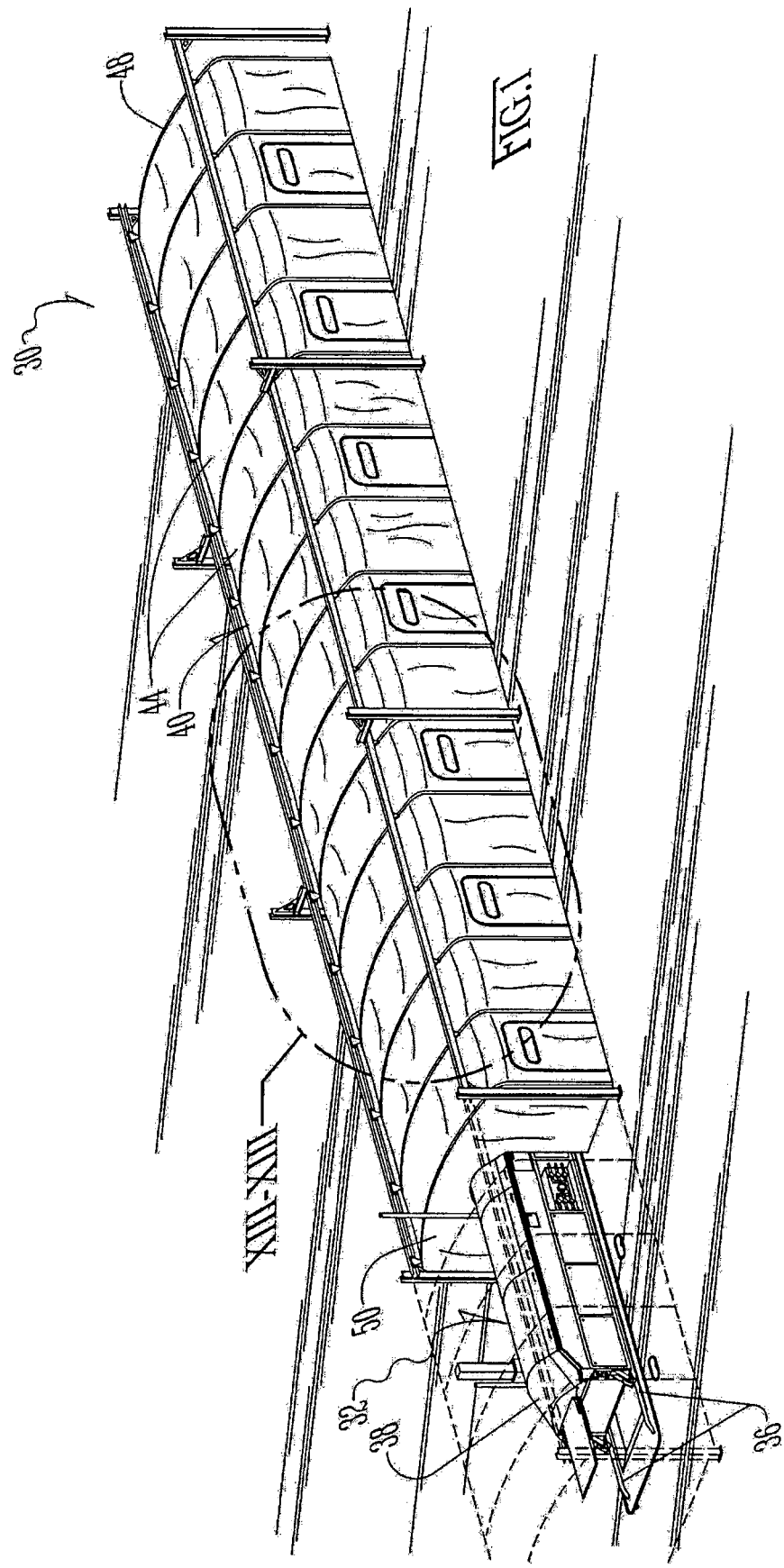

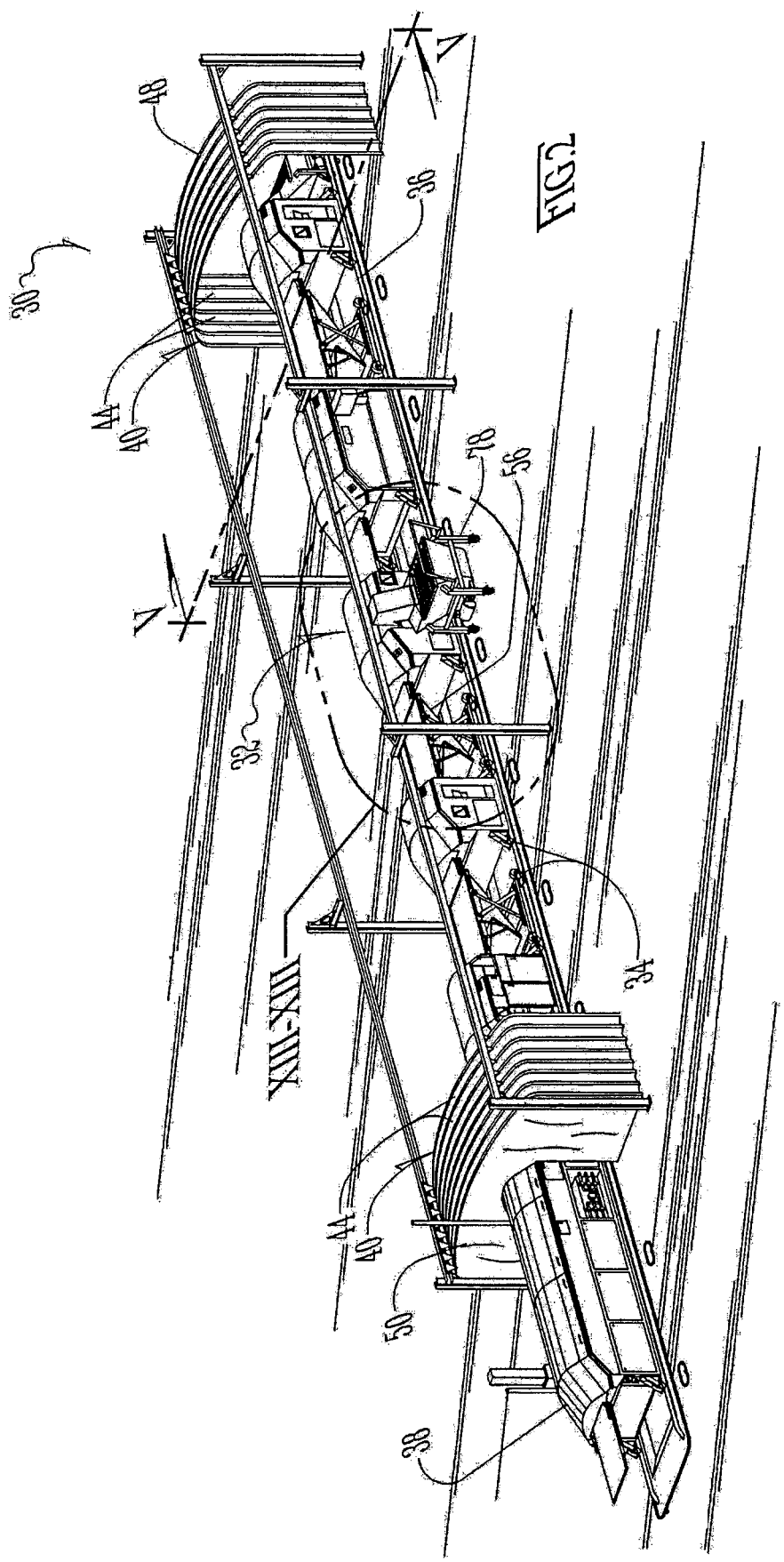

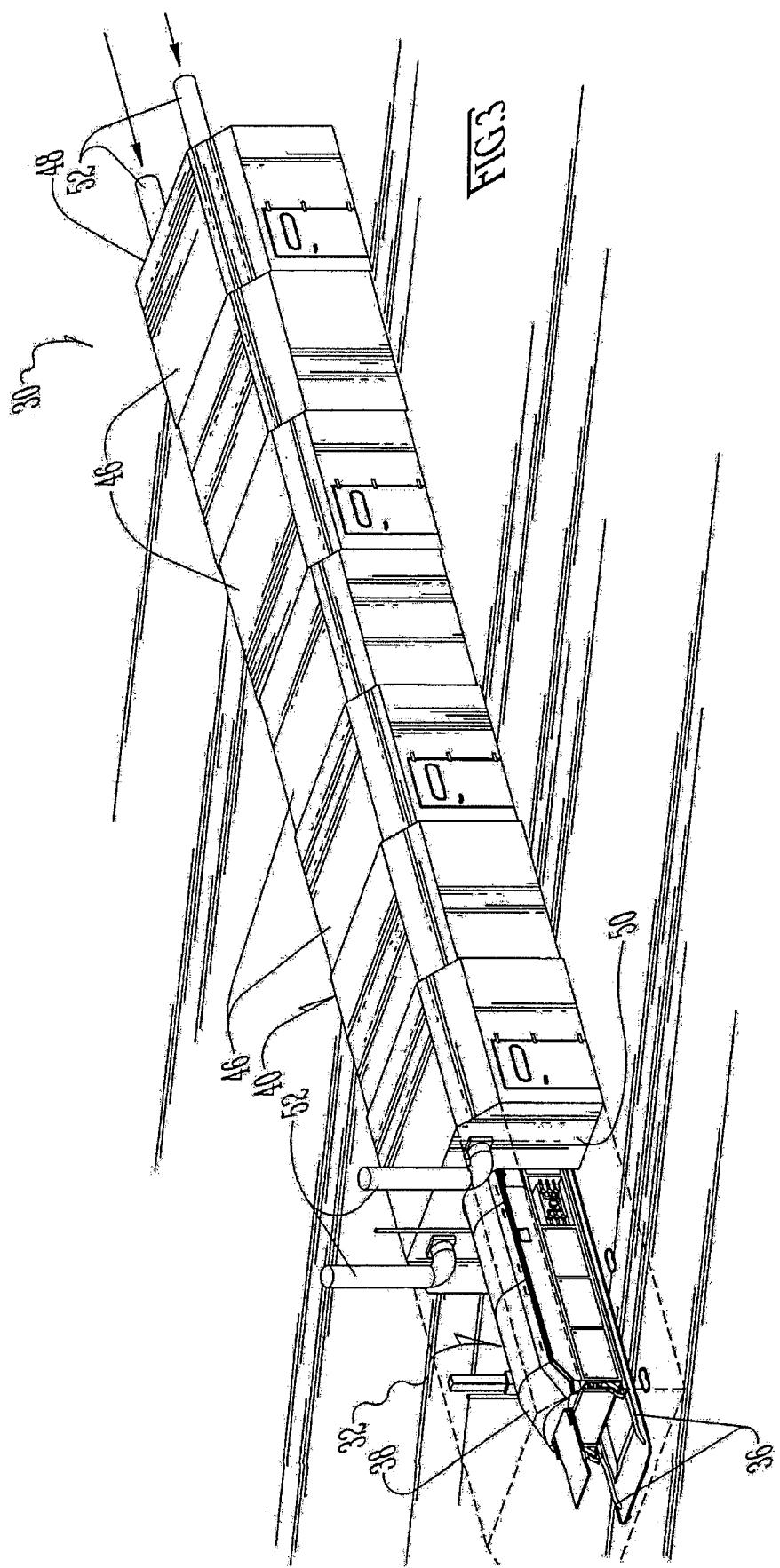

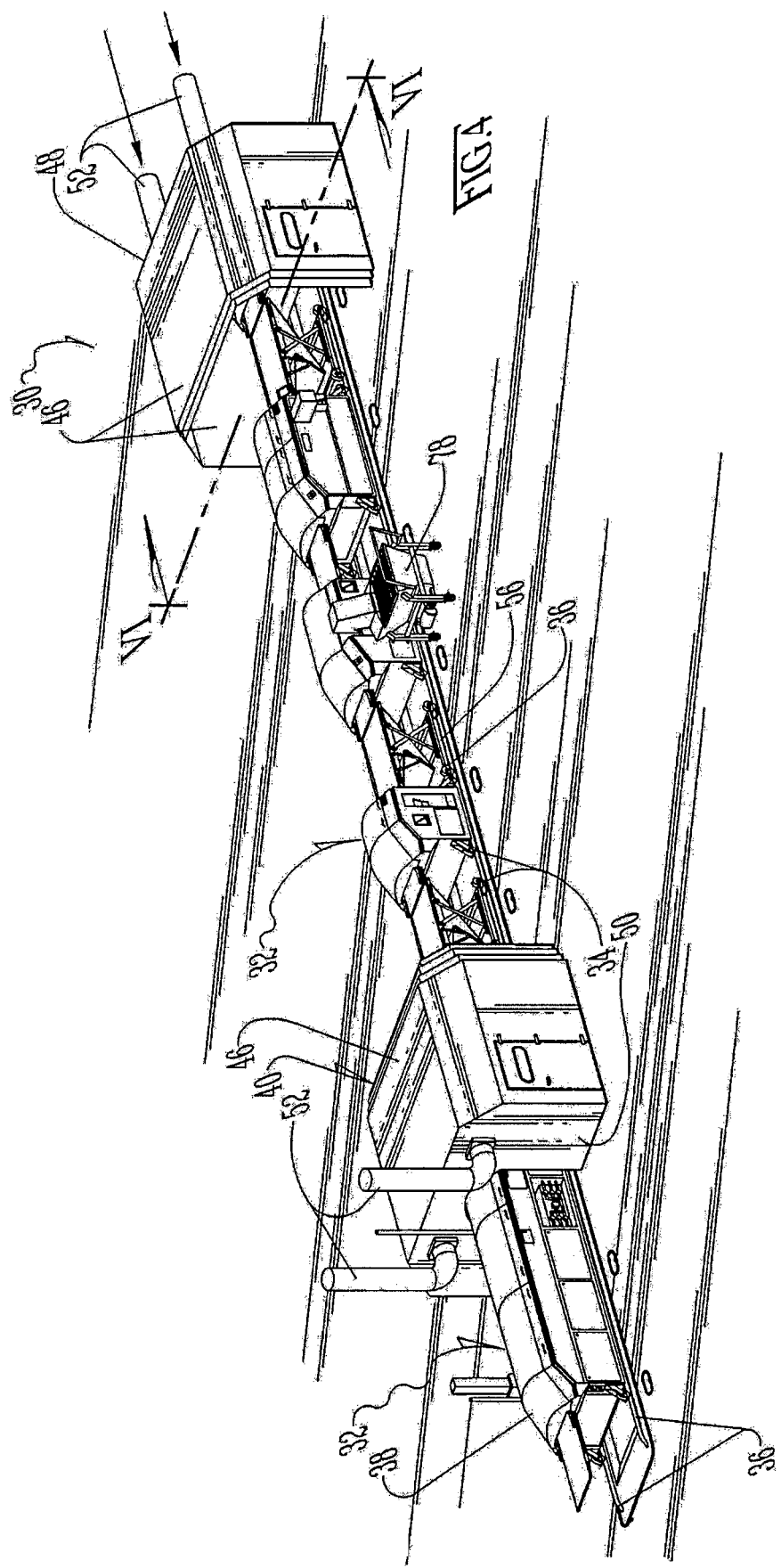

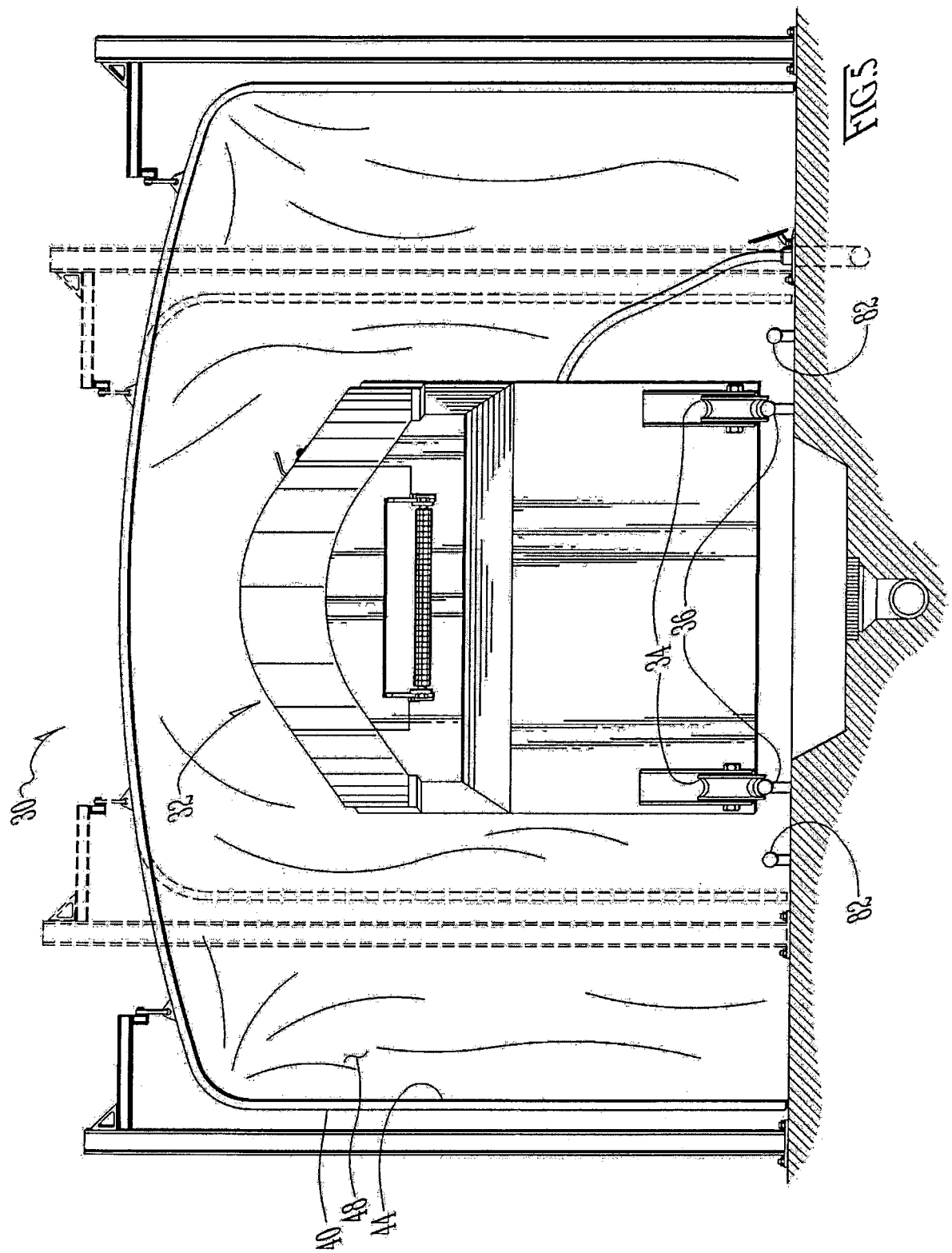

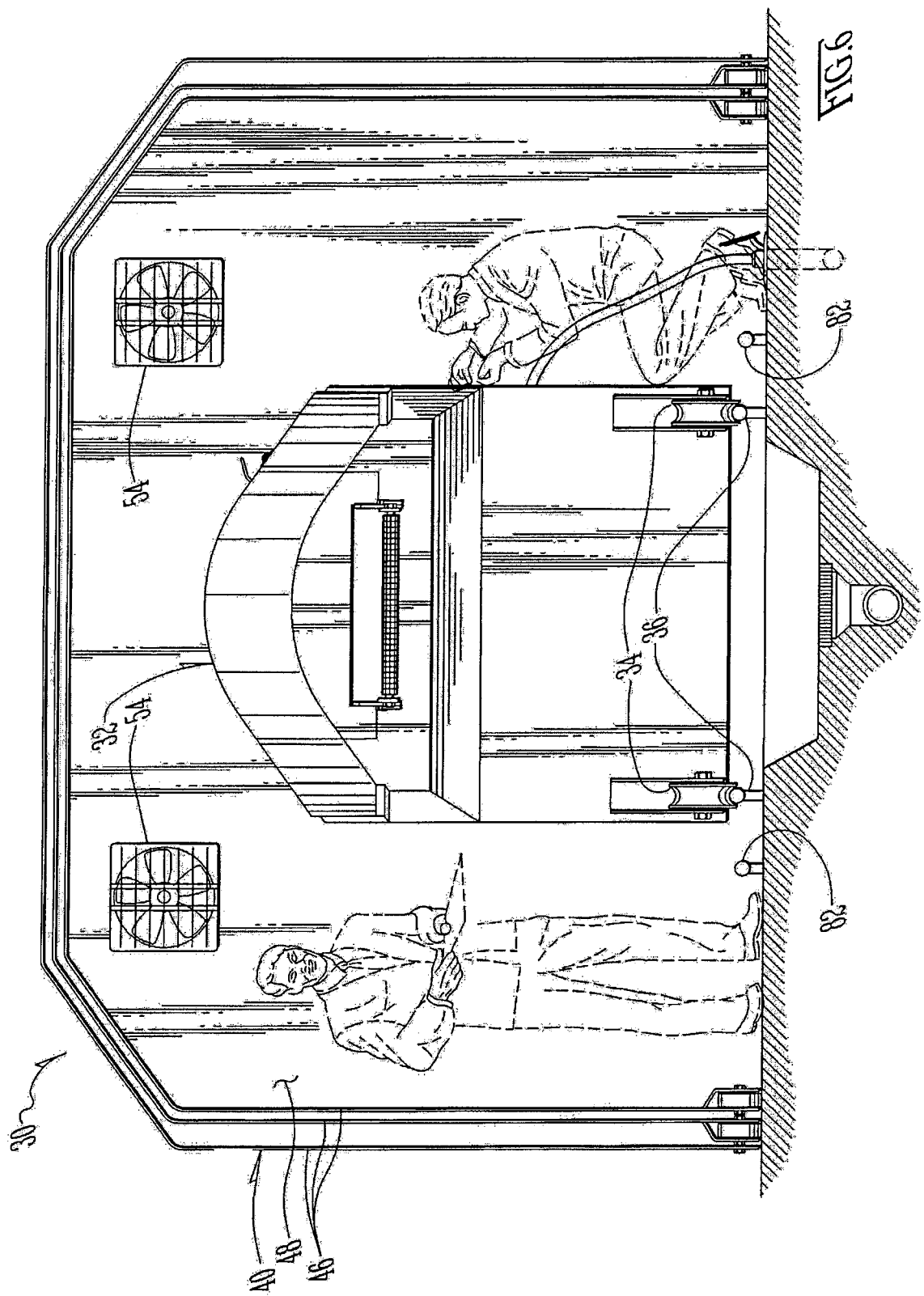

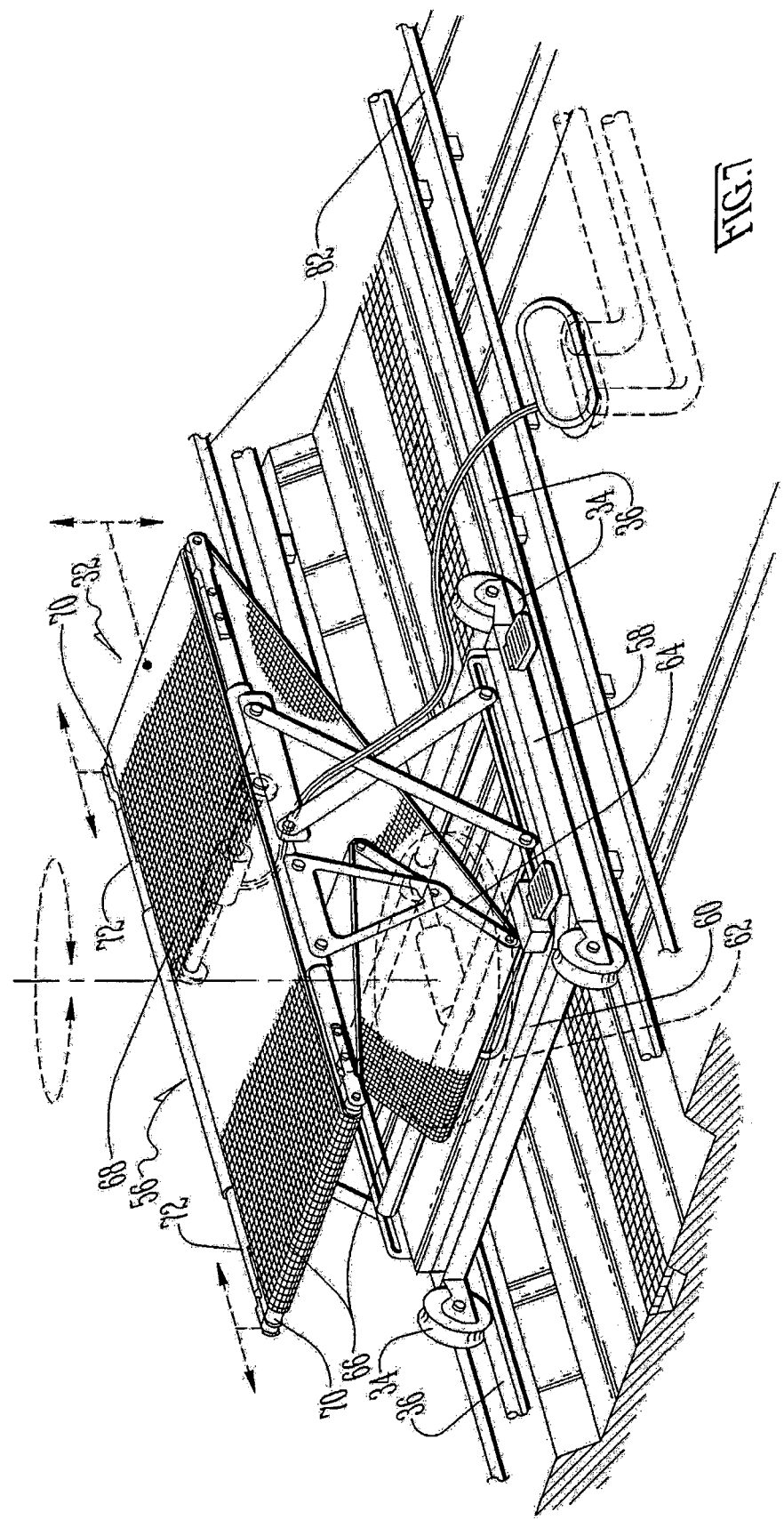

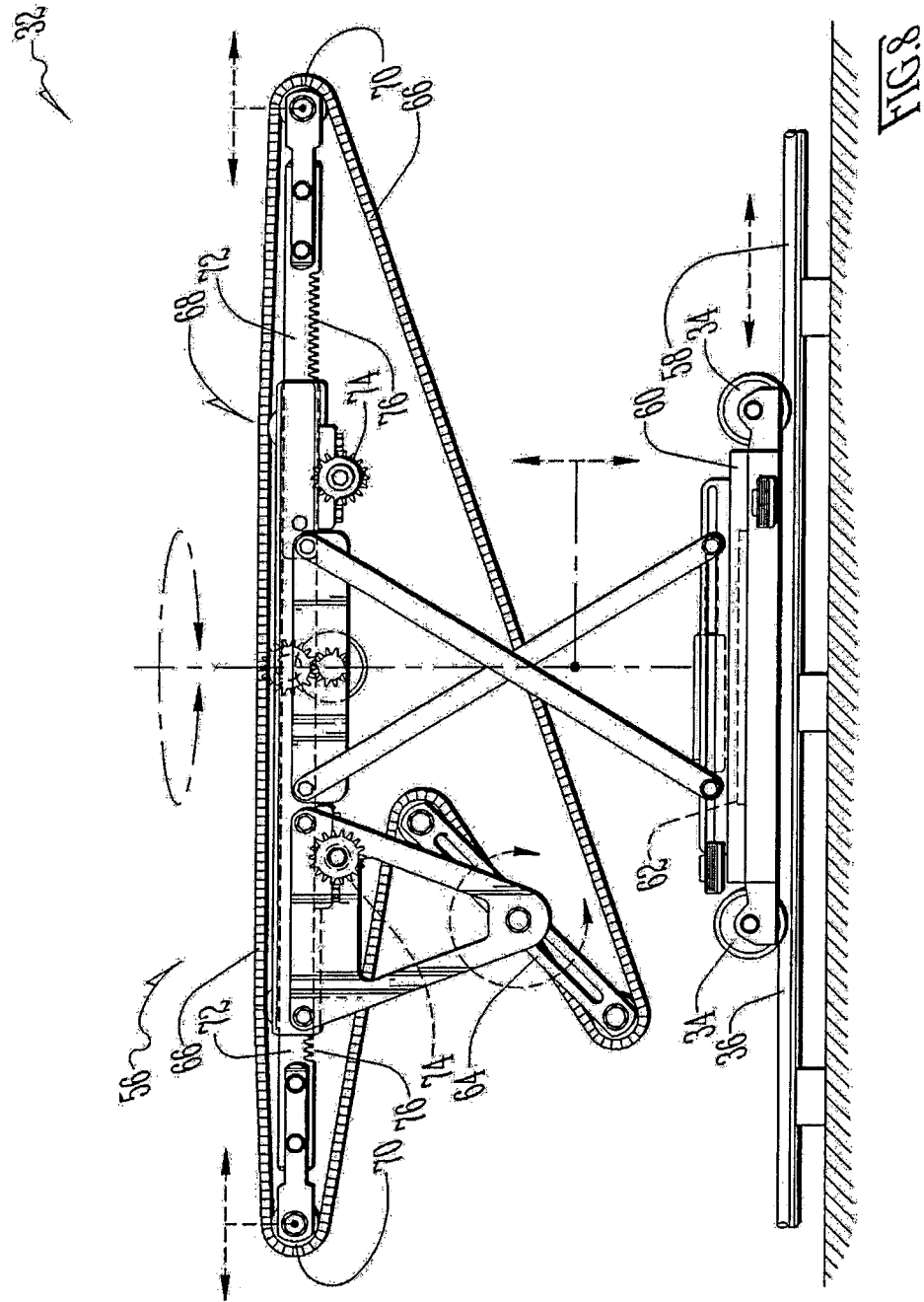

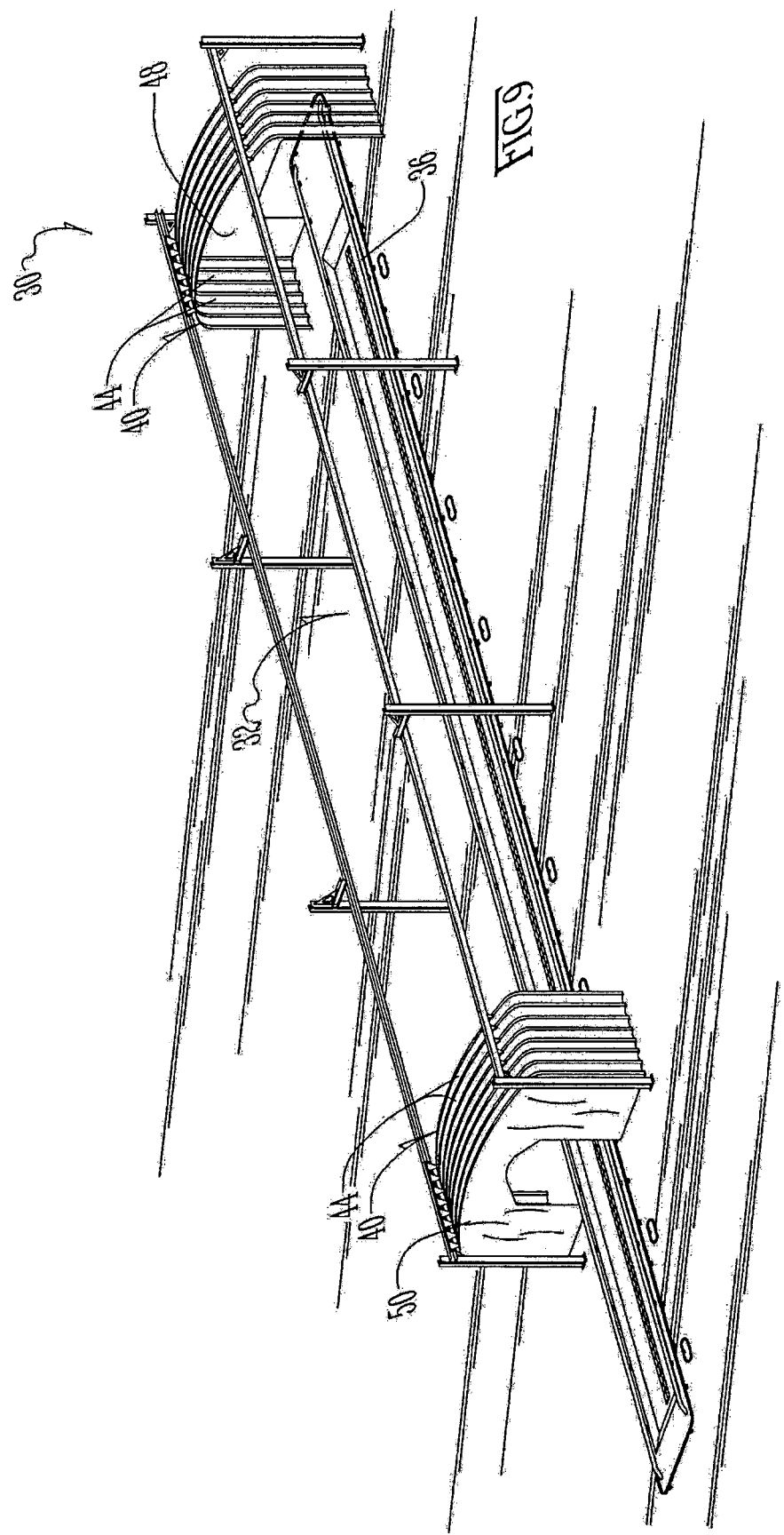

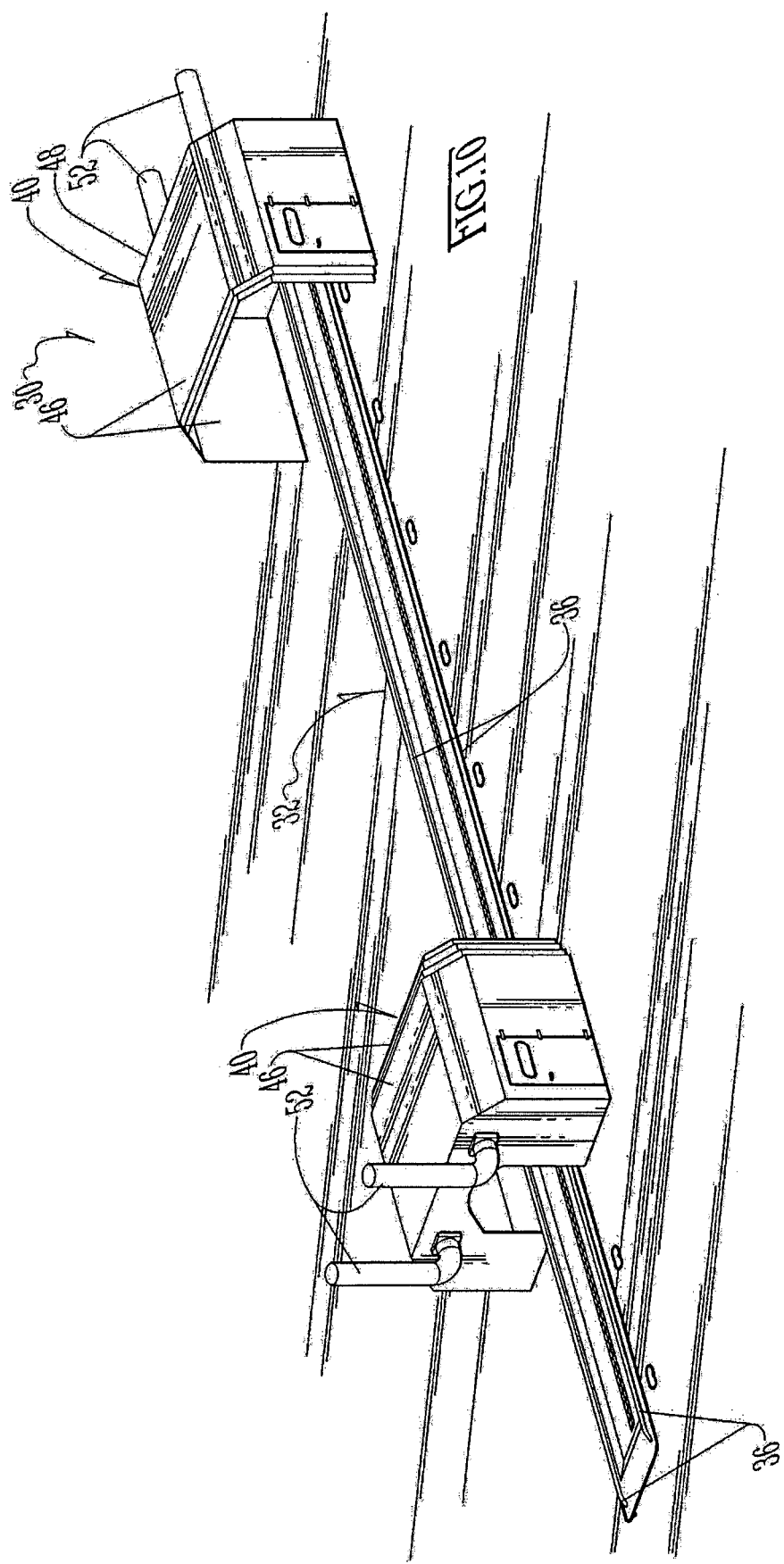

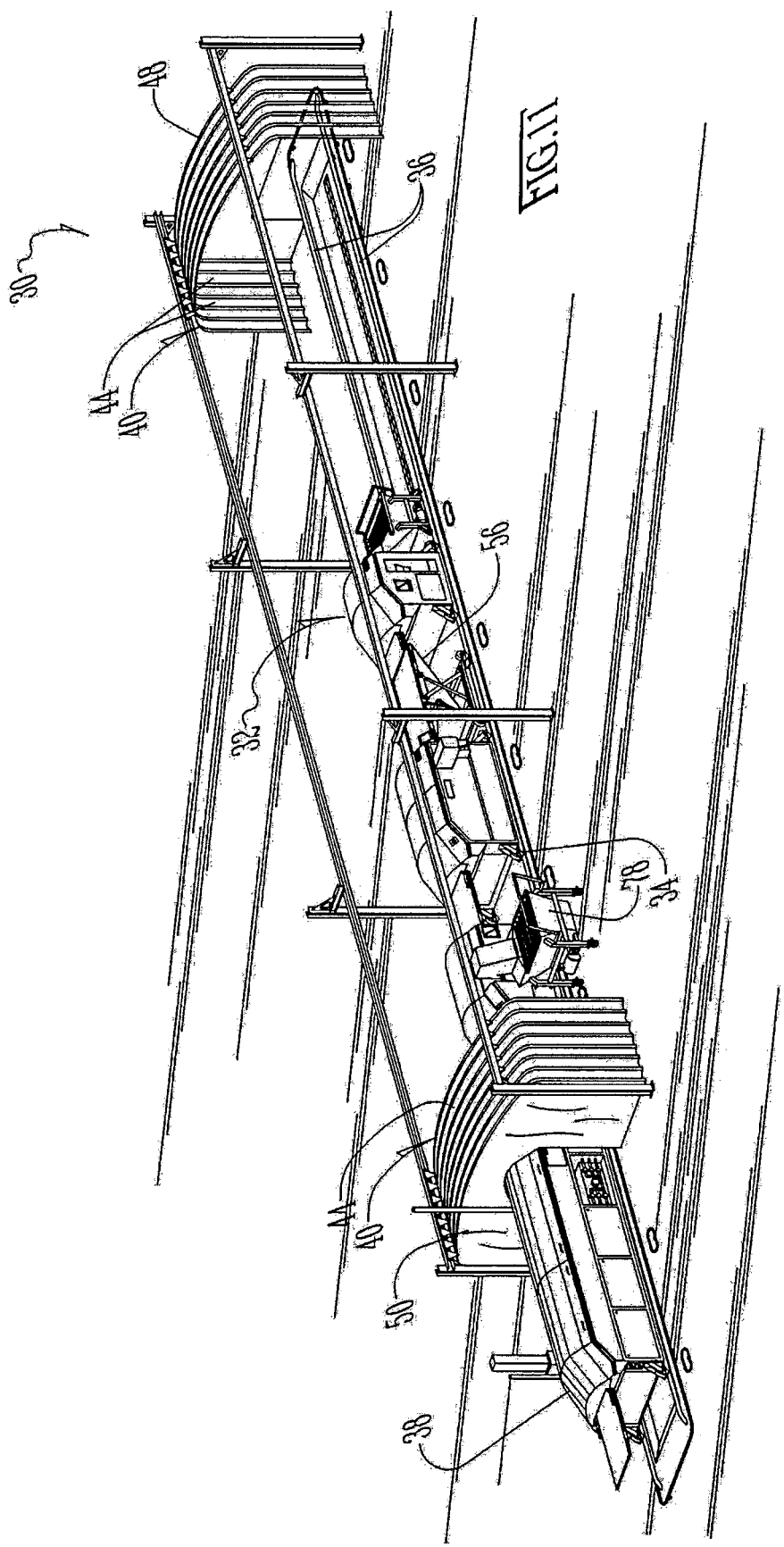

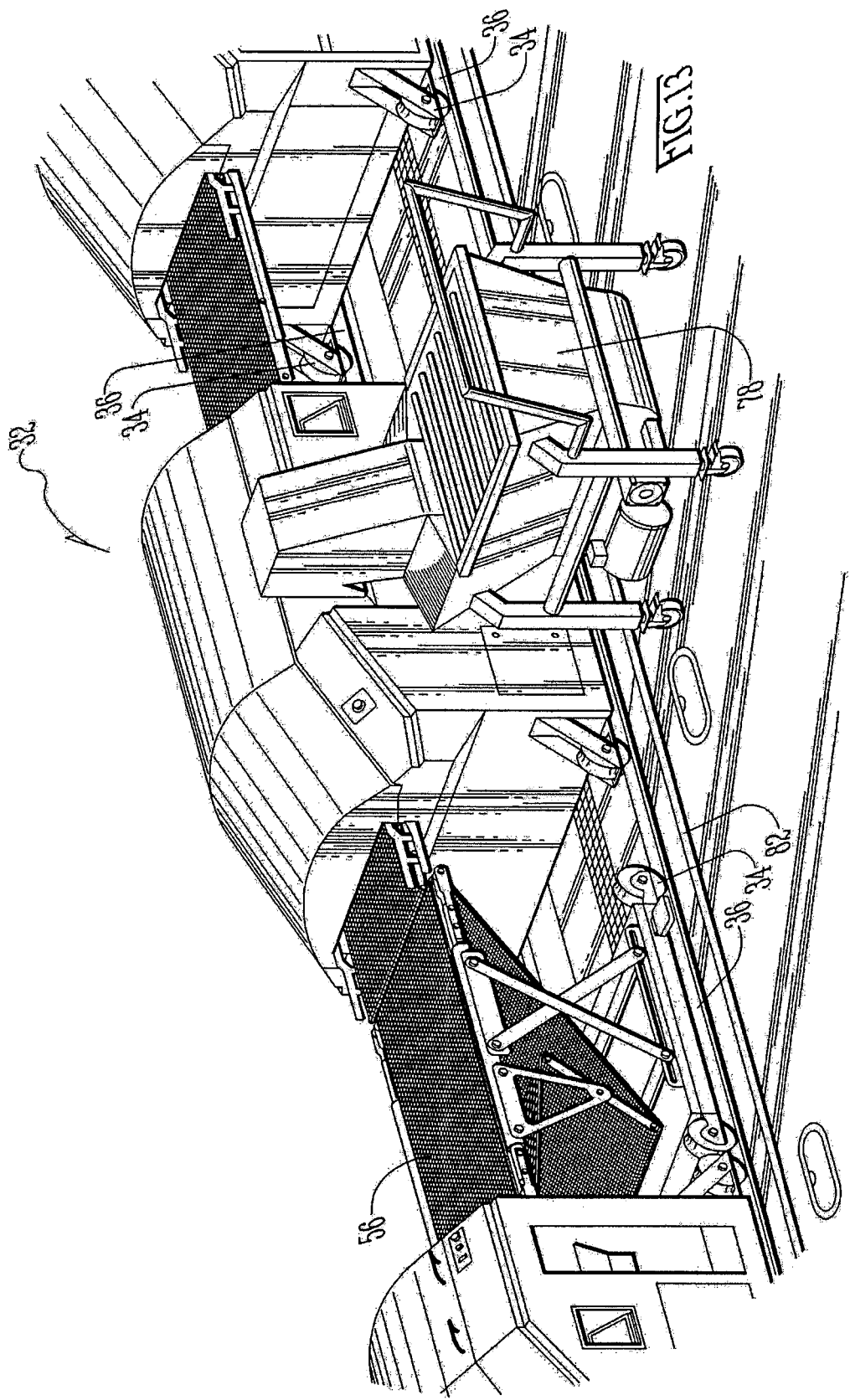

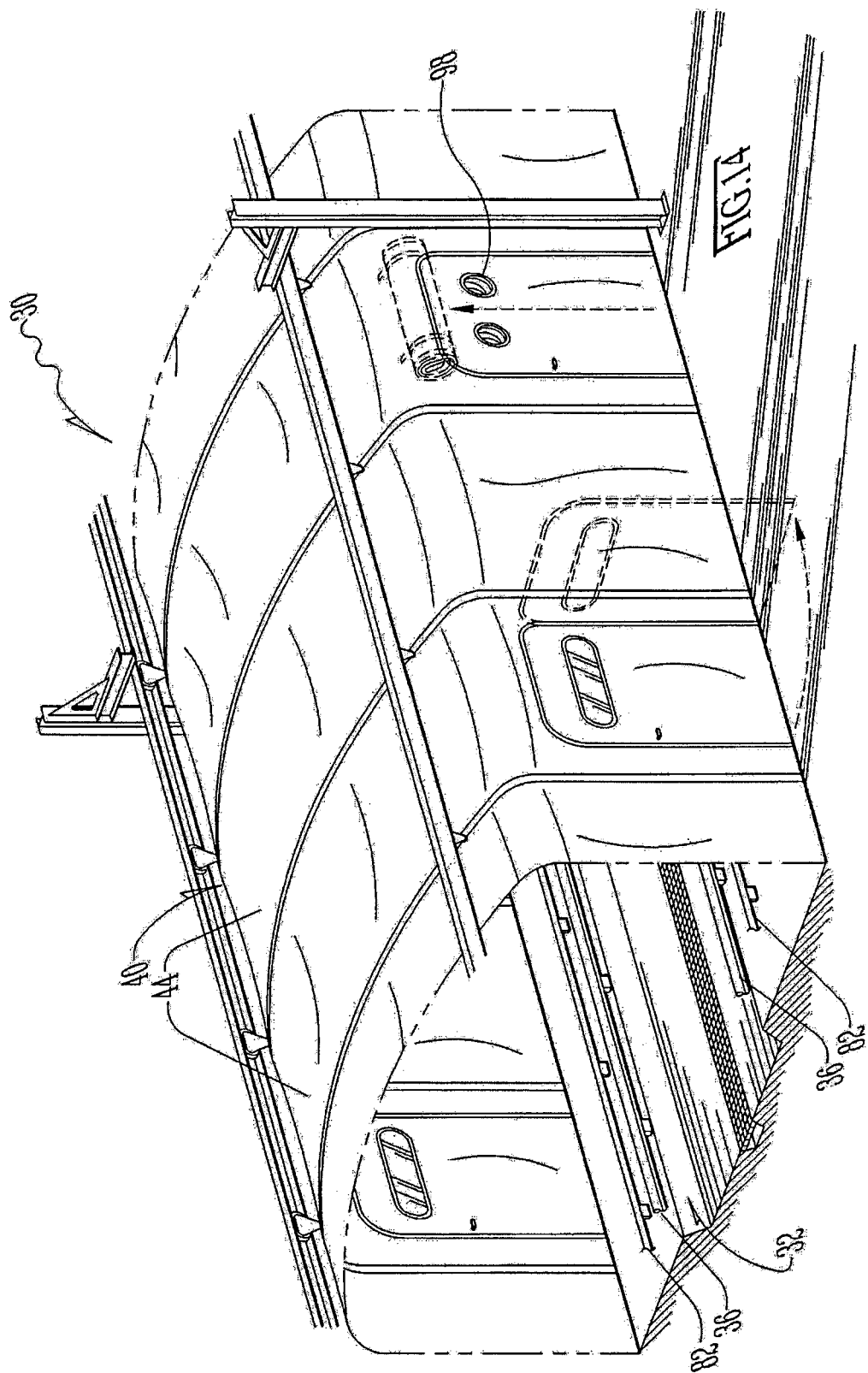

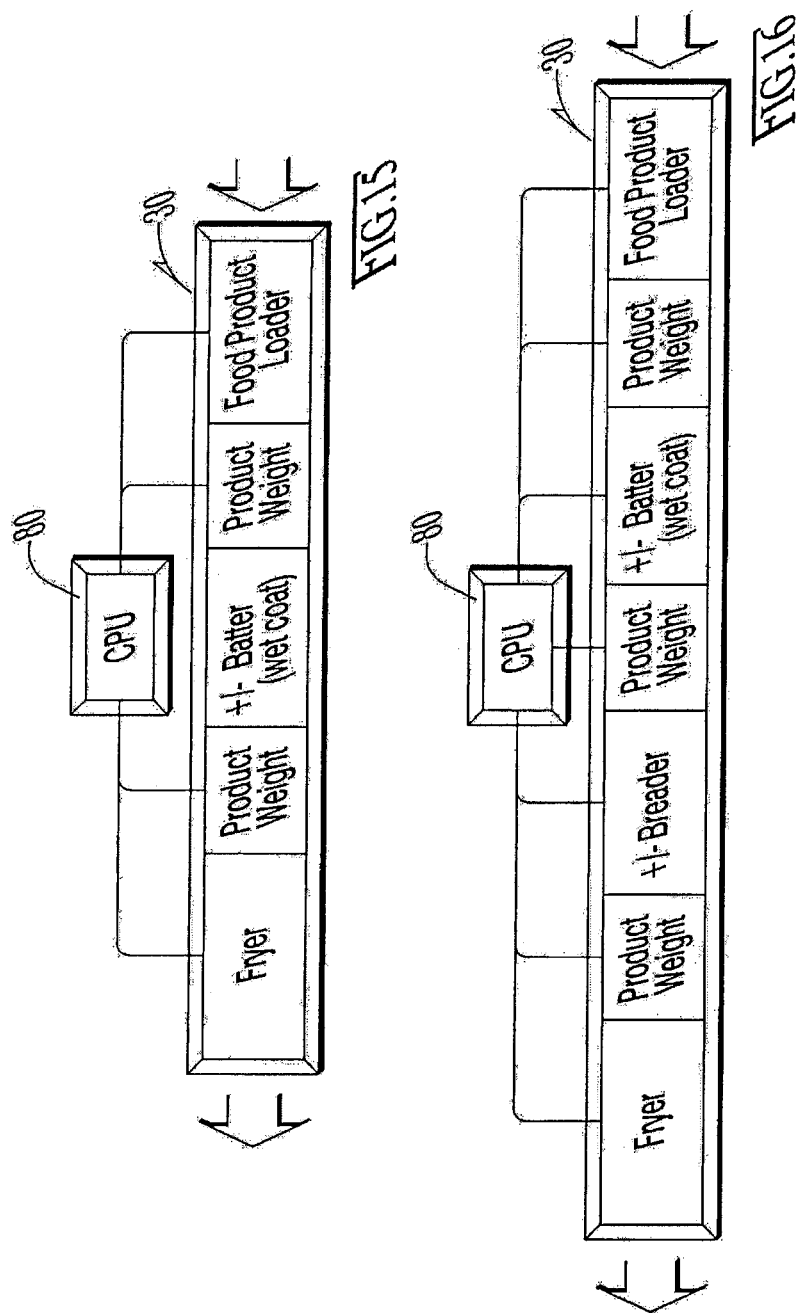

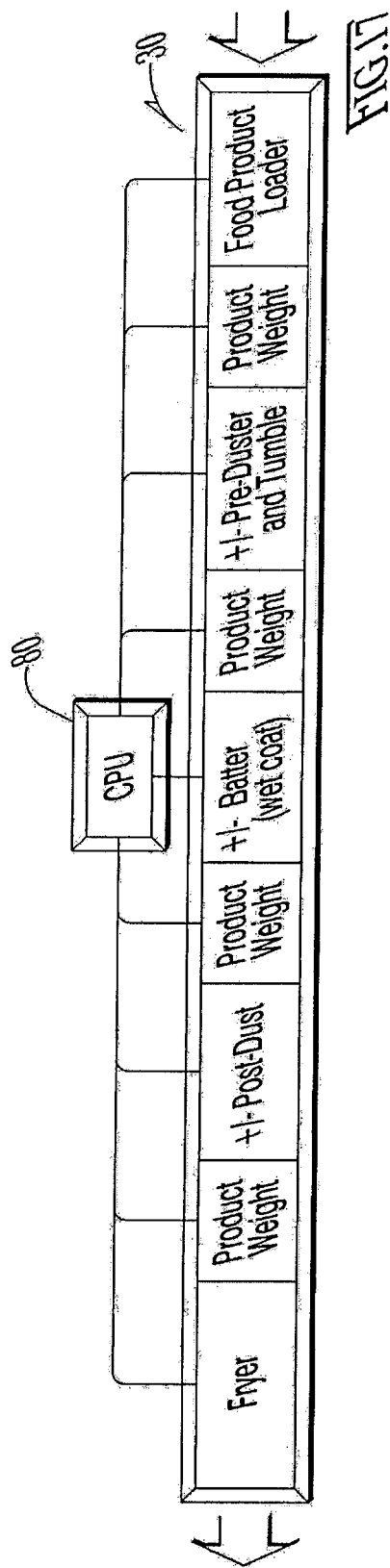
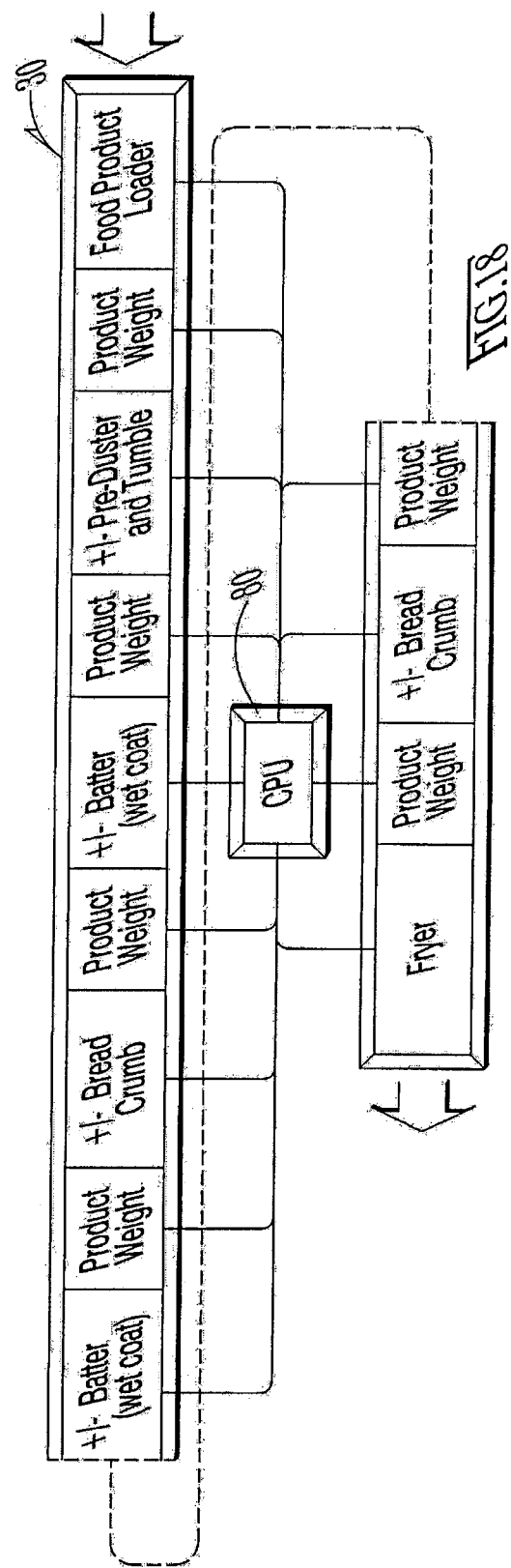

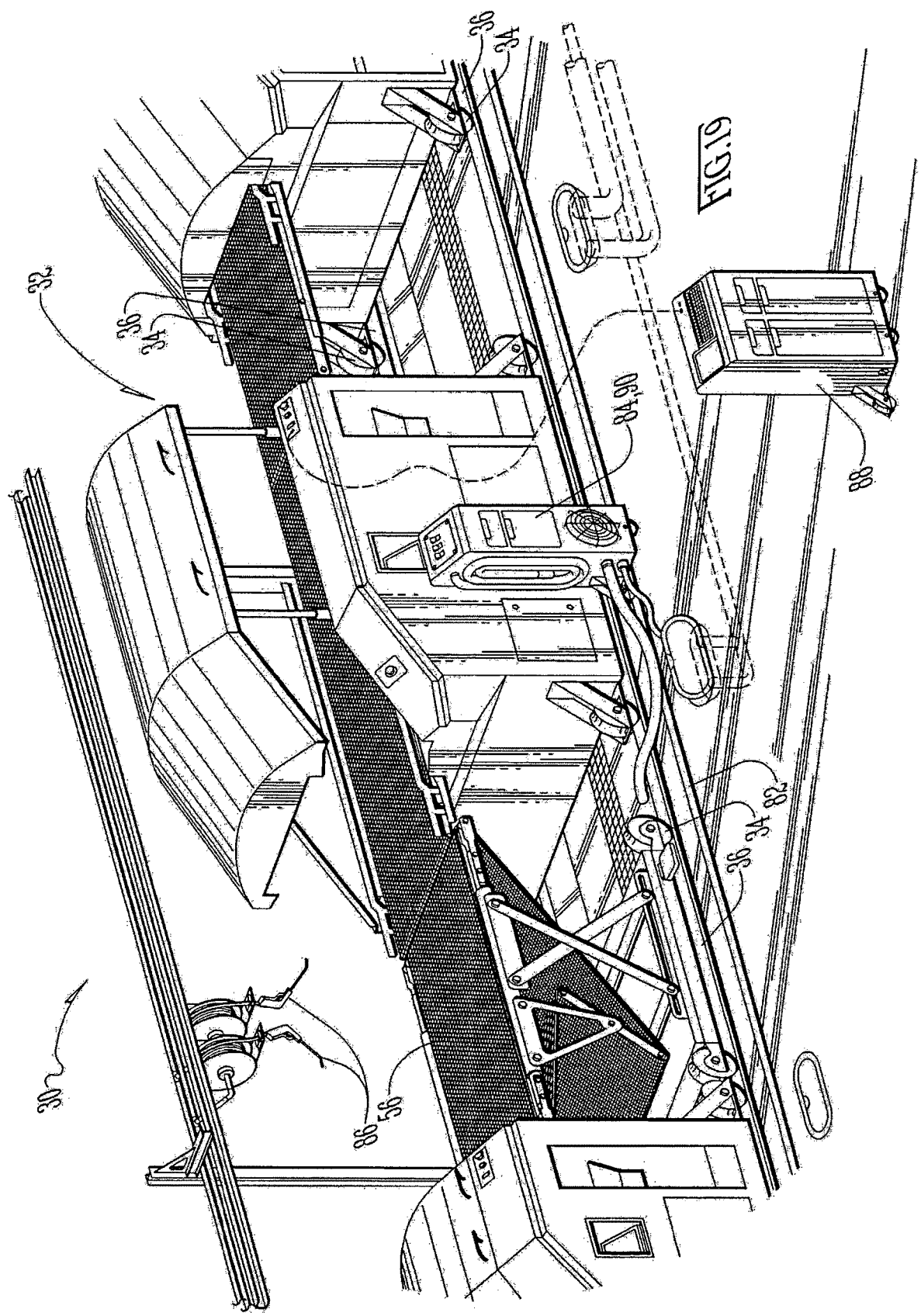

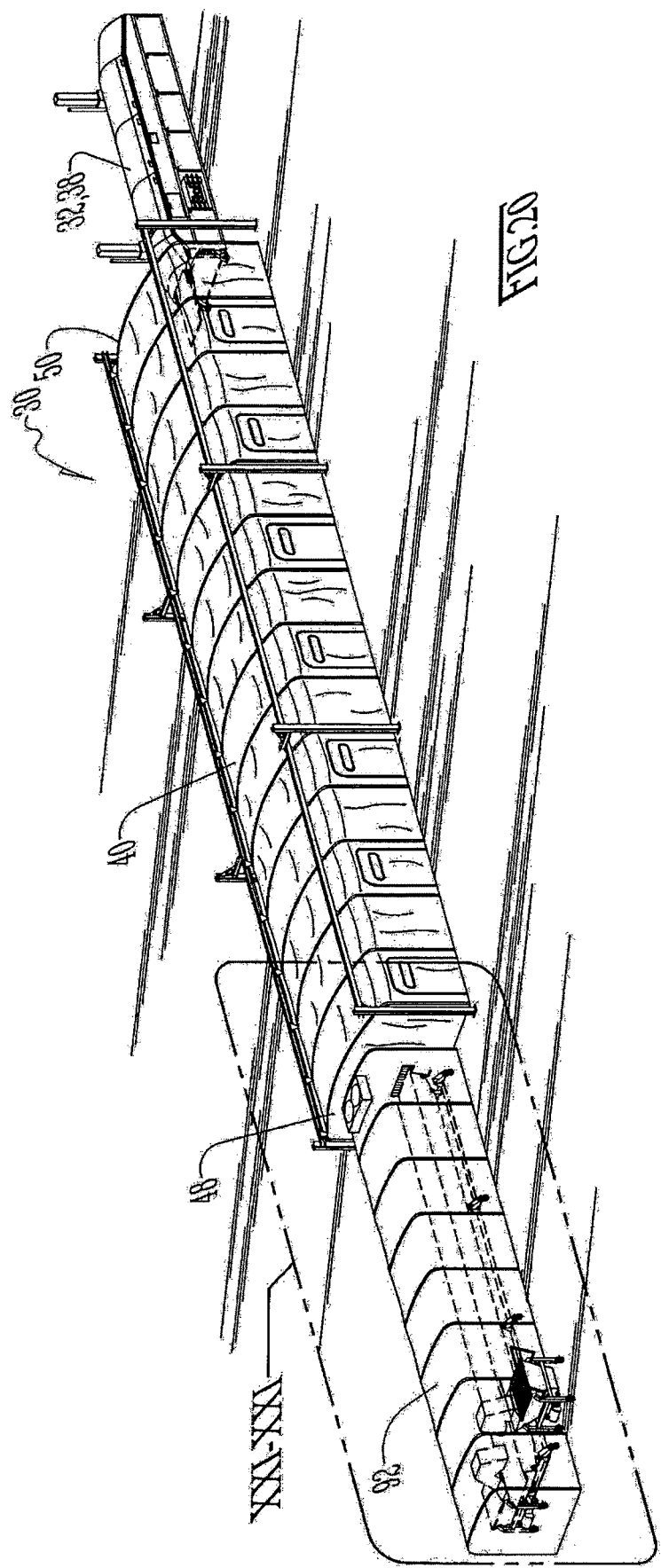

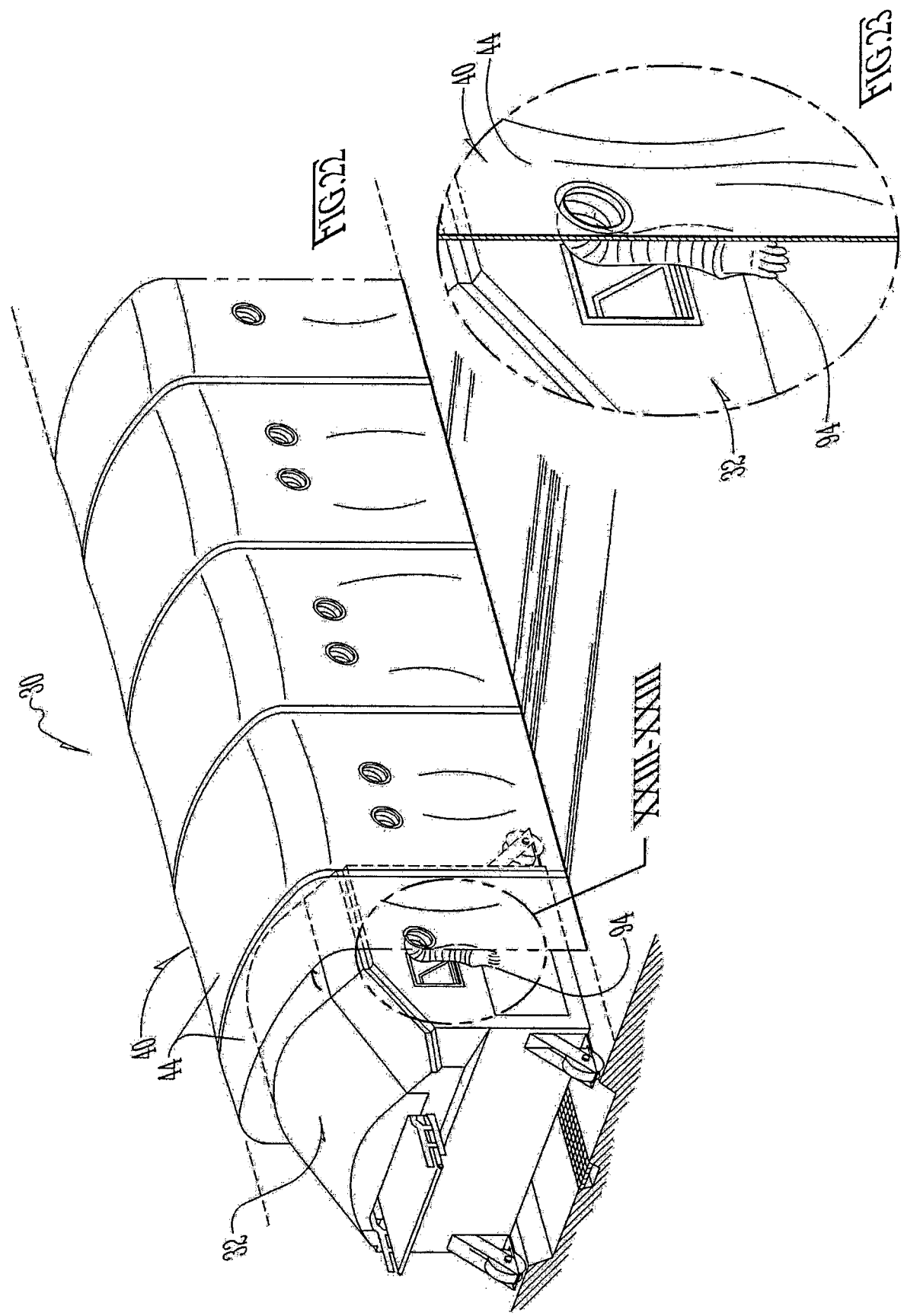

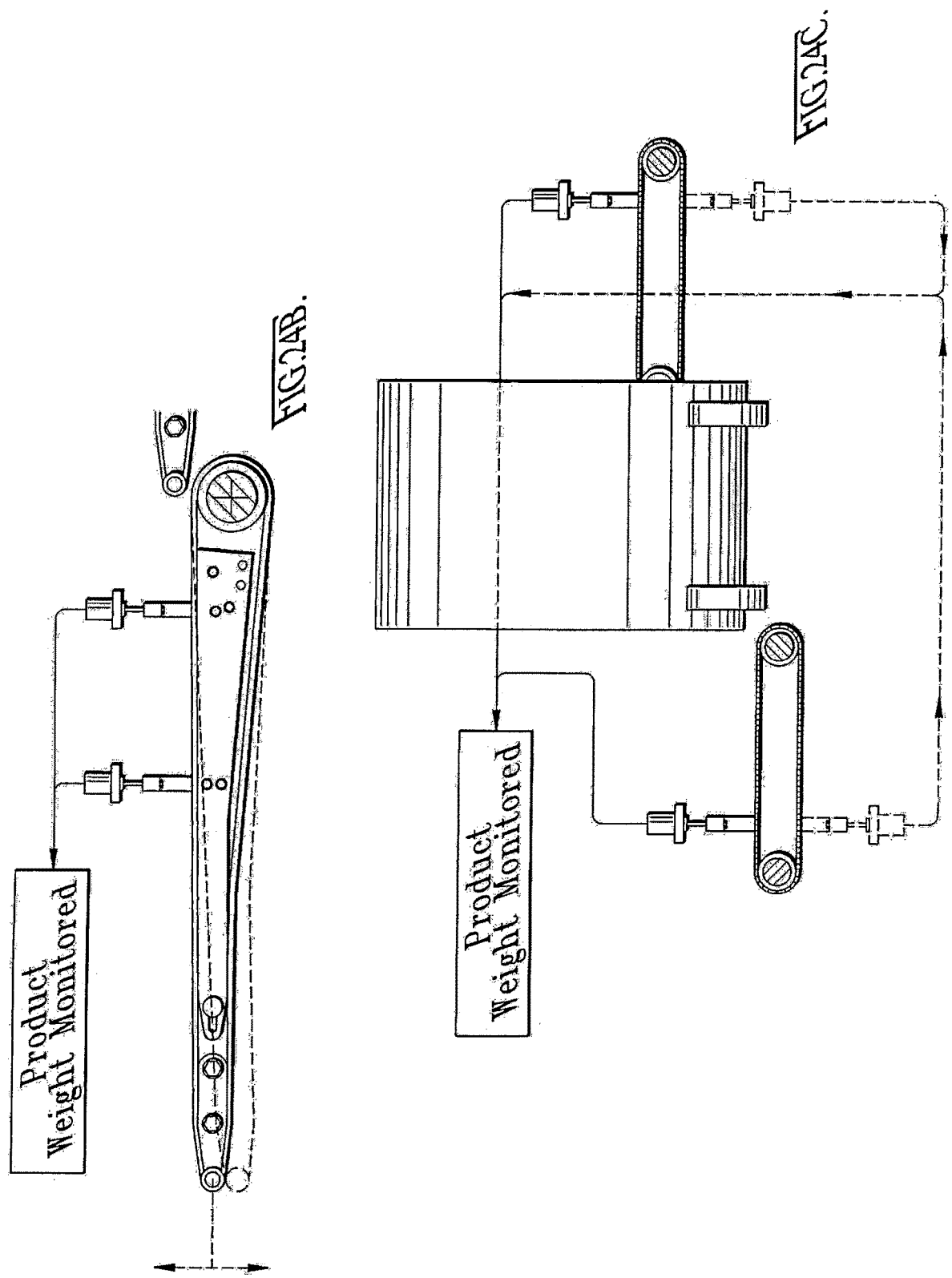

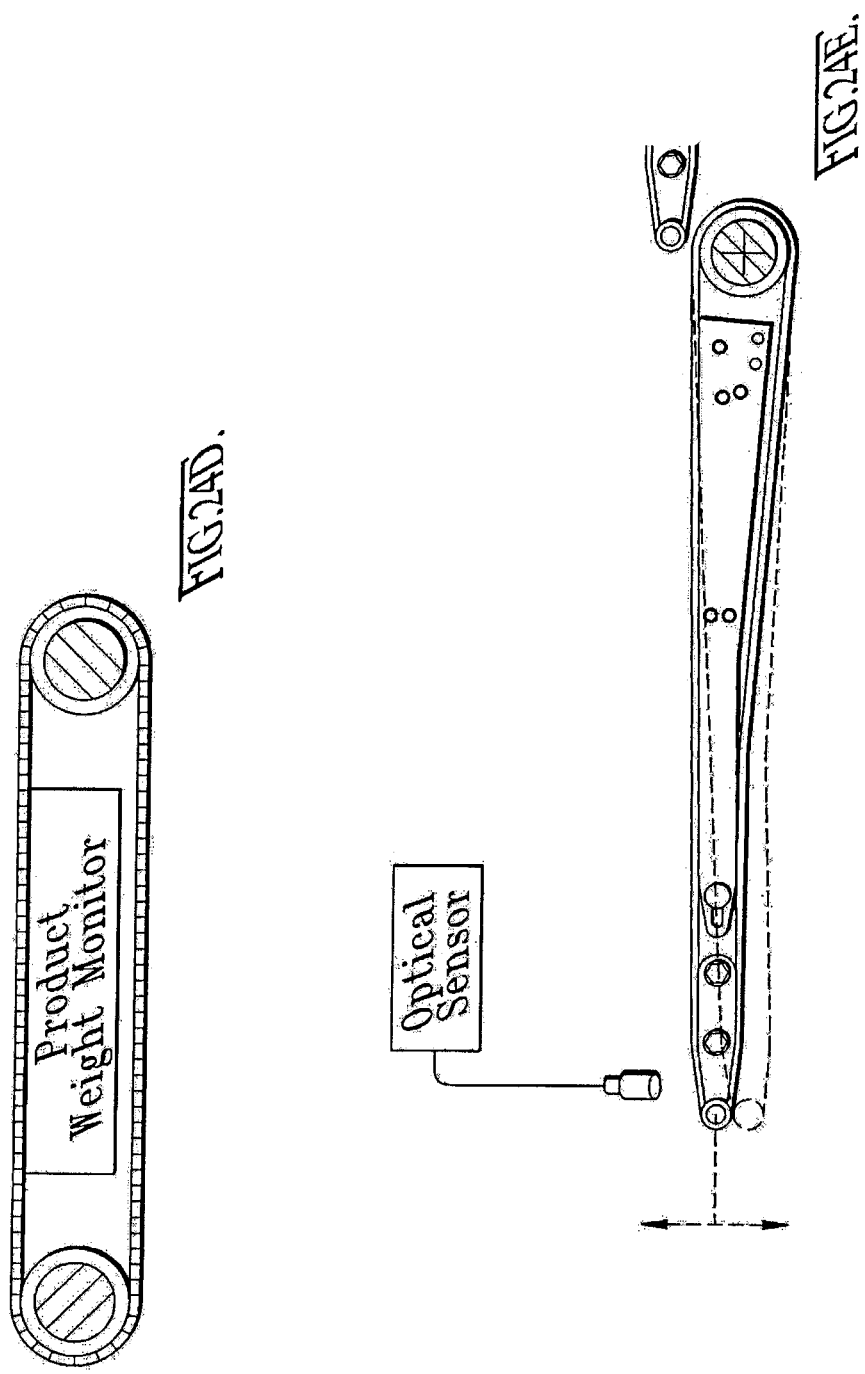

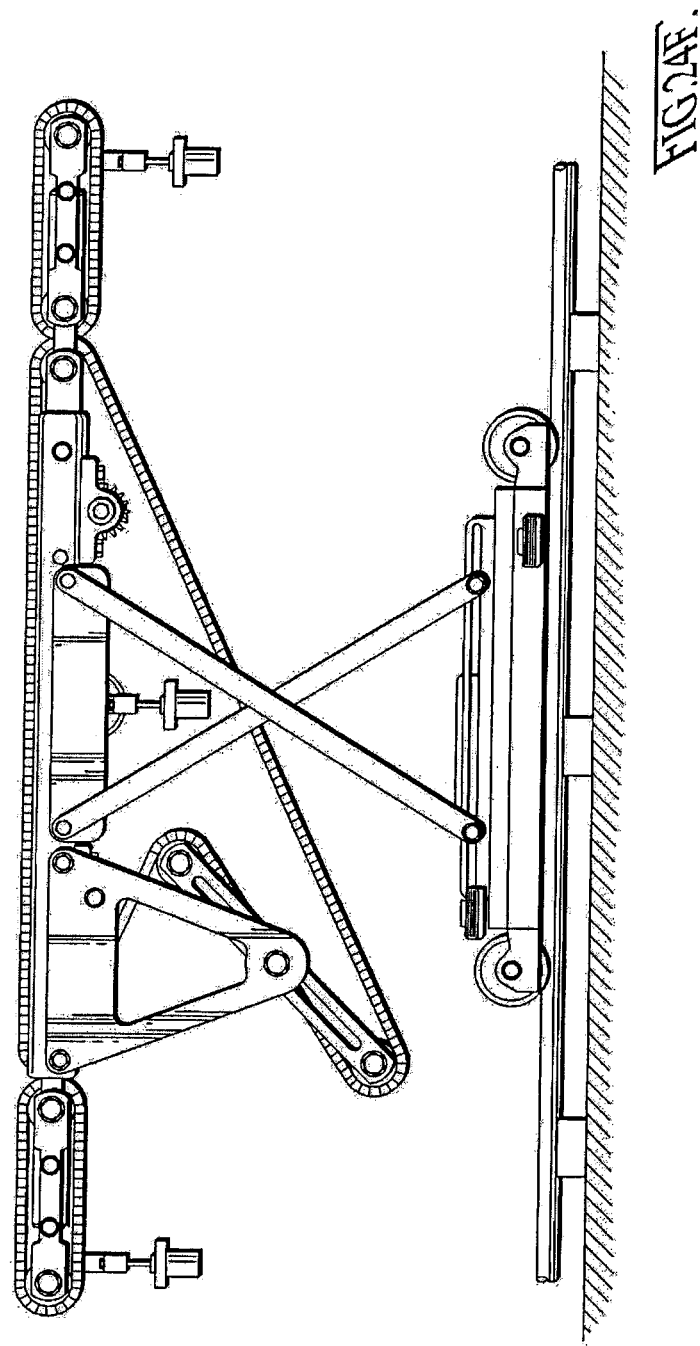

FIG.32.

Product Weight | +/- Pre-Duster and Tumble | Product Weight | Food Product Loader Fryer | Product Weight | +/- Post-Dust | Product Weight | +/- Batter (wet coat)

FIG.33.

+/- Bread Crumb | Product Weight | +/- Batter (wet coat) | Product Weight | +/- Pre-Duster and Tumble | Product Weight | Food Product Loader Fryer | Product Weight | +/- Bread Crumb | Product Weight | +/- Batter (wet coat) | Product Weight

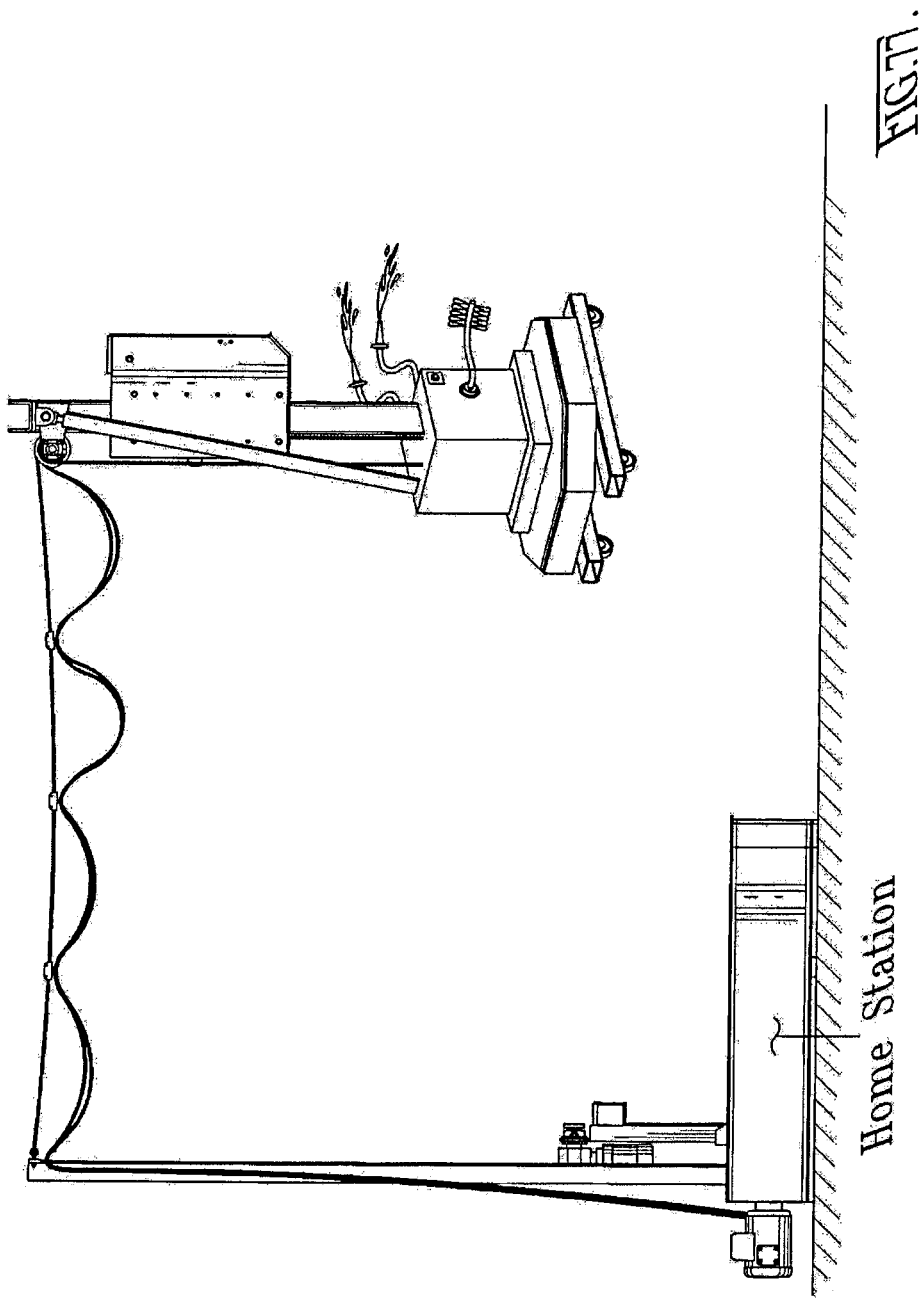

WORK-SAVING IMPROVEMENTS FOR FOOD-PROCESS LINES

CROSS-REFERENCE TO U.S. PROVISIONAL APPLICATION(S)

This application is a continuation of U.S. patent application Ser. No. 17/146,637, filed Jan. 12, 2021.

U.S. patent application Ser. No. 17/146,637, filed Jan. 12, 2021, is a continuation-in-part of U.S. patent application Ser. No. 15/940,003, filed Mar. 29, 2018, now U.S. Pat. No. 10,889,444; which claims the benefit of U.S. Provisional Application No. 62/478,822, filed Mar. 30, 2017; U.S. Provisional Application No. 62/545,634, filed Aug. 15, 2017; U.S. Provisional Application No. 62/560,392, filed Sep. 19, 2017; U.S. Provisional Application No. 62/577,375, filed Oct. 26, 2017; and U.S. Provisional Application No. 62/648,613, filed Mar. 27, 2018.

U.S. patent application Ser. No. 17/146,637, filed Jan. 12, 2021, is a continuation-in-part U.S. patent application Ser. No. 16/910,568, filed Jun. 24, 2020; which is a continuation-in-part of U.S. patent application Ser. No. 15/940,003, filed Mar. 29, 2018, now U.S. Pat. No. 10,889,444; which claims the benefit of U.S. Provisional Application No. 62/478,822, filed Mar. 30, 2017; U.S. Provisional Application No. 62/545,634, filed Aug. 15, 2017; U.S. Provisional Application No. 62/560,392, filed Sep. 19, 2017; U.S. Provisional Application No. 62/577,375, filed Oct. 26, 2017; and U.S. Provisional Application No. 62/648,613, filed Mar. 27, 2018.

U.S. patent application Ser. No. 16/910,568, filed Jun. 24, 2020, also claims the benefit of U.S. Provisional Application No. 62/866,121, filed Jun. 25, 2019.

U.S. patent application Ser. No. 17/146,637, filed Jan. 12, 2021, is a continuation-in-part U.S. patent application Ser. No. 16/911,866, filed Jun. 25, 2020; which is a continuation-in-part of U.S. patent application Ser. No. 15/940,003, filed Mar. 29, 2018, now U.S. Pat. No. 10,889,444; which claims the benefit of U.S. Provisional Application No. 62/478,822, filed Mar. 30, 2017; U.S. Provisional Application No. 62/545,634, filed Aug. 15, 2017; U.S. Provisional Application No. 62/560,392, filed Sep. 19, 2017; U.S. Provisional Application No. 62/577,375, filed Oct. 26, 2017; and U.S. Provisional Application No. 62/648,613, filed Mar. 27, 2018.

U.S. patent application Ser. No. 16/911,866, filed Jun. 25, 2020, also claims the benefit of U.S. Provisional Application No. 62/866,124, filed Jun. 25, 2019.

U.S. patent application Ser. No. 17/146,637, filed Jan. 12, 2021, claims the benefit of U.S. Provisional Application No. 63/013,020, filed Apr. 21, 2020.

U.S. patent application Ser. No. 17/146,637, filed Jan. 12, 2021, claims the benefit of U.S. Provisional Application No. 63/017,208, filed Apr. 29, 2020.

U.S. patent application Ser. No. 17/146,637, filed Jan. 12, 2021, claims the benefit of U.S. Provisional Application No. 63/049,794, filed Jul. 9, 2020.

The foregoing patent disclosures are incorporated herein by this reference thereto.

BACKGROUND AND SUMMARY OF THE INVENTION

The invention generally relates to mechanized and/or automatic food-process line equipment and, more particularly, the invention relates to work-saving improvements for food-process lines include (1) mounting alternate machines of a food process line on pivot hardware to speed up washing and maintenance operations, (2) mounting the machines on rolling riding gear in order to speed up the activities of building and re-building food process lines of a different series of machines, or (3) isolate the food process line in its own tunnel and hence its own climate-controlled atmosphere to reduce conflicts with running two food process lines side by side where one food process line is a source of air borne allergens.

It is an aspect of the invention that each process (or machine) preferably incorporate a scale (or load cell or like weighing or weight sensing/approximating apparatus) that weighs (or approximates the weight flowrate) of the processed food item capturing "real time" data on average piece/flow weights. This data will be used for automatically adjusting each process (or machine or equipment) to arrive at the desired results.

It is an aspect of the invention that each machine preferably be redesigned so as to make previously manual adjustments automated, thus eliminating the need for human intervention and be able to build recipes for each product SKU (stock-keeping unit).

It is an aspect of the invention to preferably include an enclosure/tunnel (preferably LEXAN® (polycarbonate) or similar) to completely cover the process line equipment and further incorporating a track for aligning all the process line equipment into a complete process line. This tunnel or process zone will also include the following:

Control the quality of air inside the tunnel so as to keep the air quality outside the tunnel clean of dust and airborne ingredient/oil particulates from escaping and causing cross contamination to other lines. One benefit is being able to run allergen products in the same plant as non-allergen;

House a robotic/automatic "C.I.P" (clean in place system), containing over spray of water, chemicals, cleaning agents within the tunnel:—a benefit being able to sanitize a given line next to another production line running products, while not contaminating the other production line;

Allow refrigerated air to be controlled in the tunnel making processing safer, by slowing down bacteria growth, keeping food in a chilled environment and allow 24 hour line production within a plant that is not able to because of lacking climate control;

Incorporate a collection drainage system for reducing waster water treatment;

Allow human full body access and/or arm and hand access;

Each process line machine and/or operation would further have the outflow production monitored by a scale (weight sensing or approximating technology) either built into the machine or a conveyor after the machine to give an average throughput or singular weights of products and further have computing devices also collecting data on same; and/or Each machine will have manual adjustments redesigned to be automated, eg.:—
a flatbed breading machine;
a multiple function coating machine,
either provisioned with air-knife auto-adjust in pitch and height;
a batter mixing and coating machine,
provisioned with batter-diluting and/or -thickening technology.

Moreover in regard to the enclosure or tunnels aspects in accordance with the invention, it is a further aspect of the invention to preferably completely cover the food process line, including the fryer, to make a process zone, that would accomplish any or all of the following:—

Keep dust and other airborne particulates from escaping and causing cross contamination in the plant or other lines;

Contain water/soap/chemicals while the line is being washed, so the other lines could continue to run;

Allow refrigerated air to encompass the line to slow down or eliminate bacteria and allow 24 hour operation even though the rest of the plant may not be;

Allow access of personnel either bodily inside the tunnel or through long gloves from the outside; as well as or in the alternative, Incorporate a drainage system to collect scraps of product/ingredients to be filtered outside of the wastewater treatment, which cut down on various issues including cost regarding treating waste.

Furthermore, in regards to line equipment in accordance with the invention for processes including:— product forming;

batter mixing (from dry ingredients) and application (coating);

dry material coating (breading, corn flour, spices, Panko and so on);

frying;

oven baking; as well as and without limitation freezing; and packaging;

It is an additional aspect of the invention to automate all of or as much as possible the manual settings, the manual adjustments, the manual reading of parameters (eg., such as pressures and temperatures) and then thereafter automate the control thereover.

It is still another aspect of the invention to logically take the data and interpret it so as to make adjustments with artificial intelligence such as to propel speeds, control pressures, viscosity settings, temperatures, removing most of this supervision, analysis and control from human decision.

It is yet another aspect of the invention to configure the tunnel so that it covers the production line, controls cross contamination by dust or foreign debris or wafting fractions even aerosols and fumes.

It is yet another aspect of the invention to configure the tunnel so that it covers the production line, controls cross contamination by and of dust or foreign debris or wafting fractions even aerosols and fumes.

It is yet a further additional aspect of the invention to include "C.I.P." (clean in place) system so that the production line could be washed and sanitized while all the other production lines in their own respective enclosed environments (tunnels) are running production runs, rather than all having to be commonly idled. Again, it is an aspect of the invention that the tunnel is either roomy enough for people walk inside or not.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings, FIG. 1 is a perspective view of an assemblage of food-process line equipment in accordance with the invention wherein each individual machine is preferably mounted on rolling riding gear, and preferably the whole assemblage is riding on a set of parallel tracks, something like small gauge railroad tracks, and housed in an elongated enclosure (eg., tunnel) to isolate a compact environment for independent environmental control of the environment surrounding the food process line within a larger environment such as a commercial food processing plant operating a plurality of food process lines simultaneously;

FIG. 3 is a perspective view comparable to FIG. 1 except showing the tunnel-like enclosure comprising a chain of telescoped car ports constructed of hard materials like stainless steel or the like, some or all of which are provided with access doors and/or windows;

FIG. 4 is a perspective view comparable to FIG. 3 except showing that the tunnel-like enclosure comprising a chain of telescoped car ports constructed of hard materials can be cycled between OPEN (retracted) and CLOSED (extended) states;

FIG. 5 is an elevational view, partly in section, taken in the direction of arrows V-V in FIG. 2;

FIG. 6 is an elevational view, partly in section, taken in the direction of arrows VI-VI in FIG. 4;

FIG. 8 is a side elevational view of FIG. 7;

FIG. 9 is a perspective view comparable to FIG. 2 except showing that the assemblage of machines composing the food-process line assemblage in FIG. 2 have been removed from the view, as for perhaps re-building a different assemblage of machines for processing a different food product, or else a similar or same food product in a different fashion;

FIG. 10 is a perspective view comparable to FIG. 4 and again like FIG. 9 showing that the assemblage of machines composing the food-process line assemblage in FIG. 4 have been removed from the view, as for perhaps re-building a different assemblage of machines for processing a different food product, or else a similar or same food product in a different fashion;

FIG. 11 is a perspective view comparable to FIG. 2 except showing a different assemblage of machines that will compose this food-process line;

FIG. 13 is an enlarged-scale perspective view of detail XIII-XIII as indicated in both FIGS. 1 and 2, and showing a coating-material supply machine providing supply of coating material to a food-product coating machine;

FIG. 14 is a perspective view of FIG. 5;

FIG. 15 is top plan block diagram view of a given food process line in accordance with the invention and showing a feedback control system in accordance with the invention receiving inputs of product weight at one or more positions along the line and outputting control signals to one or more coating machines along the line to raise or lower the applied coating-material weight to the food product undergoing coating processes along the line;

FIG. 16 is a top plan block diagram view comparable to FIG. 15 except showing the feedback control system in accordance with the invention servicing a different assemblage of machines composing this FIG. 16 food process line;

FIG. 17 is a top plan block diagram view comparable to FIGS. 15 and 16 except showing the feedback control system in accordance with the invention servicing a different assemblage of machines composing this FIG. 17 food process line;

FIG. 18 is a top plan block diagram view comparable to FIGS. 15-17 except showing the feedback control system in accordance with the invention servicing a different assemblage of machines composing this FIG. 18 food process line;

FIG. 19 is a perspective view comparable to FIG. 1 except showing the coating-material supply machine removed from view, the food-product coating machine deployed into an OPEN state for cleaning, one or more washing robots servicing the food-product coating machine, and which processes are under the automatic control of a controller, which sends various control instructions to the machines and robotic washers cooperatively, causing the machines to lift hoods and conveyors to better reveal for washing, and/or pivot to various angles so that the washing robot scan aim at the machine from various angles of attack;

FIG. 20 is a perspective view comparable to FIG. 1 except showing the food-product loading operations at the beginning of the food process line housed in its own climate controlled room;

FIG. 22 is a perspective view comparable to FIG. 1 except showing individual ones of the side panels of the tunnel equipped with isolation gloves; and FIG. 23 is an enlarged-scale perspective view of detail XXIII-XXIII indicated in FIG. 22.

FIG. 24A is a block diagram schematic of a generalized machine or process in accordance with the invention showing weight flowrate detection and/or approximation by various sensors, both on the infeed and discharge side, for control over both a primary process (eg., application of coating material) and a secondary process (eg., preparation of coating material, stepping up or stepping down the amount of coating material applied, adjusting the quality (eg., viscosity) of the coating material);

FIG. 24B is a block diagram schematic showing generalized configuration of a cantilevered conveyor belt suspended by two pairs of load cells;

FIG. 24C is a block diagram schematic showing generalized configuration of conveyor belts that are "simply supported" by an array of load cells (one representative load cell either suspending the conveyor belt or propping it is shown for each belt, but preferably there would be four such load cells);

FIG. 24D is a block diagram schematic showing generalized configuration of a conveyor belt with the upper food-product run disposed to scrape across the top of a stationary scale;

FIG. 24E is a block diagram schematic showing generalized configuration of optical sensors that provide signals for image analysis of surface features which then can be correlated with other parameters such as weight flowrate and/or coating material pick-up;

FIG. 24F is a block diagram schematic showing generalized configuration of a transfer conveyor with a central conveyor belt flanked by an infeed-end and discharge-end cantilevered weight-flowrate reporting conveyor belts, each propped by a pair of respective load cells.

FIG. 32 is a top plan block diagram view comparable to FIGS. 30 and 31 except showing still another different assemblage of machines composing this FIG. 32 food process line;

FIG. 33 is a top plan block diagram view comparable to FIGS. 30-32 except showing yet another different assemblage of machines composing this FIG. 33 food process line;

FIG. 71 is a perspective view of a second embodiment of robotic cleaning apparatus in accordance with the invention;

FIG. 72 is a perspective view of a third embodiment of robotic cleaning apparatus in accordance with the invention;

FIG. 77 is a side elevation block diagram view of an alternate embodiment of robotic cleaning apparatus in accordance with the invention, one which has a festooned bundle of permanent connections of any of communication lines, electric power lines, supply conduits and the like.

DETAILED DESCRIPTION OF THE PREFERRED EMBODIMENTS

Figure 12:
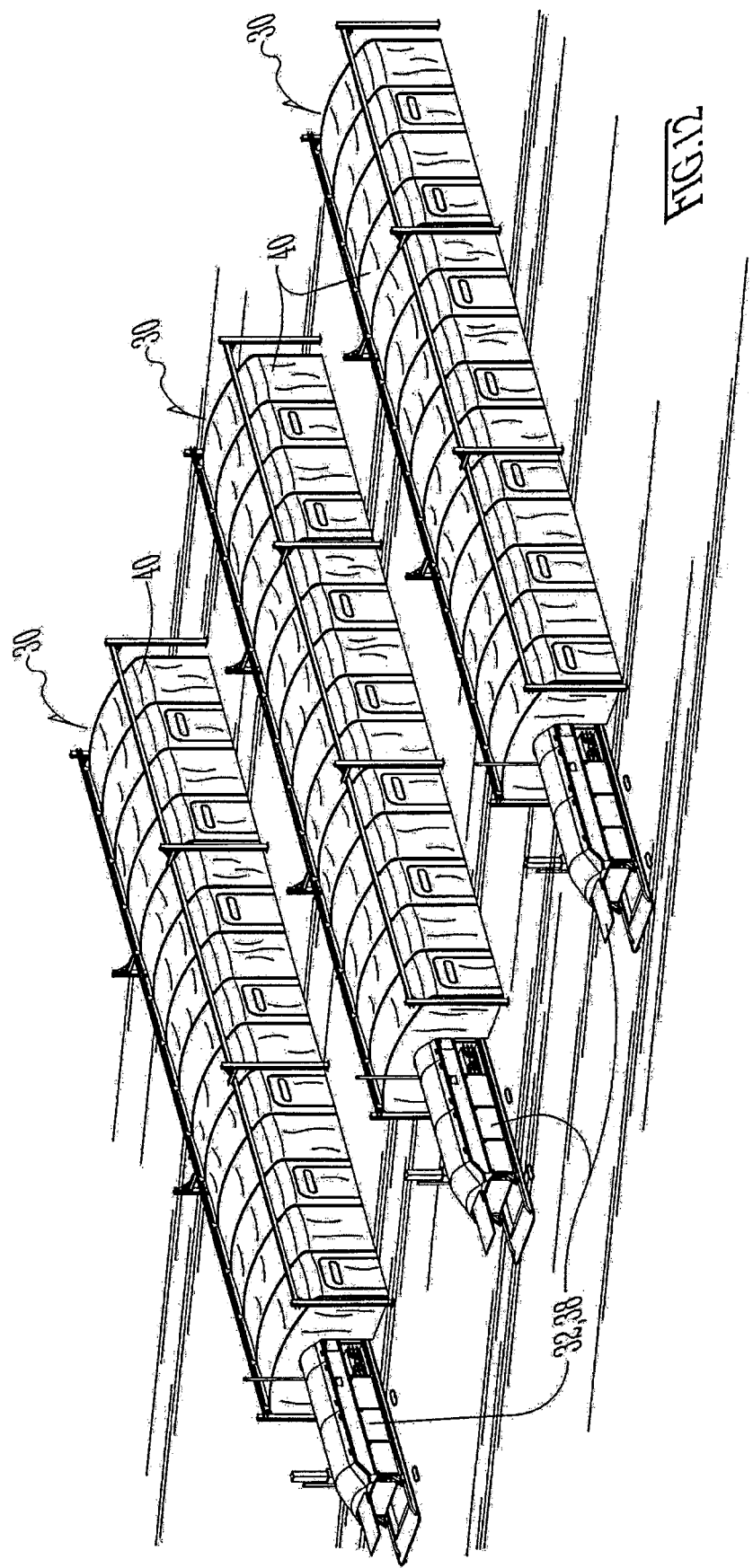
FIG. 12 is a perspective view showing that a single macro-environment (eg., commercial food processing plant, or, factory) can host multiple, enclosed food process lines in accordance with the invention.

FIGS. 1-4 show an assemblage 30 of food-process line equipment 32 (which according to context, includes transfer conveyor 56) in accordance with the invention. Each individual machine 32 (which in general, the transfer conveyor 56 is a specific example of the machines 32 in general, and see FIGS. 7 and 8 and the discussion connected therewith) is preferably mounted on rolling riding gear 34. Preferably the whole assemblage 30 is riding on a set of parallel tracks 36, something like small gauge railroad tracks 36. However, the last machine on the left in these views is a fryer 38. It is substantially heavier and has more supply line connections than the other machines. It might be preferable to not roll it onto to tracks 36.

The food process line 30 is substantially housed in an elongated enclosure (eg., tunnel 40). The tunnel 40 isolates a compact environment for independent environmental control of the environment surrounding the food process line 30 within a larger environment. The larger environment might be a commercial food processing plant operating a plurality of food process lines 30 simultaneously (see, eg., FIG. 12).

One food process line 30 might be utilizing an ingredient that might be considered an allergen to some people in the public. In order to contain the allergen from wafting over to other food process lines 30 and contaminating them, the food process lines 30 are enclosed and comparatively sealed.

The fryer 38 is left mostly exposed for the most part because of the heat it generates. It might not be good for the fryer 38 to house in an enclosed environment, or it might heat the tunnel 40 too high and start pre-cooking the food product when that is not wanted. It is also believed that soon after the food product enters the fryer 38, the allergens will have been set and pose little risk then of being a source of air borne contamination.

Figure 2A:
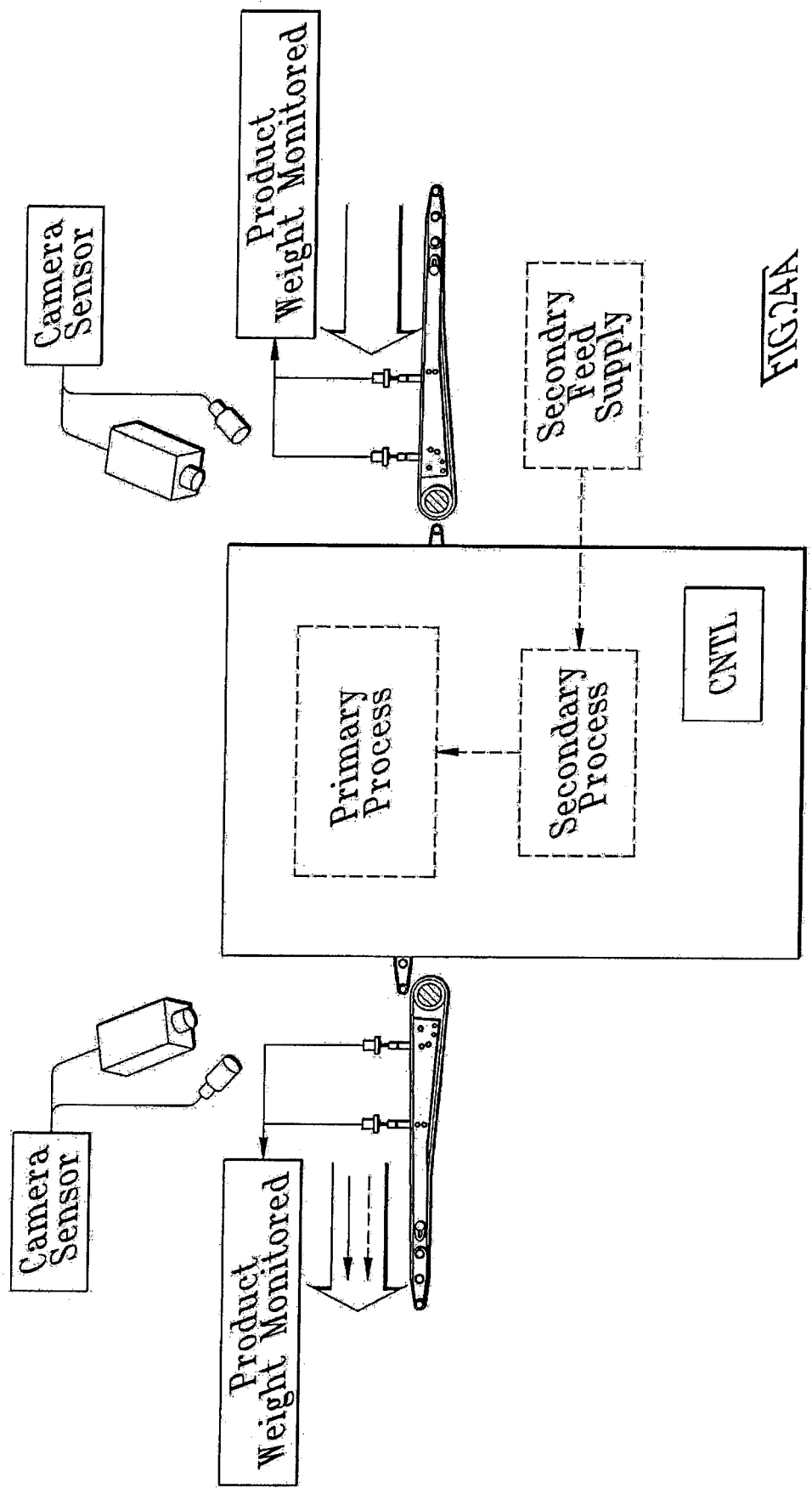
FIG. 2 is a perspective view comparable to FIG. 1 except showing that the tunnel-like enclosure comprises a construction of bellows-like soft materials like a transparent or semi-transparent polymeric material supported on spaced inverted-U shaped wickets, and which can be cycled between OPEN (retracted) and CLOSED (extended) states.

FIG. 2 shows that the tunnel 40 comprises a construction of bellows-like soft materials 44 like a transparent or semi-transparent polymeric material supported on spaced inverted-U shaped wickets. The tunnel 40 can be cycled between OPEN (retracted) and CLOSED (extended) states.

FIGS. 3 and 4 shows the tunnel 40 comprising a chain of telescoped inverted-U shaped half-pipes 46 (eg., like car ports in the US) constructed of hard materials like stainless steel or the like. Some or all of which are provided with access doors and/or windows. FIG. 4 shows this tunnel 40 that comprises a chain of telescoped half pipes 46 of hard materials can also be cycled between OPEN (retracted) and CLOSED (extended) states.

The tunnel 40 is elongated between an upline end 48 and a downline end 50. FIGS. 1-4 show the fryer 38 protruding from the downline end. The tunnel 40 has a partial end wall on the downline end 50 to form a close-fitting opening for the fryer 38 to extend through.

FIG. 5 shows the end wall of the upline end 48 of the tunnel 40. The end wall is provided with an elongated slit through which a thin conveyor extends, introducing pieces of food product to the food process line 30. Presumably, the food product pieces are raw pieces (uncooked). Raw pieces of chicken and most meats (excluding shellfish) are not thought to pose much of a risk of being a source for air borne allergens. Instead, the higher risk is with known ingredients or spices and the like in the coating materials. Indeed, a drum tumbler tumbling chicken pieces with dry particulate coating material is a pretty effective way to generate air borne particulate matter.

FIGS. 3 and 6 show duct work 52 and fans 54 to produce a slight negative pressure in the tunnel 40. The exhaust stacks 52 would preferably to connect to outdoor vents outside of the food process plant. Additionally, the narrow slits which are the inlets for the introduction for food product would be preferably surrounded by air nozzles providing a constant curtain of air blowing into the tunnel 40 (and into the negative pressure). This would provide an additional measure of containing the air borne particulate matter inside the tunnel 40 from escaping into the food process plant.

Figure 7:
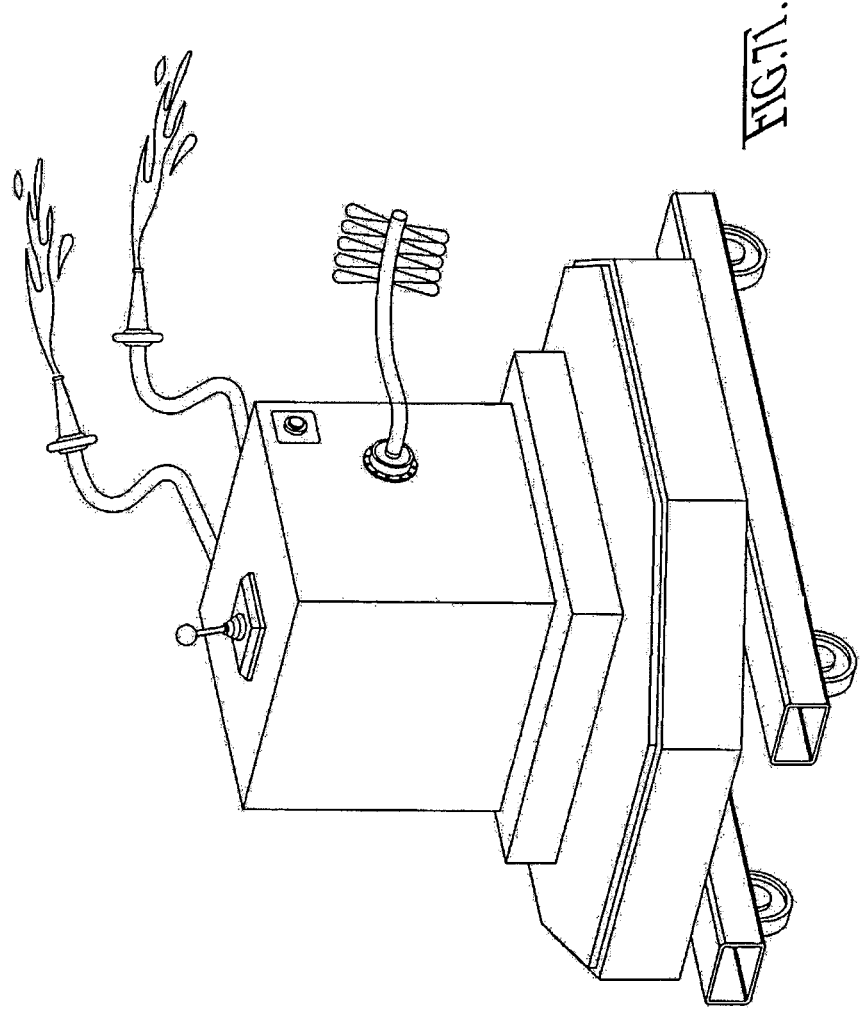
FIG. 7 is an enlarged-scale perspective view of one of the transfer conveyors of FIG. 2 or 4 showing that the respective nose rollers of the (upper) food-product carrying run of the wire mesh conveyor belt can extend and retract longitudinally so that the (upper) food product carrying run can expand or contract, whereby in the contracted state the turret portion of the transfer conveyor (and not the wheeled carriage) can pivot about a vertical axis for washing and/or maintenance operations.
Figure 7L:
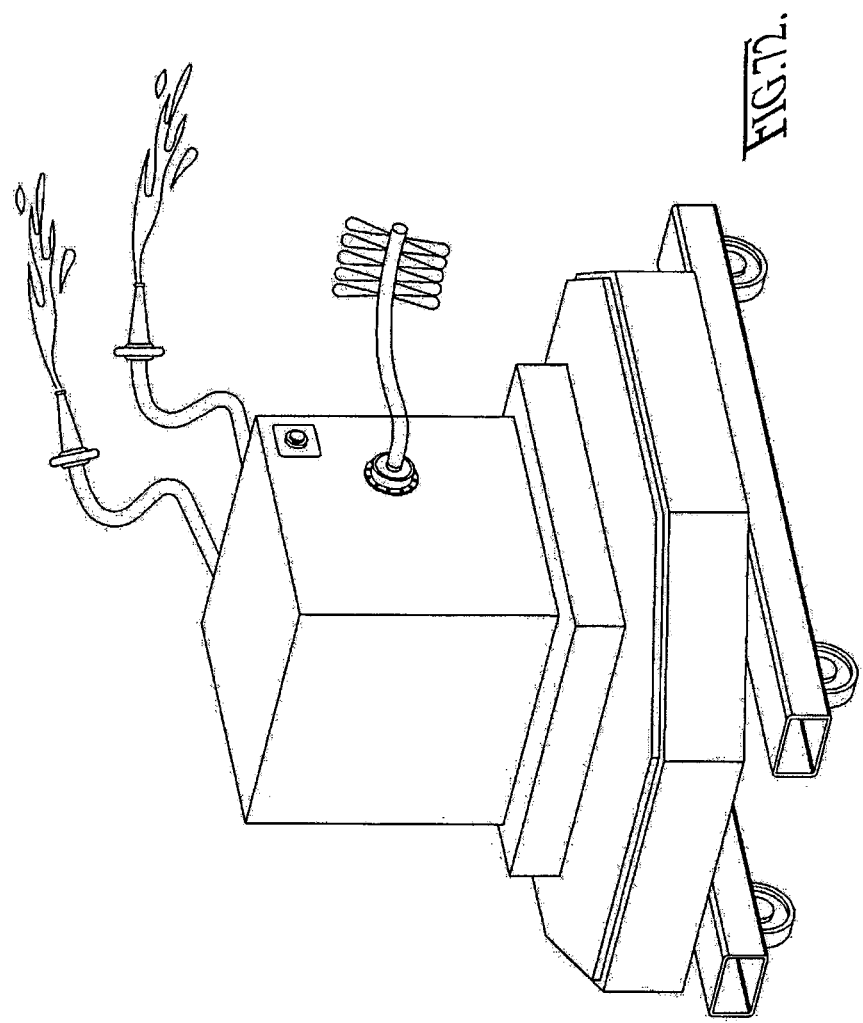

FIGS. 7 and 8 show a pivoting and reversibly expanding-contracting transfer conveyor 56 in accordance with the invention. There are several such transfer conveyors 56 shown in FIGS. 2 and 4.

A non-limiting example of a food process line 30 might comprise the following series of machines in a line. Let's assume that the food product is chicken tender pieces which are going to pre-dusted with spices and perhaps flour, dipped in batter and bread-coated twice, then fried. Hence the given food process line 30 might comprise the following series of machines:—
- a loader of (typically raw) food product;
- a transfer conveyor (ie., the first);
- a tumbling pre-dust coating machine;
- a transfer conveyor (the second);
- a batter coating machine;
- a tumbling bread crumb coating machine;
- a transfer conveyor (the third);
- another batter coating machine;
- another tumbling bread crumb coating machine;
- a transfer conveyor (the fourth); and
- a fryer (and likely a freezing and packaging process too).

It will be noticed in the above example that, the transfer conveyors follow dry coating processes, not wet ones (eg., the two batter coating machines). This keeps the transfer conveyor cleaner longer.

One aspect of operating food process lines 30 is that, since the output of the line is headed into the public food supply, the food process line 30 is subject to government inspectors (typically the USDA in the US). If the food process line 30 is found to fail an inspection, all the food product outputted by that run of the food process line 30 is subject to recall:—or that is, all the food product outputted since the last washing of the food process line 30.

So if the food process line 30 is washed once a week, and failure is discovered at the end of the week, then a whole week's worth of output product has to be recalled.

If in contrast, the food process line 30 is washed nightly, then the worst case scenario is that any recall will be limited to one day's worth of output product.

Hence, in choosing how frequently to wash, there is a balance of equities such as follows:—
- run the food process line 30 for as long as practical to optimize run time vs. down time (ie., down time as for performing washing operations);
- versus,
- wash frequently to reduce the risk of having a huge recall.

It is an object of the invention to provide improvements for decreasing the downtime for washing operations, thereby increasing the appeal of washing frequently.

Given the foregoing, the transfer conveyor 56 comprises a carriage 58, a turret 60 and pivot hardware 62 interconnecting the carriage 58 and turret 60. The carriage 58 is meant to be stationed as securely as possible in one fixed position in a food process line 30. The drawings show the carriage 58 riding on a rail by U-notched wheels or casters 34 which have locks to prevent rolling or any movement whatsoever, to the extent practical.

The turret 60 comprises spaced side panels spaced between a relatively solid bottom panel and a table plane which is characterized by parallel, longitudinally-elongated and laterally-spaced slide bars. There is a multiplicity of laterally extending rods, bars and/or axle shafts which extend between the spaced side panels, and give them rigidity. A subset of these comprise laterally extending course-changing means 64 for stretching an endless conveyor belt 66 in a circuit around such course-changing means. Example turning course-changing 64 means include without limitation rollers, pulleys or non-rotating nose bars and so on.

The endless conveyor belt 66 is preferably a wire mesh belt. Correspondingly, the slide bars defining the table plane comprise low friction synthetic or polymeric materials. The endless conveyor belt 66 courses a circuit comprising an (upper) food-product carrying run 68 and a (lower) return run.

FIG. 8 shows better that the belt 66 courses around four course-changing means 64 (eg., laterally-extending rollers). The upper food-product carrying run 68 of the belt 66 changes courses at opposite ends around respective nose rollers 70. The nose rollers 70 are held on movable brackets 72 which can be driven between extended and retracted by pinion gears 74 that mesh with respective rack gears 76 formed in the brackets 72. By movement of the brackets 72, this causes the transfer conveyor 56 to expand and contract between expanded and contracted extremes. Each bracket 72 also moves outward and inward in tandem with the respectively proximate nose roller 70.

Hence each traveling bracket 72 and its respective nose roller 70 move back and forth as a unit when the transfer conveyor 56 is in transition between a contracted state and an expanded state.

The transfer conveyor 56 is set up in an expanded state for food process line 30 processing operations. In contrast, the transfer conveyor 56 is converted to a contracted state for maintenance and/or washing operations. The transfer conveyor 56 in a contracted state can be pivoted without moving the machines immediately upline and downline from it. Those queued flanking machines can be left in place. When washing or maintenance is finished, the transfer conveyor 56 can be pivoted back and expanded such that the food process line 30 is quickly put back to its careful alignment. The pivot hardware 62 includes an annular bearing race.

FIGS. 9 and 10 correspond to FIGS. 2 and 4 respectively the assemblage 30 of food-process line machines have been removed from the view, as for perhaps re-building a different assemblage 30 of machines for processing a different food product, or else a similar or same food product in a different fashion. Indeed, FIG. 11 shows a food process line 30 except composed of a different assemblage 30 of machines.

FIG. 13 shows coating-material supply machine 78 providing a supply of coating material to a food-product coating machine 32. Preferably the supply machine 78 would likewise be located inside the tunnel 40.

FIG. 14 is a perspective view of the tunnel 40 of FIG. 5. The tunnel 40 has a variety of access doors allowing workers inside, as shown in FIG. 6.

FIGS. 15-18 are a series top plan block diagram views showing various assemblages of machines for food process lines 30 as well as showing various arrangements of feedback control systems 80 in accordance with the invention receiving inputs of product weight at one or more positions along the line and outputting control signals to one or more coating machines along the line to raise or lower the applied coating-material weight to the food product undergoing coating processes along the line.

FIG. 19 shows a food-product coating machine 32 deployed into an OPEN state for cleaning, and being attended by a floor-based washing robot 84 which rides on its own third track 82, with an overhead washing robot 86 idle at the moment. The washing processes under the automatic control of a controller 88, which sends various control instructions to the machines 32 and robotic washers 84,86 cooperatively, causing the machines 32 to lift hoods and conveyors 56 to better reveal themselves for washing, and/or pivot to various angles so that the washing robots 84,86 can aim at the machines 32 from various angles of attack.

It is an aspect of the invention to provide a maintenance robot 90 as counterpart to the floor-based washing robot 84. The maintenance robot 90 could traverse on the floor-based third track 82 and could remotely do any of the following service including without limitation:— check belt tension;
 adjust belt tension;
 change a belt;
 change a roller;
 change a bearing;
 change a shaft;
 change a shaft seal;
 change a sprocket;
 change a drive chain and/or other components of the drive system;
and so on without limitation.

Whereas it has been disclosed here that the machines 32, the floor-based washing 84 and maintenance robots 90 ride on floor-based tracks 36 or 82, and overhead tracks 82 for carrying robots 86 dangling from bridge cranes or the like, other mobile transit options are possible without limitation, like dynamic positioning (eg., how floating oil rigs position themselves), and so on and without limitation. That way, the parallel tracks 36 and perhaps even the turntables 62 can be dispensed with, and the machines 32 can drive themselves in 360° (degrees).

Another aspect of the invention is having a floor-based third track 82 running along the food process line 30. The third track 82 supports a floor-based traveling washing system 84. The robot 84 of the floor-based washing system runs on the track 82 alongside the food equipment to clean each machine 32 individually. Preferably this washing system 84 could operated while the tunnel 40 is CLOSED. Optionally, the combined ground-based and overhead washing systems 84 and 86 might do a rinse cycle while the tunnel 40 is CLOSED, then the tunnel 40 is OPENED so a final wash might be done with more robust equipment (like a miniature fire truck) or else be done manually.

Figure 21:
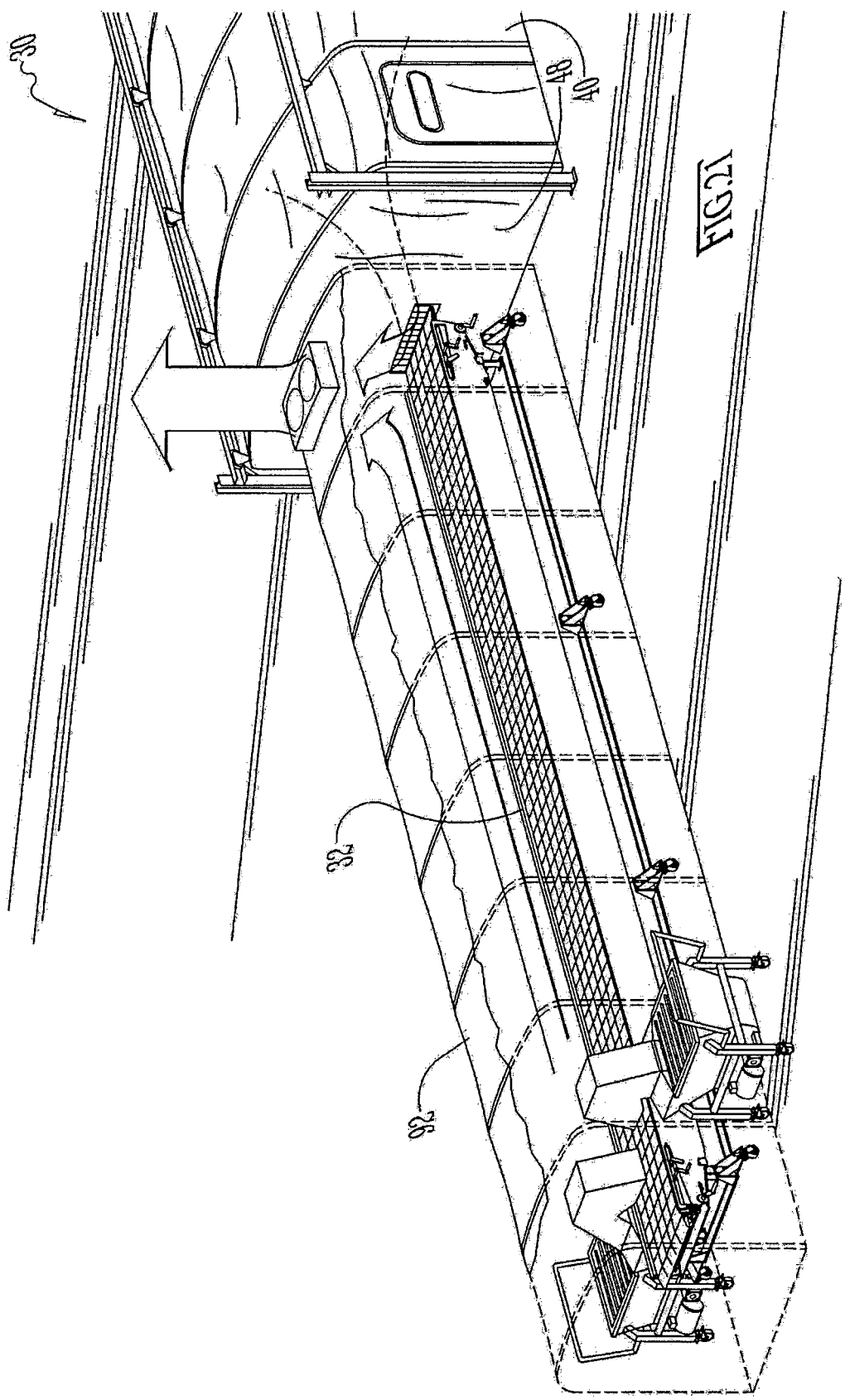
FIG. 21 is an enlarged-scale perspective view of detail XXI-XXI indicated in FIG. 20.

FIG. 20 is a perspective view comparable to FIG. 1 except showing the food-product loading operations at the beginning of the food process line 30 are housed in their own climate controlled room 92. FIG. 21 shows better the induction of a negative pressure in both the tunnel 40 and auxiliary room 92.

FIGS. 22 and 23 show that some portions of the sidewalls of the tunnel 40 may be equipped with isolation gloves 94.

FIG. 24A is a block diagram schematic of a generalized machine or process in accordance with the invention showing weight flowrate detection and/or approximation by various sensors, both on the infeed and discharge side, for control over both a primary process, eg.,:— application of coating material, and
  a secondary process eg.,:—
 preparation of coating material,
 stepping up or stepping down the amount of coating material applied,
 adjusting the quality (eg., viscosity) of the coating material; and so on.

FIG. 24B is a block diagram schematic showing generalized configuration of a cantilevered conveyor belt suspended by two pairs of load cells.

To focus attention on the downline outflow conveyor (ie., on the left side in FIG. 24A or on an enlarged-scale in FIG. 24B), it extends between an upline drive end driven by a drum motor and a downline nose end. The downline outflow conveyor is essentially cantilevered from the drum motor. The downline nose end is relatively free to pivot up and down relative the position shown in, for example.

It is preferable to use a drum motor in contrast to a standard motor configuration. Standard motors have their skin mounted stationary and their central axle is a rotor which rotates. With drum motors, the central axle is held stationary and the skin (the cylindrical casing) rotates. It is preferred to use electric-powered drum motors. The freedom of the downline outflow conveyor to rotate down to the ground is restrained by four load cells (eg., electric-signal generating weight sensors). Relative to the upline drive end of the downline outflow conveyor (eg., the axis of drum motor), there are a near pair of left and right load cells and laterally opposite from each other, and a distant pair of left and right load cells also laterally opposite from each other.

These load cells suspend the cantilevered downline outflow conveyor for reasons including in part just to hold it, unloaded and stopped (not running) in the position as shown in FIG. 24B.

When the cantilevered downline outflow conveyor is unloaded and stopped (not running), the load cells and will provide a signal corresponding to some force (eg., weight).

When the cantilevered downline outflow conveyor is still unloaded but now running, the load cells will provide a signal corresponding to a greater force. The differential between the two forces is the force required to oppose the centripetal force of the running drum motor.

All the foregoing signals are calibrated (or otherwise accounted for) to correspond to a tare weight. Now the load cells and are prepared for providing signals that can be corresponded to flow rate measurements.

Each load cell individually reports an independent signal. On both the left and right sides of the downline outflow conveyor, the near pair of gauges might report greater forces than the distant pair of gauges.

Note however that all four gauges might report different values. For example, the distant-left load cell might report the least value, the near-left load cell might report the second-least value, the distant-right load cell might report the third-least value, and the near right load cell might report the greatest value.

In use, it has been discovered that this set-up of load cells can detect when a fresh row of "N" lanes of food product pieces is deposited on the upline infeed end of the downline outflow conveyor, and correspondingly when the lead row of "N" lanes traverses past (drops off) the downline nose end of the downline outflow conveyor. Whereas it is assumed all "N" lanes in all rows are filled, that is not always true. Nevertheless, this set-up of load cells is so sensitive that such missing occupancy can be detected and the transit of that hole in the array can be observed by a computational device. As an aside, the computational device can provide indications of this to human observers according to programming.

Given the foregoing, an average weight (or mass) flow rate can be reckoned, and rate can be adjusted up or down accordingly as desired (within limits).

FIG. 24C is a block diagram schematic showing generalized configuration of conveyor belts that are "simply supported" by an array of load cells (one representative load cell either suspending the conveyor belt or propping it is shown for each belt, but preferably there would be four such load cells).

FIG. 24D is a block diagram schematic showing generalized configuration of a conveyor belt with the upper food-product run disposed to scrape across the top of a stationary scale.

FIG. 24E is a block diagram schematic showing generalized configuration of optical sensors that provide signals for image analysis of surface features which then can be correlated with other parameters such as weight flowrate and/or coating material pick-up.

FIG. 24F is a block diagram schematic showing generalized configuration of a transfer conveyor with a central conveyor belt flanked by an infeed-end and discharge-end cantilevered weight-flowrate reporting conveyor belts, each propped by a pair of respective load cells.

Figure 24G:
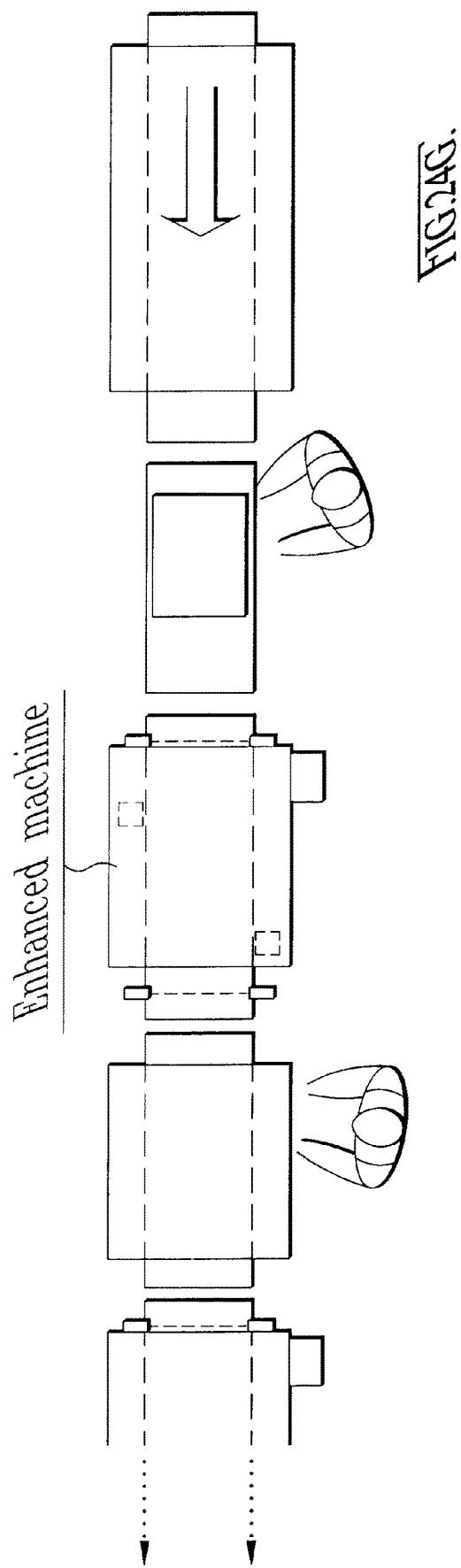
FIG. 24G is a block diagram schematic showing generalized configuration of a food-product production line with a heterogenous mix of at least one "smart" machine in a production line with "other" machines which are either non-enhanced or at least not communicative with the one "smart" machine in accordance with the invention.

FIG. 24G is a block diagram schematic showing generalized configuration of a food-product production line with a heterogenous mix of at least one "smart" (or in FIG. 24G, "enhanced) machine in a production line with "other" machines which are either non-enhanced or at least not communicative with the one "smart" machine in accordance with the invention.

The enhanced machine (or equipment) is preferably enhanced with any or all of the following, without limitation:—
- programmable control;
- data storage;
- weight flowrate detectors (infeed and/or discharge end);
- surface features optics;
- feed-back algorithms;
- throughput control;
- process control, eg.:—
    - dry material application control,
    - wet material application control,
    - moisture application control,
    - temperature control, &c.; and
- displays for operator discernment.

Thus the smart machine is flanked by "other" machines, which are either not "enhanced" (presumptively because the machines were not originally manufactured with enhancements) and/or not able to otherwise communicate at any rate.

The non-communicative machines and/or equipment only allow manual control by the (an) operator. Nevertheless, the "enhanced" machine provides suggestions over the control settings to the non-enhanced equipment by the display for the operator, or by other means.

The invention generally relates to mechanized food-process line equipment for industrial food process plants and, more particularly, to production flow-rate measurement options for industrial food process plants.

It is an object of the invention to provide to production flow-rate measurement options for industrial food process plants other than doing so manually.

For example, a production instruction may come down to some responsible party, who will be generically referred to here as the supervisory attendant (eg., superintendent). In some small plants, this could actually be the owner.

A representative example of food process line machines (stations) configured in a non-limiting example of a working food process line might comprise the following sequence (note that the last four machines add coatings and/or weight to the raw chicken tenders):
- a food-product (raw chicken tenders) load station (see, eg., FIG. 36);
- a food-product spreading station (see, eg., FIG. 36);
- a pre-dust coating machine (now see, eg., FIG. 32);
- a batter station (see, eg., FIG. 32);
- a bread-coating machine (see, eg., FIG. 32);
- a fryer (see, eg., FIG. 32);

and so on. The fryer might be set/limited to fry (par-fry) for a 20-30 second dwell time, which 'sets' the coatings for finished cooking later and elsewhere.

Assume the production instruction is to produce 100,000 'finished' pounds of chicken tenders over two consecutive 8-hour shifts (eg., start at 6:00 a.m. and run through the evening). The instruction further states that the percent of pick-up of the various coatings is to be 30%. Hence the superintendent will need to have transferred out of refrigerated storage a total of 70,000 pounds of raw chicken tenders (see FIG. 10), but over time and not all at once.

The production instruction is likely to be a lot more specific about the coatings pick-up. For example, the production instruction might specify:
- 3% pick-up of pre-dust;
- 10% pick-up of batter;
- 12% pick-up of final breading; and
- 5% pick-up of oil.

The fryer represents two distinct things that distinguish it from the other operations. First, the fryer is usually the bottleneck for the production run. The throughput rate through the fryer sets the flowrate value for the rest of the food process line. Second, the fryer doesn't always add weight. The fryer drives off moisture content and replaces that with oil content. There might be a net-zero gain in weight pick-up, or else some net gain like up to about 10%.

Regardless, the foregoing represents an example production instruction.

A basic manner in which the superintendent monitors (or has monitored) whether the pick-up values are within specification is to do so manually. That is, a timed sample of flowing food product is removed from the food process line and weighed. Samples are obtained preferably before and after each coating machine. The samples are weighed on scales. The weight difference the before and after samples allows calculation of pick-up percent. Each coating machine (each coating process) affords various techniques for adjusting the percent up or down (several of the these techniques will be mentioned below). It might take about ten minutes to complete a round of manually sampling, weighing and adjusting. But for at least one snapshot in time, the set values should fairly well agree with the specified values in the production instruction.

However, the shortcomings as distinct from the challenges are numerous, and both the shortcomings and challenges jeopardize the chances of a successful run. The risks of an unsuccessful run is that the whole batch will be downgraded, and bring a lower price (perhaps a much lower price) than if the whole batch were deemed to have met the specification. So that's a loss of potential yield, a loss of potential profitability. It might even represent a plain stark net loss.

So again, it might take about ten minutes to complete a round of manually sampling, weighing and adjusting: which provides for, in at least one snapshot in time, an idea of the set values. The machines may go out of specification as soon as the attendants walk away. The attendants might only take measurements once an hour to once a shift. Hence the food process line could run outside of specification for a long time before anybody knew any different.

Figure 34:
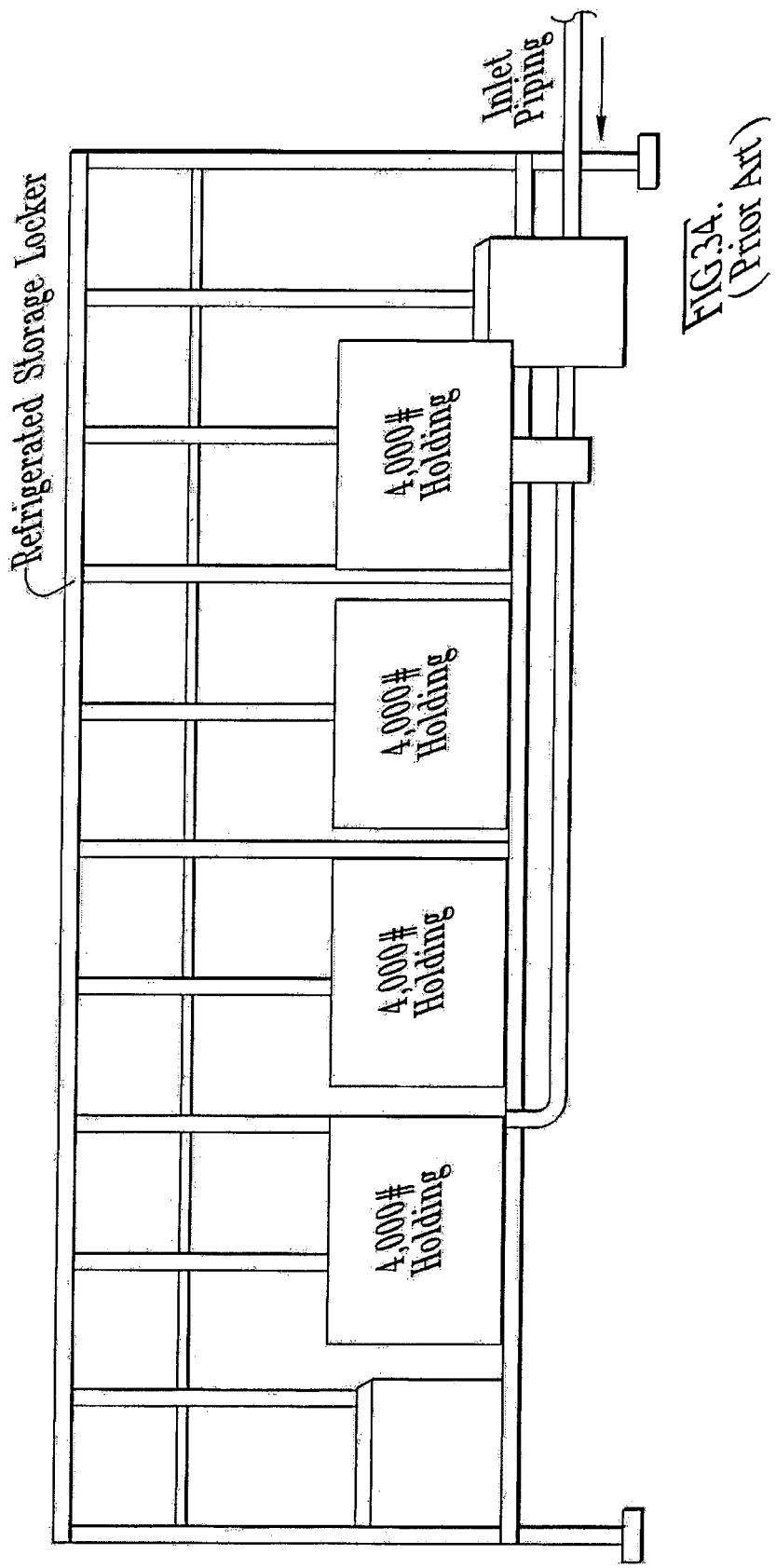
FIG. 34 is an elevational representation of a refrigerated storage locker in accordance with the prior art, situated inside a food processing factory (not shown) also in which resides a food process line in accordance with the invention, including any of the four non-limiting examples shown by FIGS. 30-33.

The superintendent is challenged right from the start to know the initial flowrate. FIG. 34 shows that the food processing plant is likely to have an on-site refrigerated storage capable of storing the 70,000 pounds of raw chicken tenders until called for. The raw chicken tenders are stored in these bulk open-topped cubic vats measuring 4 foot on a side with about 4,000-4,500 pounds capacity. The vats are typically weighed and the weight thereof is labeled on each vat.

Figure 35:
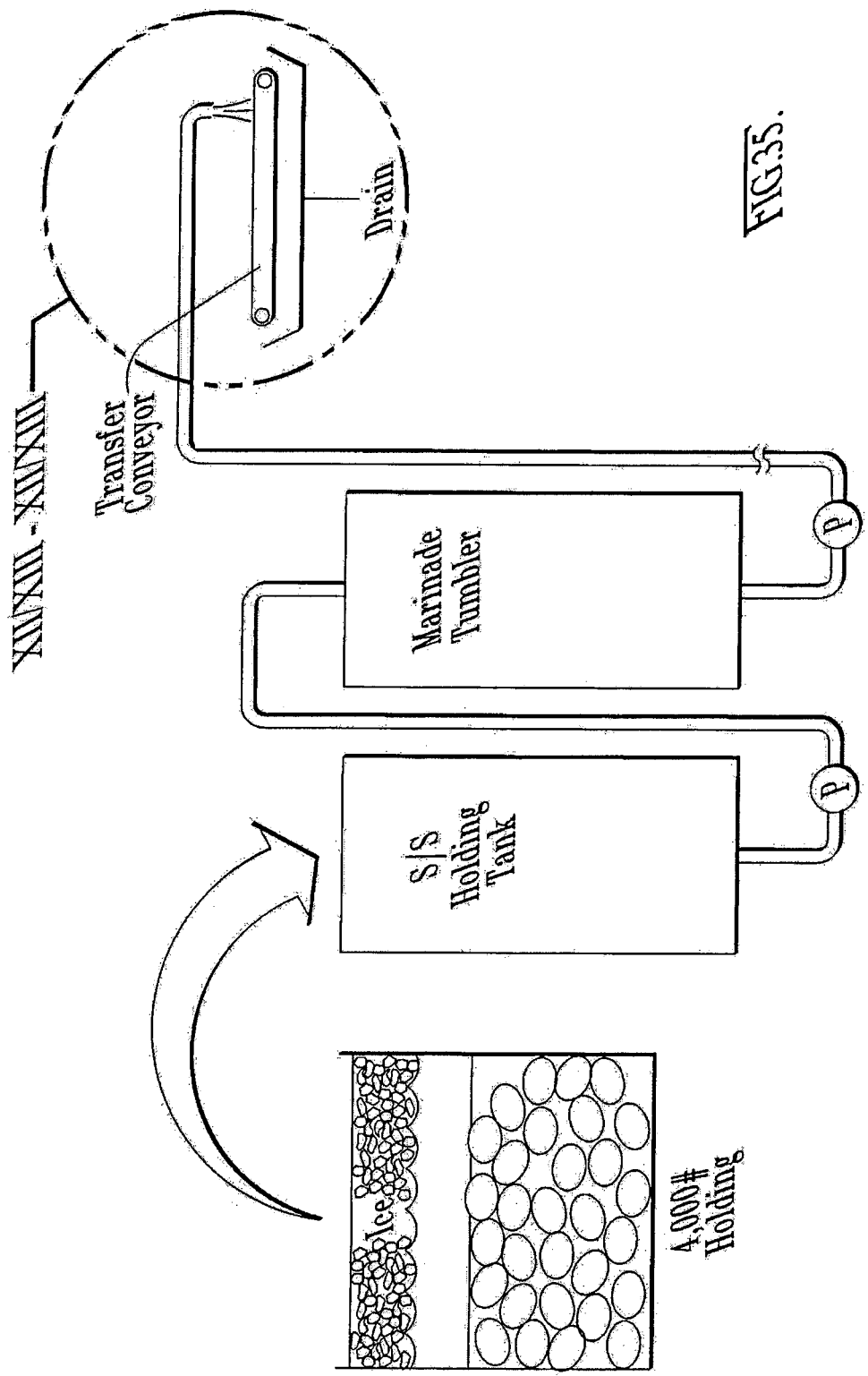
FIG. 35 is a block diagram showing an exemplary series of processes and operations that move batch-stored food product in the mass storage containers shown in FIG. 34 onto a loading zone of a food process line in accordance with the invention, including any of the four non-limiting examples shown by FIGS. 30-33.

However, the weight of chicken tenders is not the labeled weight minus the tare of the vat. The chicken tenders in the vat are originally covered in ice, which melts over time. Hence as FIG. 35 shows, the vats are a slurry of chicken tenders, ice and meltwater. A vat labeled at 4,000 pounds might only actually contain just 3,200 pounds of chicken tenders.

Workers will typically shovel off the ice, but keep the meltwater. The vats will be emptied into perhaps a first holding tank (the vats are typically plastic, but the holding tanks are typically stainless steel). The chicken tender slurry might then be moved to (pumped into) a marinade tumbler, the goal being to drive in as much marinade as possible. The marinade can be liquid but is more likely to be powder, so retention of the meltwater is useful. And the marinated product is pumped into perhaps one or more further downstream holding tanks until a last one functions as a hopper.

The manual way of determining initial start flowrate of raw chicken tenders is to monitor the drop in the hopper. If the level drops six inches in a ½ hour, this might roughly correspond to 1,000 pounds. So that value corresponds to 2,000 pounds of raw tenders input per hour, or perhaps 32,000 pounds over 2 shifts. The superintendent should order for a second food process line to be run in tandem with this first one, and the values project that the two lines together still will not achieve the target of 100,000 finished pounds of product with 30% pick-up, per the production instruction.

Given the foregoing, it is an object of the invention to provide improvements and/or options to overcome some of the shortcoming and challenges of the prior art that were briefly sketched above.

A number of additional features and objects will be apparent in connection with the following discussion of preferred embodiments and examples.

FIGS. 25 through 28 show a first embodiment of mechanized food-process line equipment arranged in a working food process line and furnished with production flow-rate measurement options in accordance with the invention. FIG. 29 is comparable to FIG. 28 except showing an alternate embodiment of a production flow-rate measurement option in accordance with the invention.

Figure 25:
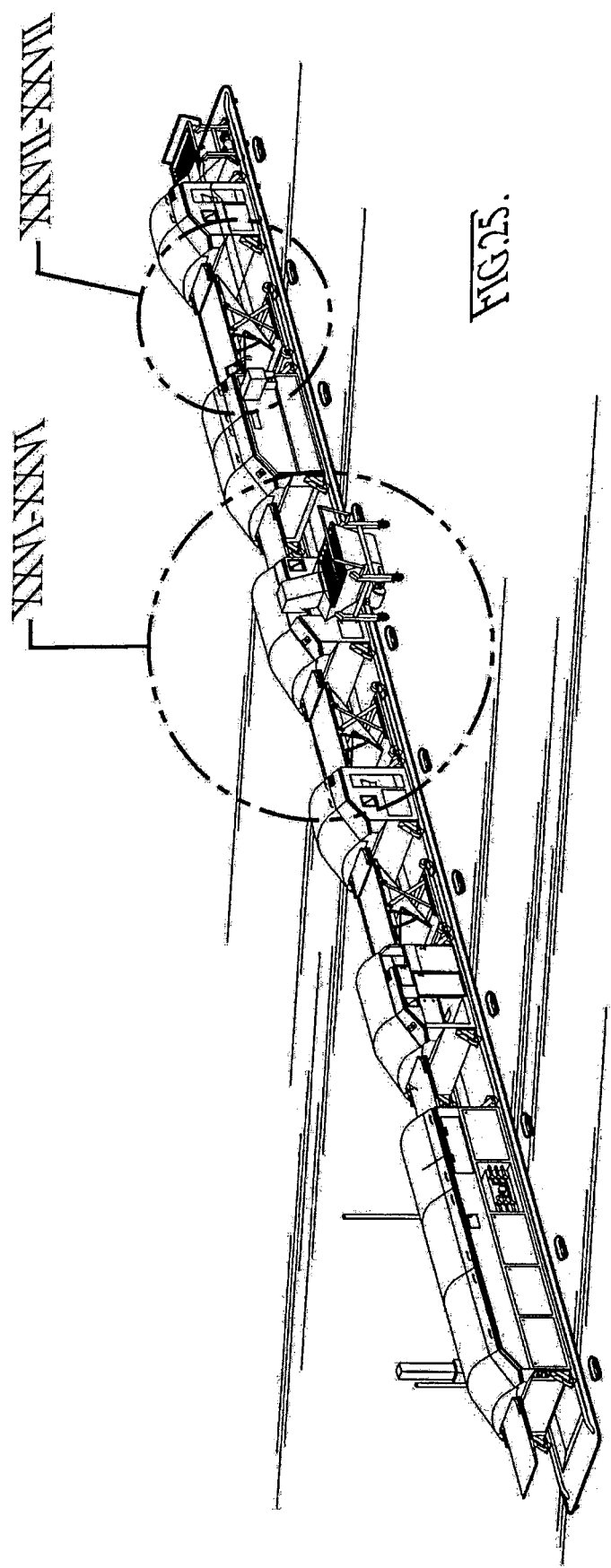
FIG. 25 is a perspective view of mechanized food-process line equipment arranged in such a working food process line and furnished with production flow-rate measurement options in accordance with the invention.
Figure 26:
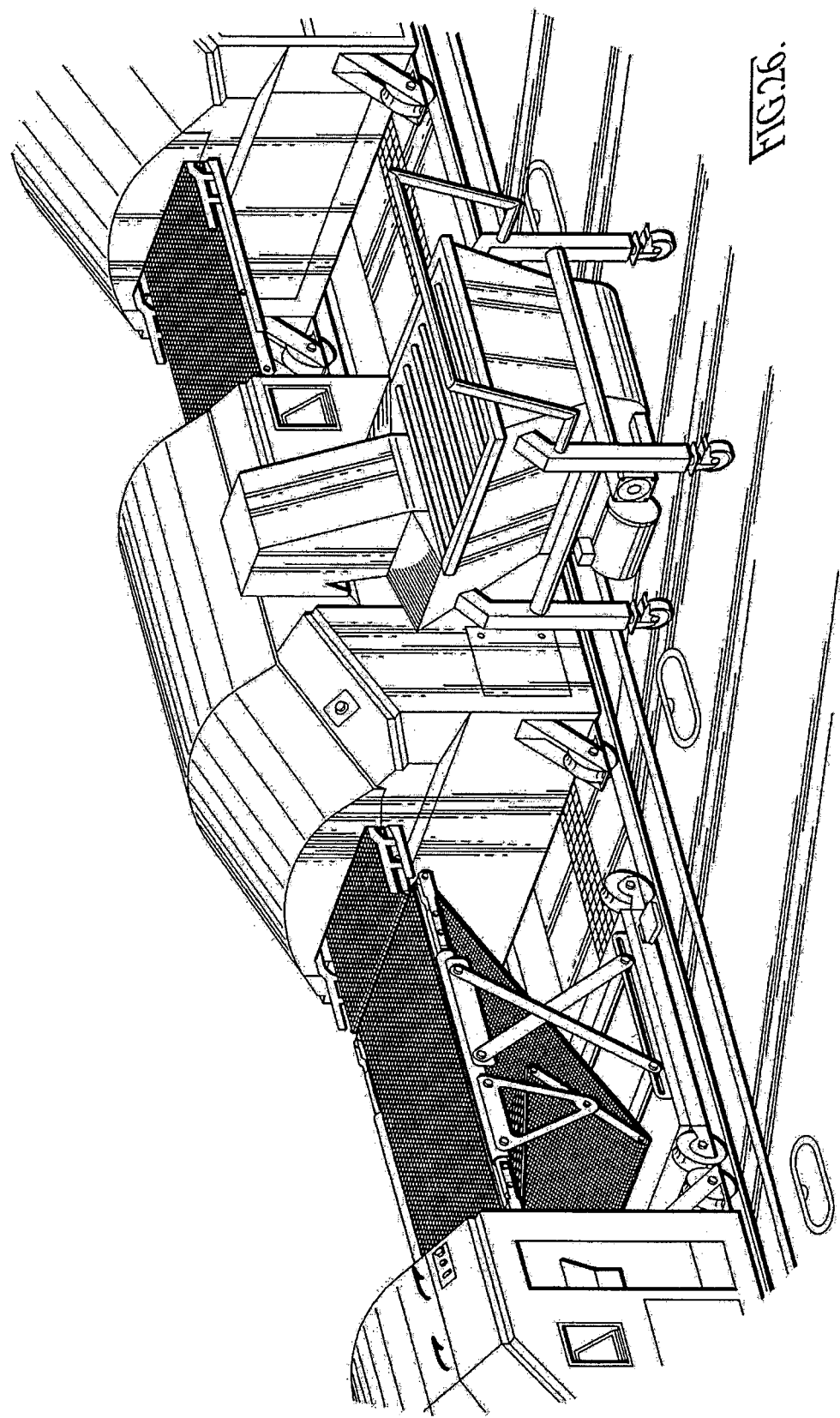
FIG. 26 is an enlarged scale perspective view of detail II-II in FIG. 25.
Figure 27:
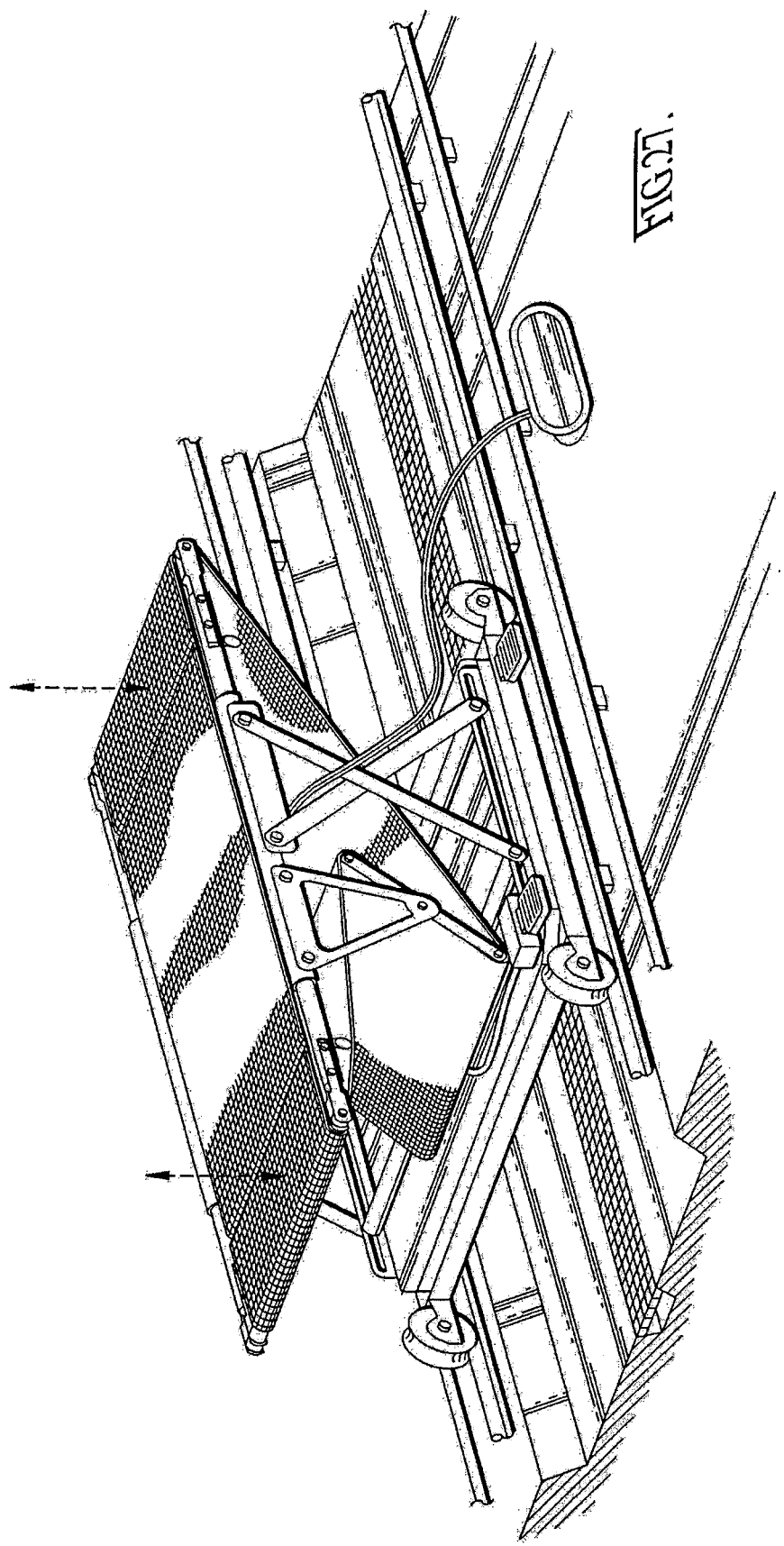
FIG. 27 is an enlarged scale perspective view of not only detail III-III in FIG. 25 but also detail III-III in FIG. 26 showing a first embodiment of a weighing transfer conveyor in accordance with the invention provisioned with scales at each nose end.

To turn to FIG. 25, it shows a series of food process line machines configured in a non-limiting example of a working food process line.

In series, from right to left, the machines comprise:
a food-product load station;
a food-product spreading station;
a weighing transfer conveyor;
a pre-dust coating machine;
a weighing transfer conveyor;
a batter station;
a weighing transfer conveyor;
a seasoning-applying coating machine;
a weighing transfer conveyor;
a Panko-crumb coating machine;
a weighing transfer conveyor;
a fryer;
and so on. The fryer might be set/limited to fry for a 20-30 second dwell time, which corresponds to a par-fry.

FIGS. 30-33 provide several non-limiting examples of food process line configurations in accordance with the invention and show a like the series of stations/machines as outlined above.

It is an object of the invention to provide the supervisory attendant (superintendent) of weight-flow (~mass-flow) of product across any weighing transfer conveyor in accordance with the invention for real-time feedback of weight-flow values.

Figure 28:
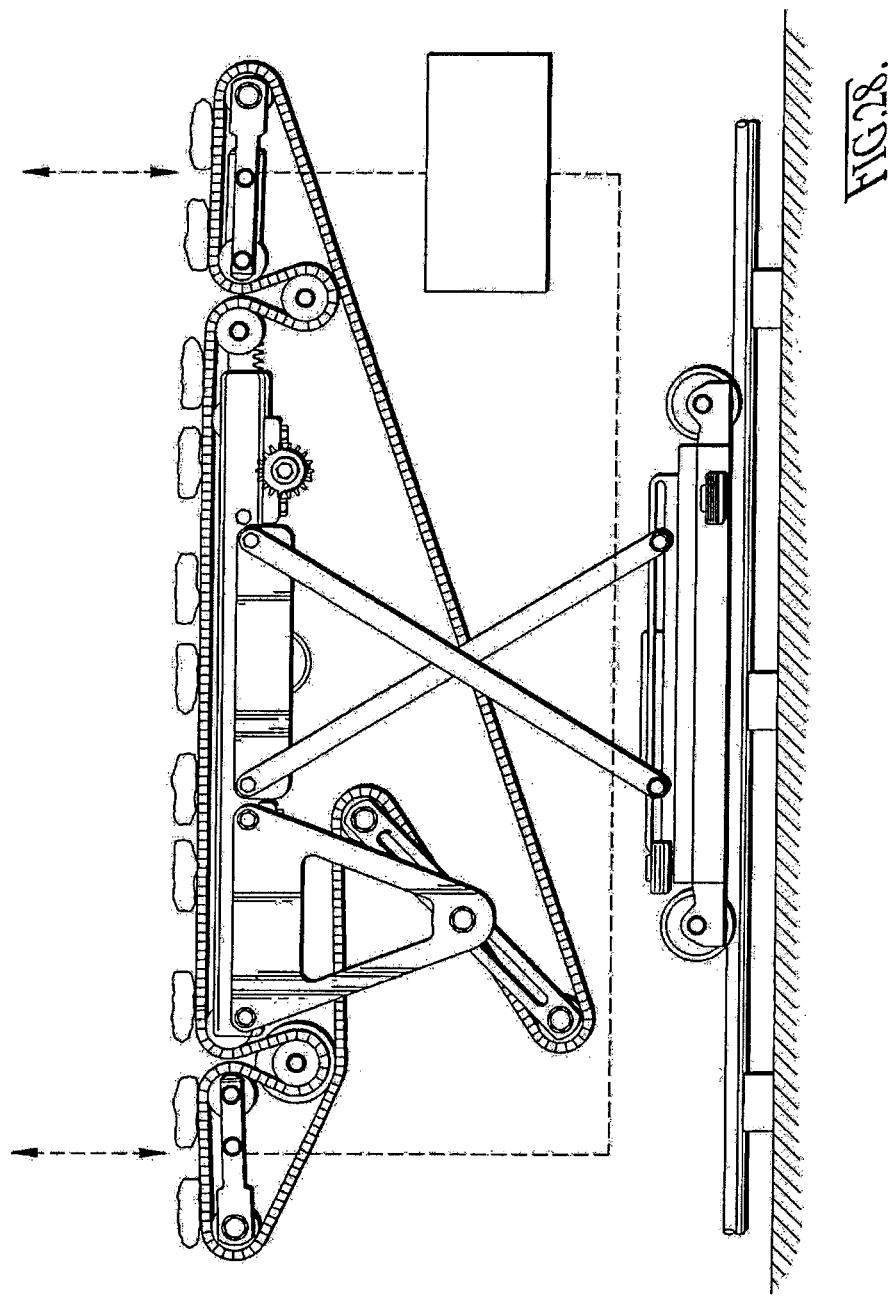
FIG. 28 is a side elevational view of FIG. 27, again showing the first embodiment of a weighing transfer conveyor in accordance with the invention, and as provisioned with scales at each nose end.
Figure 29:
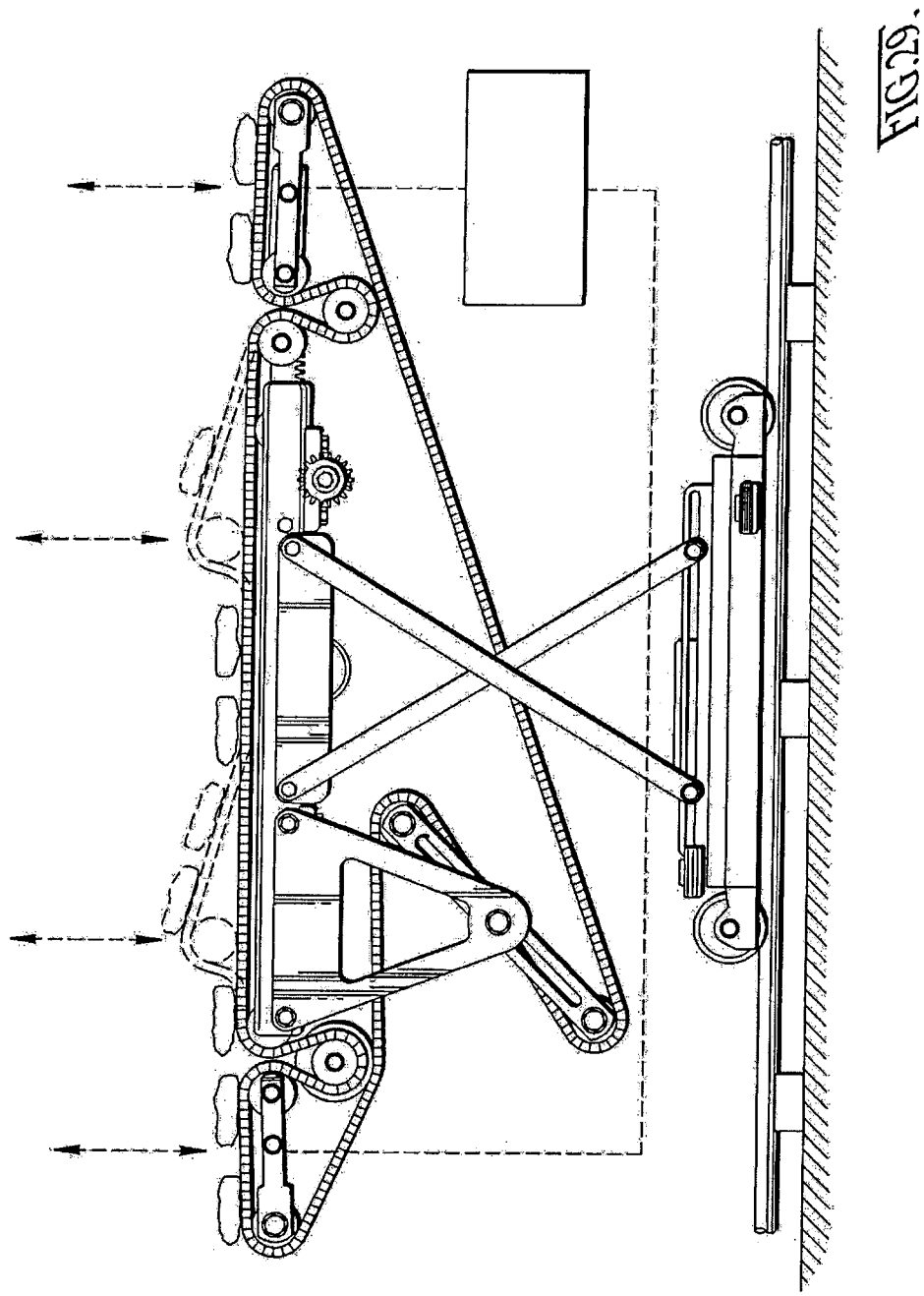
FIG. 29 is a side elevational view comparable to FIG. 28 except showing an alternate embodiment of a weighing transfer conveyor in accordance with the invention.
Figure 30:
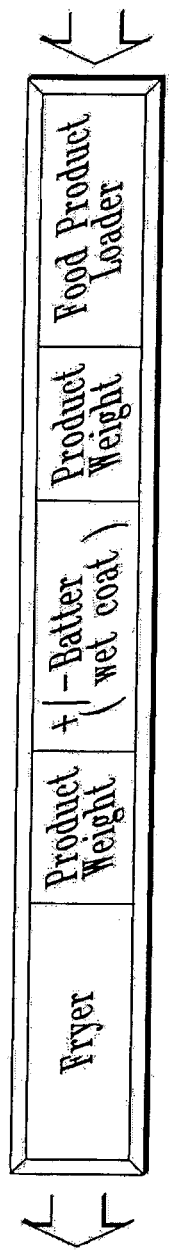
FIG. 30 is top plan block diagram view of a given food process line in accordance with the invention and showing a weighing transfer conveyor as exemplified by FIG. 27 indicated in the diagram as a block identified as "PRODUCT WEIGHT.
Figure 31:
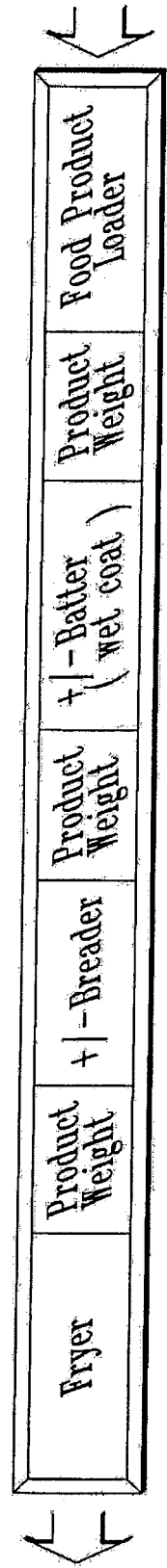
" FIG. 31 is a top plan block diagram view comparable to FIG. 30 except showing a different assemblage of machines composing this FIG. 31 food process line.

FIG. 28 shows a weighing transfer conveyor in accordance with the invention. The weighing transfer conveyor has scales at both the intake end (eg., to the right in the view) and outflow end (to the left in the view). For example, the intake scale might indicate that past one or another coating machine, there was a 5% pick-up of coating material. However, the outflow scale might indicate that some coating material shook off across the transit of the weighing transfer conveyor, showing that there was only a 4.8% pick-up of coating material remaining.

Preferably, several such weighing transfer conveyors are used to space the various process machines apart.

FIG. 29 is a side view comparable to FIG. 28 except showing an option with flip or agitation sections so this could possibly remove some coating material and then, when the proper weight pick-up is reached as specified in the production instruction, the food product conveyance is returned to a flat transit mode.

Hence the weighing conveyor not only provides weight-flowrate measurements at both the intake and outflow nose end, the weighing conveyor might be equipped with various provisions to increase or decrease the pick-up percent.

The following techniques can be employed to adjust the pick-up percent. For dry particulate coatings, techniques which would increase pick-up percent include:
add more breading material into the coating machine;
add finer breading material into the coating machine;
use a compression roller at the outflow;
increase the pressure of the compression roller;
turn down the flowrate of air knives at the outflow;
add moisture to the food product at the inflow;
reduce/eliminate shaking/thumping/agitation of the outflow; and so on.

For dry particulate coatings, techniques which would decrease pick-up percent include:
eliminate addition of moisture to the food product at the inflow;
decrease the pressure of the compression roller;
increase shaking/thumping/agitation of the outflow to knock-off excess;
increase the blast from the air knifes to blow-off excess; and so on.

For batter, a further technique for adjusting increase or decrease of pick-up percent includes thickening or thinning the batter. The batter is readily made thicker by adding more powder. In the other direction, the batter is readily made thinner by adding more water.

FIG. 35 shows an exemplary series of processes and operations that move batch-stored food product in the vats shown in FIG. 34 onto a loading zone of a food process line. Ice is preferably scooped/shoveled off the surface of the slurry in the vats. The meltwater is left behind with the chicken tenders. The vat is poured/emptied likely into a holding tank of some sorts at the start. The contents of the holding tank are pumped into a marinade tumbler. The meltwater is put to good use to dissolve the powdered marinade. The outflow of the marinade tank is pumped/poured onto a landing conveyor of some sort. The conveyor will be of an open construction like a chain link belt, or drag link belt and so on. The excess water at this point is allowed to flow through the belt and into an underlying drain. Food product has hence landed onto the initial inflow end of the food process line.

Figure 36:
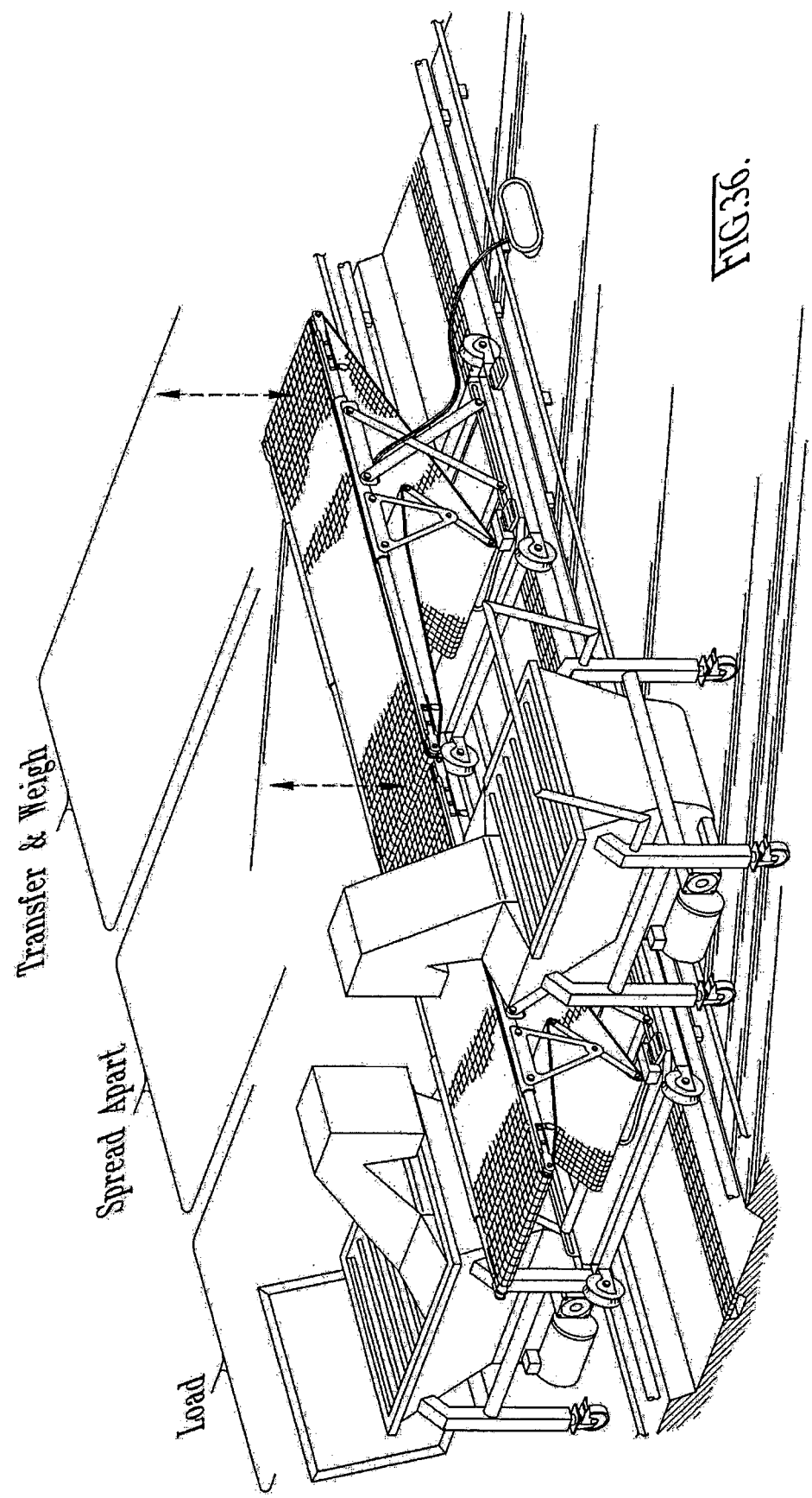
FIG. 36 is a perspective view functionally representing detail XII/XIII-XII/XIII in FIG. 35, showing one version of operations where a food product loader in accordance with the prior art is loading food product (which food product is not in view) onto a landing conveyor in accordance the prior art, which landing conveyor affords implementation of some form of product spreading technology whether it be manual or otherwise, and which landing conveyor discharges to a weighing transfer conveyor in accordance with the invention.

FIG. 36 shows one version of what can functionally transpire in detail XII/XIII-XII/XIII in FIG. 35. A food product loader in accordance with the prior art is loading food product (which food product is not visible in the view) onto a landing conveyor also in accordance the prior art. The landing conveyor affords a longitudinal run of conveyor transit which allows some implementation of some form of product spreading technology. This can be manual. Typically two to three workers would stand on each side of the conveyor and more product apart so that single pieces are not touching each other. There are other options to accomplish this which are not manual.

Here in FIG. 36, the landing conveyor discharges to a weighing transfer conveyor in accordance with the invention, and the weight-flowrate measured here is the inflow flowrate of raw chicken tenders. The flowrate can be adjusted practically immediately at start-up to the max flowrate of the 'bottleneck' of the food process line. This was mentioned above to be nearly always the maximum throughput flowrate through the fryer.

Figure 37:
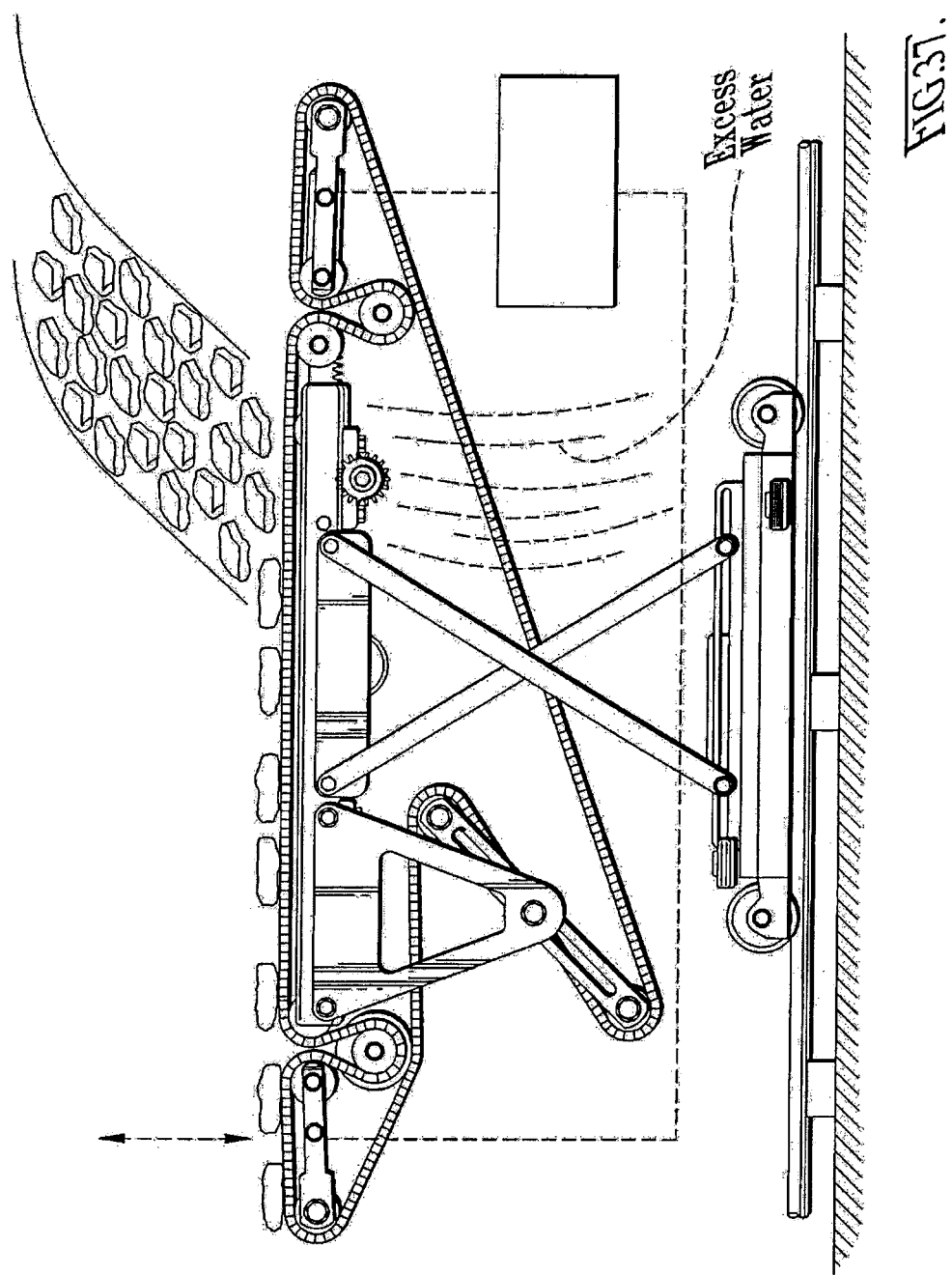
FIG. 37 is a side elevational view comparable to FIG. 28 and providing an alternate functional representation of detail XII/XIII-XII/XIII in FIG. 35, showing another version of operations where the loading of raw food product is directly onto a weighing transfer conveyor in accordance with the invention, it likewise having a mid-span which affords implementation of some form of product spreading technology whether it be manual or otherwise.
Figure 38:
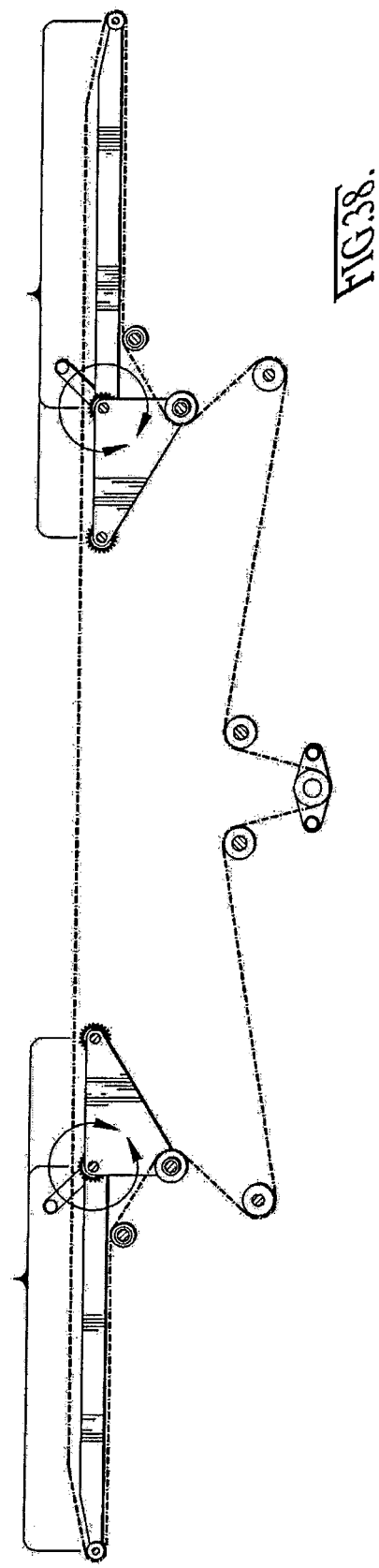
FIG. 38 is a schematic side elevation view of a further embodiment of a weighing transfer conveyor in accordance with the invention, shown in an expanded position.
Figure 39:
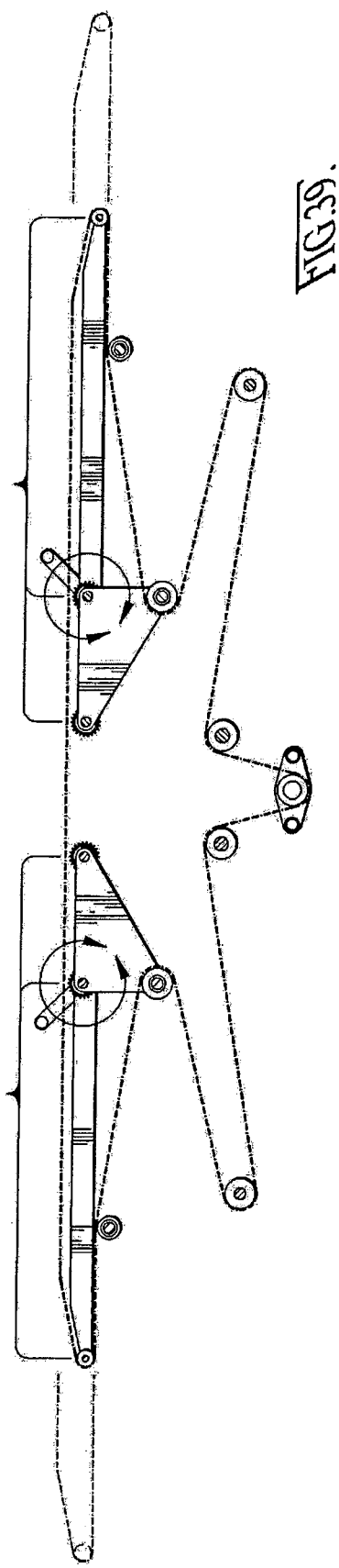
FIG. 39 is a schematic side elevation view comparable to FIG. 38 except showing the further embodiment of a weighing transfer conveyor in accordance with the invention in a contracted position.

FIG. 37 shows an alternate option to FIG. 36. FIG. 37 is a side elevational view comparable to FIG. 28 and providing an alternate functional representation of detail XII/XIII-XII/XIII in FIG. 35.

Here in FIG. 37, the loading of raw food product is poured/pumped directly onto a weighing transfer conveyor in accordance with the invention. Wherein the weighing transfer conveyor likewise has a mid-span which affords implementation of some form of product spreading technology, whether it be manual or otherwise.

For weighing conveyors situated before or after coating apparatus, the mid-span can accommodate the mounting of some technology like thumpers/shakers/agitators for knocking off excess, or knives for blowing off excess, or else compression rollers for driving in the particulate to increase retention, misters to moisten the product and so on.

FIGS. 28 and 29 are schematic side elevation views of a further embodiment of a weighing transfer conveyor in accordance with the invention. FIG. 28 shows it in an expanded position. FIG. 29 shows this further embodiment of a weighing transfer conveyor in accordance with the invention in a contracted position.

Figure 40:
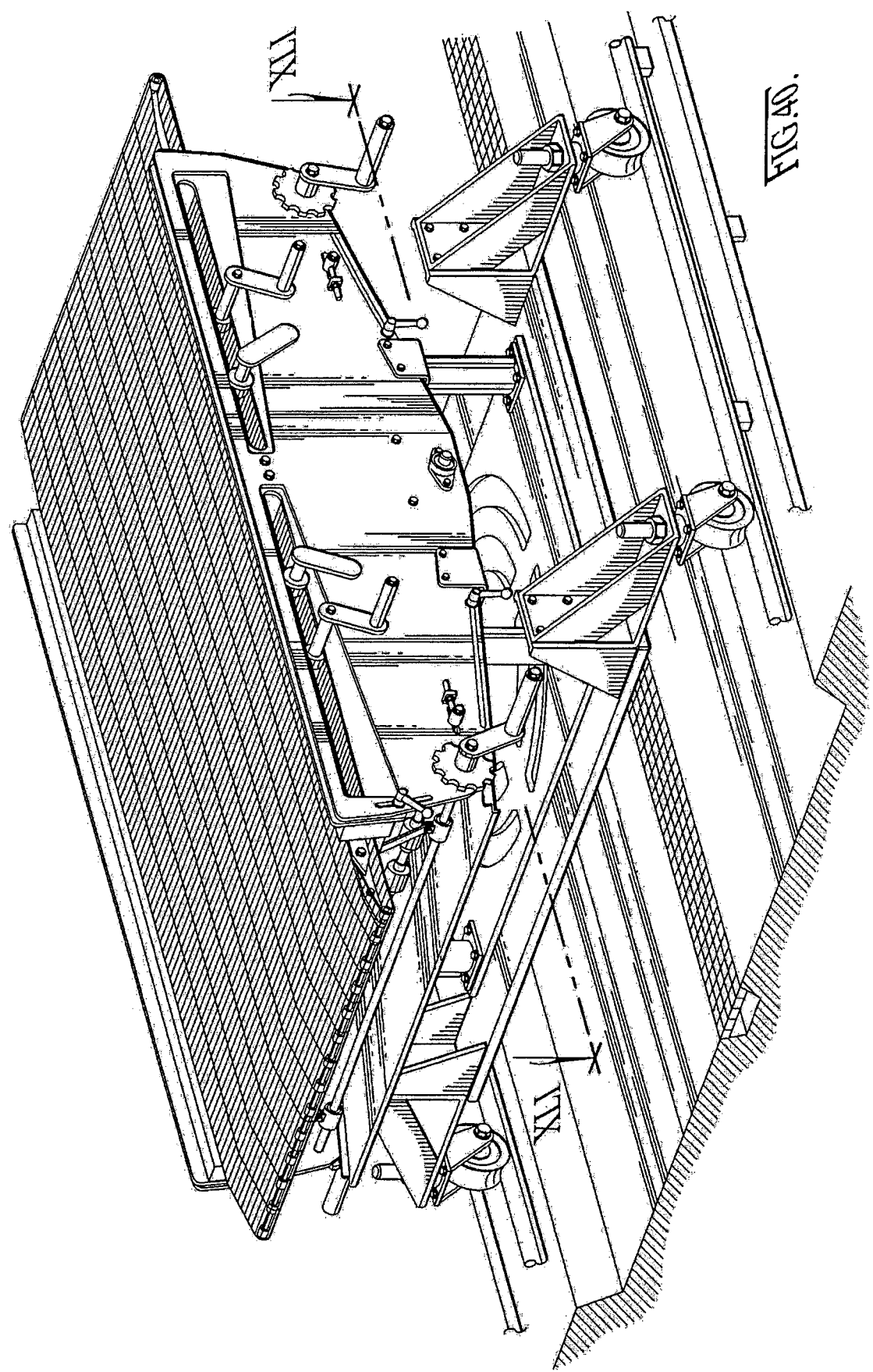
FIG. 40 is a perspective view of this further embodiment of a weighing transfer conveyor in accordance with the invention, showing that it further allows pivoting about a vertical axis in addition to being reversibly expanding-contracting.

FIG. 40 shows that this further embodiment of a weighing transfer conveyor in accordance with the invention, showing that it further allows pivoting about a vertical axis in addition to being reversibly expanding-contracting.

Figure 41:
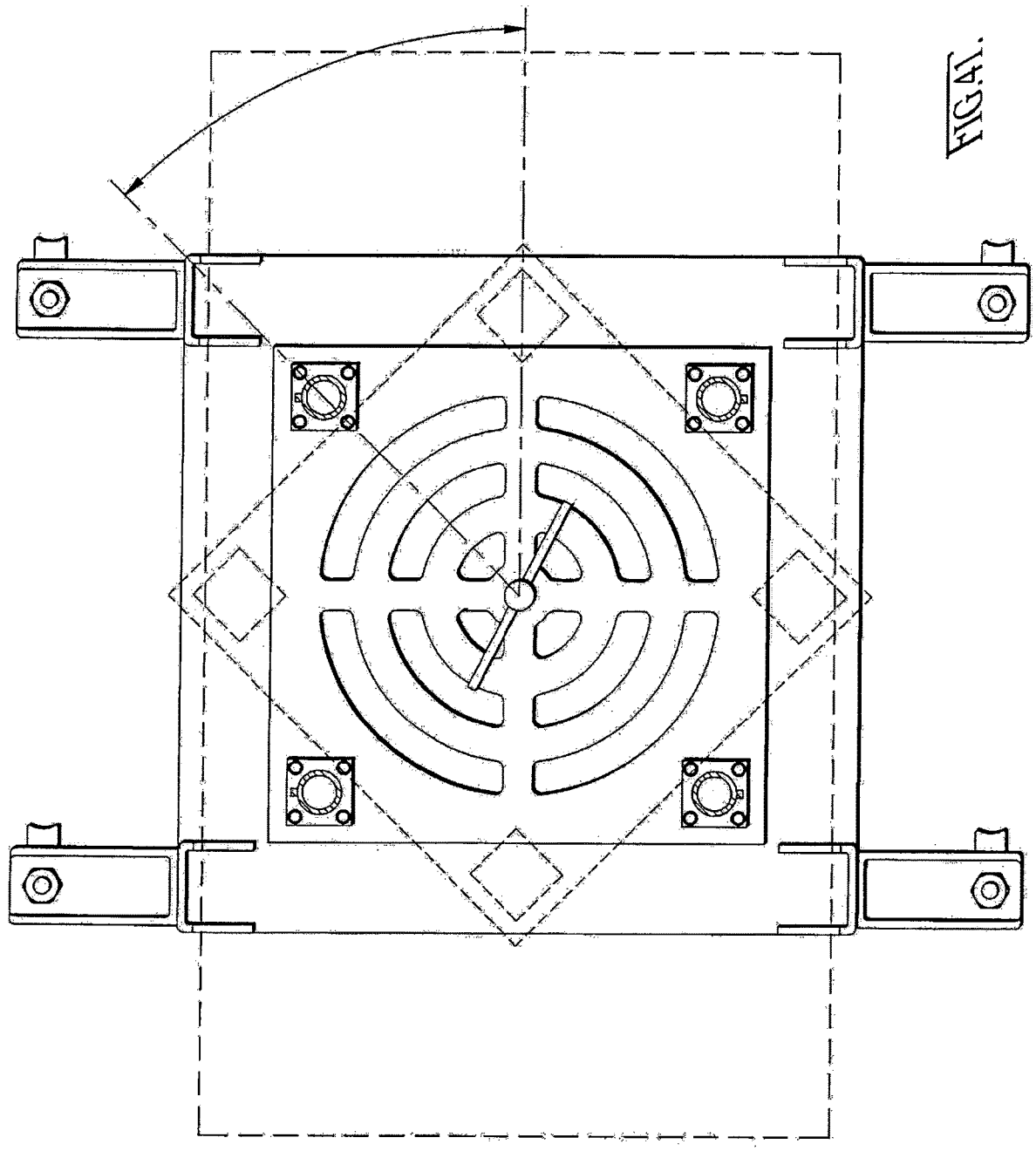
FIG. 41 is a top plan view, partly in section, taken in the direction of arrows XVII-XVII in FIG. 40.

FIG. 41 is a top plan view, partly in section, taken in the direction of arrows XVII-XVII in FIG. 40, showing aspect of the pivot hardware/turntable.

Figure 42:
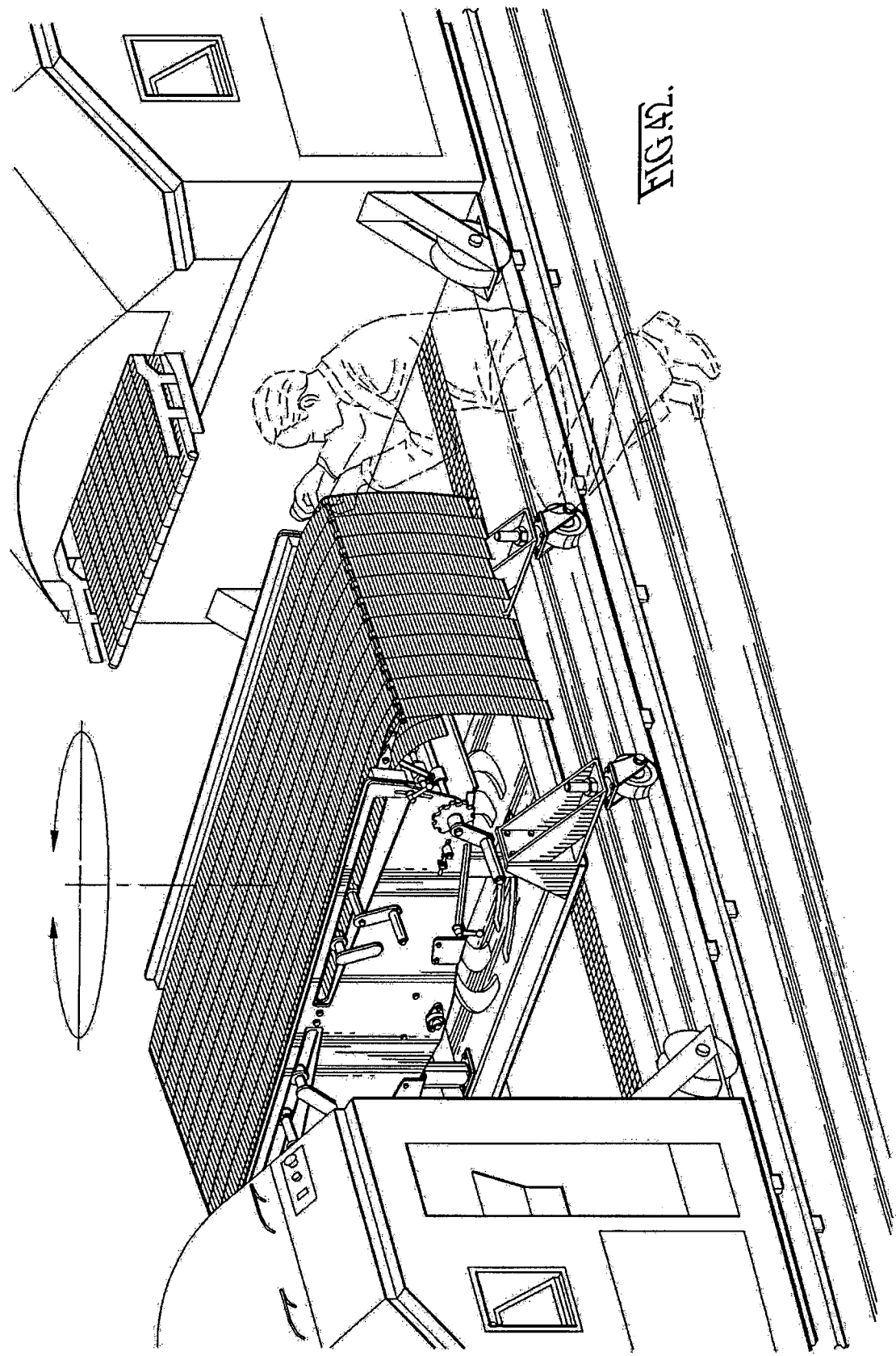
FIG. 42 is a perspective view comparable to FIG. 40 except showing the transfer conveyor in accordance with the invention situated between two machines which do not pivot and showing the transfer conveyor in accordance with the invention pivoted obliquely away from the main axis of the food process line.

FIG. 42 is a perspective view comparable to FIG. 40 except showing the transfer conveyor in accordance with the invention situated between two machines which do not pivot and showing the transfer conveyor in accordance with the invention pivoted obliquely away from the main axis of the food process line.

The role for pivoting is not during production run time, but during down time. The advantages of pivoting enable cleaning and/or maintenance operations without breaking apart the food process line as a whole.

FIGS. 43 through 46 show a mechanized food-process line equipment arranged in such a working food process line and furnished with internal washing provisions for food process line machines in accordance with the invention.

Figure 43:
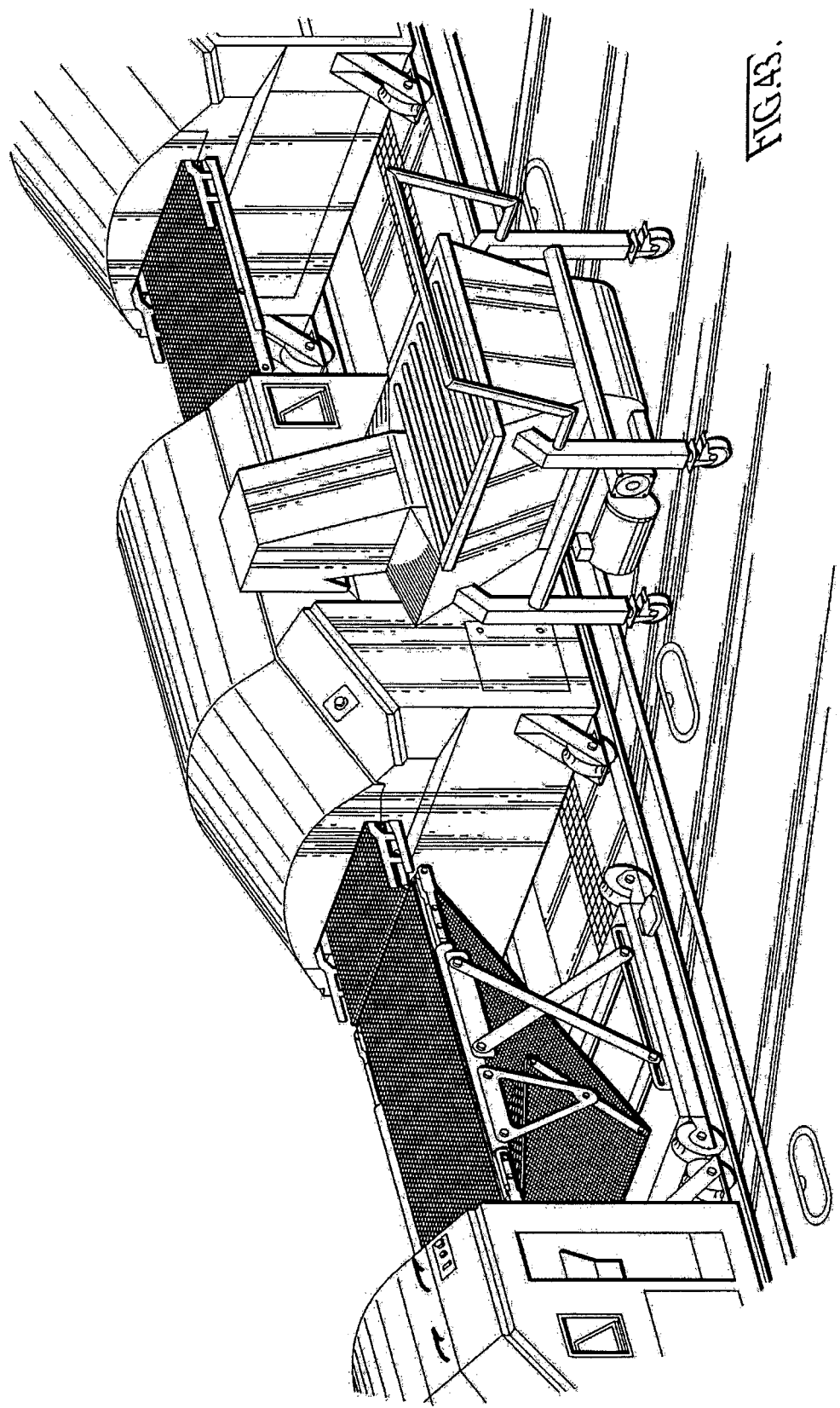
FIG. 43 is a perspective view of mechanized food-process line equipment arranged in such a working food process line and furnished with internal washing provisions in accordance with the invention for food process line machines of which this illustrated one is a non-limiting example of such machines.

FIG. 43 a series of food process line machines configured in a non-limiting example of a working food process line. The floor of the plant has cleaning-fluid supply lines below the ground level of the plant, with spaced provisions to hook-up hose or other suitable conduits between the cleaning fluid supply and a particular machine.

Figure 44:
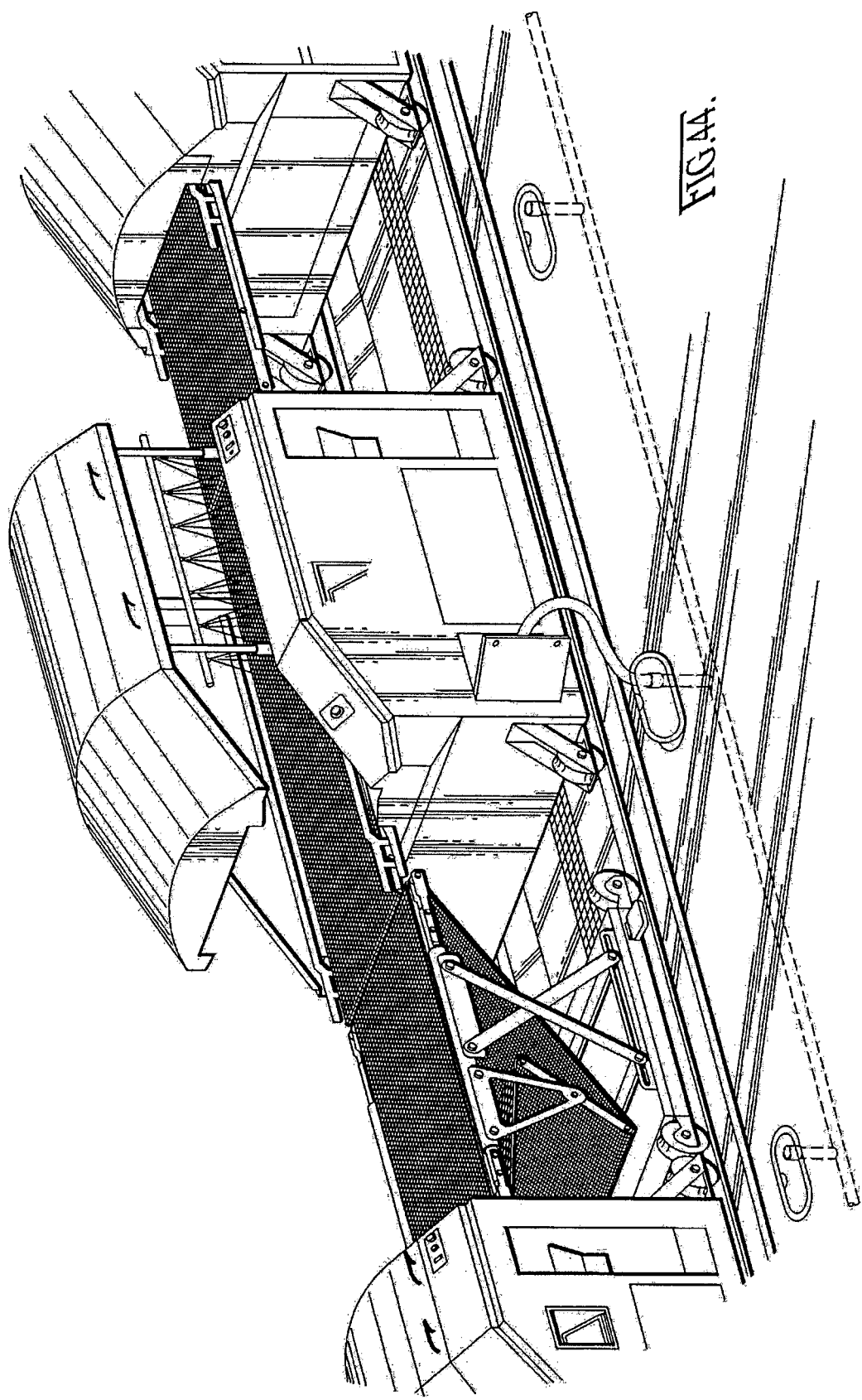
FIG. 44 is a perspective view comparable to FIG. 43, perhaps of a slightly different model of dry-particulate coating apparatus, and also being a differing view by showing the hoods and/or various panels opened-up (or deployed open) for cleaning operations.

FIG. 44 shows a slightly different machine, this perhaps being a coating machine for a dry-coating material such as seasoned flour, or spices, or Panko crumb and so on. The machine is opened up for cleaning operations. The machine opens itself upon a given control instruction. A worker (not shown) has taken a flexible hose and coupled the machine to the machine's internal cleaning-fluid circuit with the in-ground cleaning-fluid supply lines.

Figure 45:
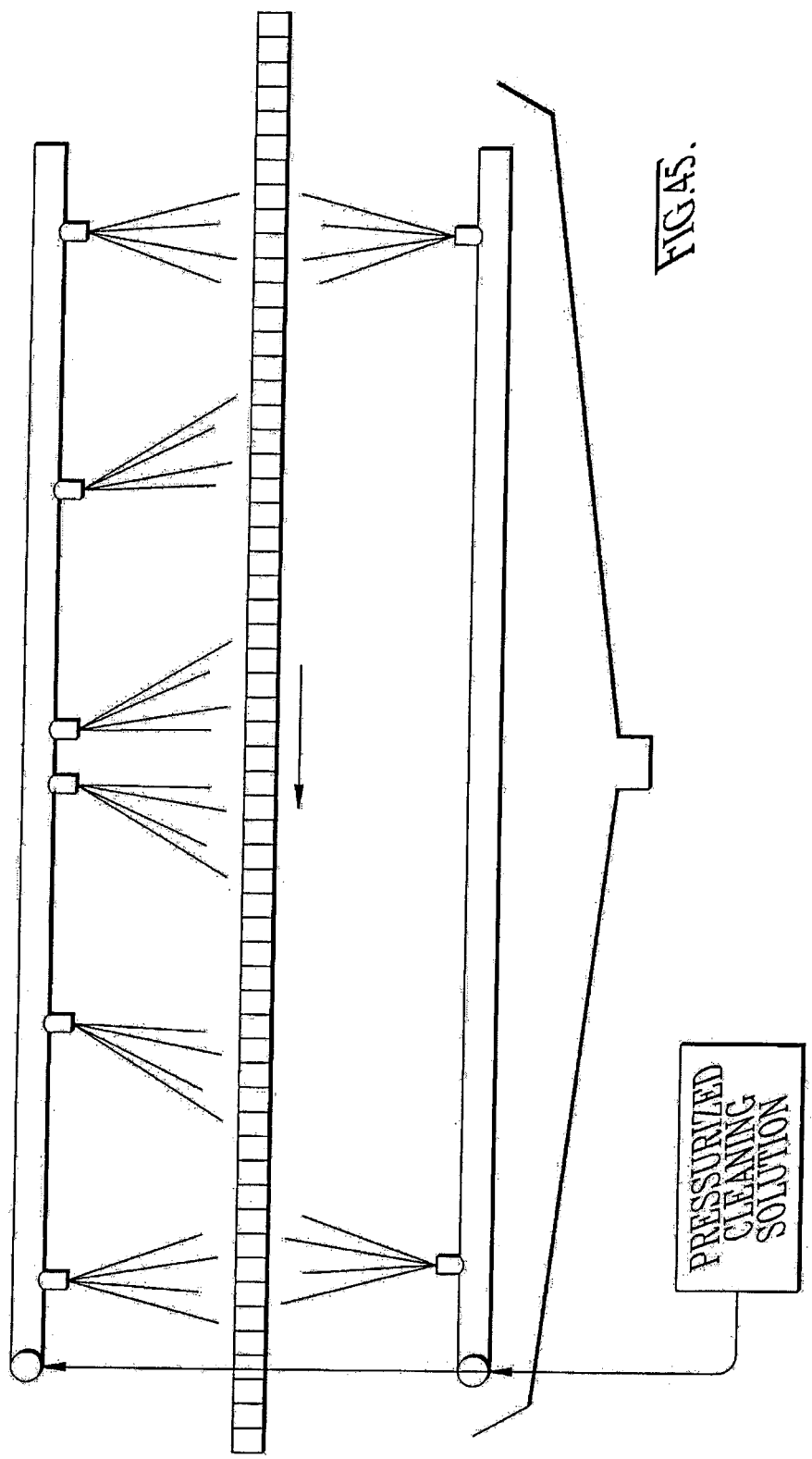
FIG. 45 is a schematic side elevation view of FIG. 44.
Figure 46:
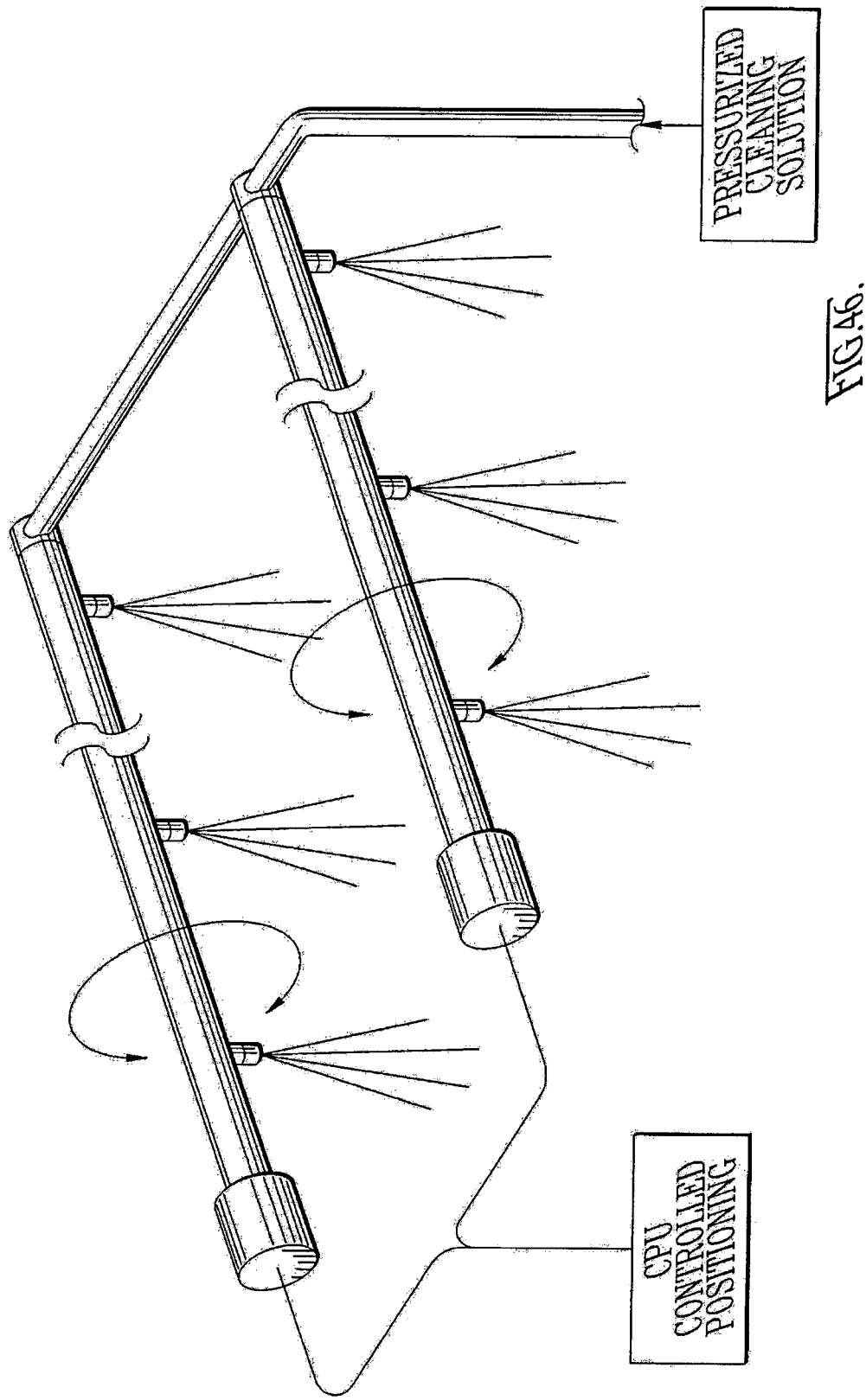
FIG. 46 is a schematic perspective view of FIG. 45.

FIGS. 45 and 46 show better the machine's internal cleaning-fluid circuit, albeit schematically. An array of jet nozzles are permanently retained within the machine, in both the opened up state as shown by FIG. 44, or the closed state for operation as shown by FIG. 43. The nozzles are strategically aimed and agitated to accomplish targeted cleaning without the variance of human operators. Again, FIG. 46 shows that preferably, the nozzles are not static but can be driven in some motion.

FIGS. 47-55 comprise a series of pictorial views showing the strategic distribution of spraying provisions with a representative coating apparatus for mechanized food process lines.

Figure 47:
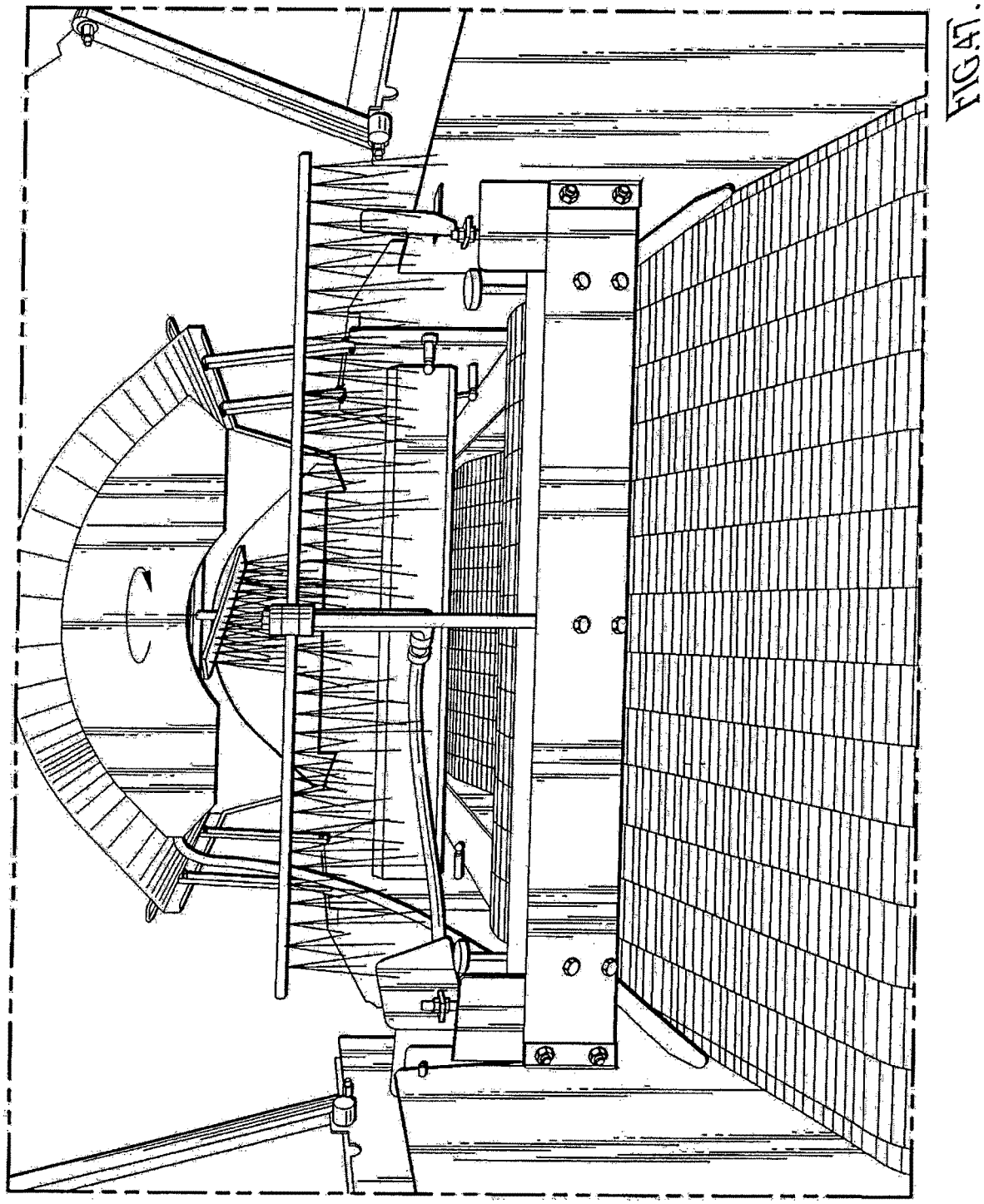
FIG. 47 is a pictorial view along the central axis of this coating machine, and from a plane above the food-product carrying upper run of the main conveyor, with the hood opened up, and showing rotary spray head in accordance with the invention (indicated by an arrow) which might optionally be provisioned with a multitude of flat spray nozzles mounted along the arms from hub to the outboard ends thereof.

FIG. 47 is a pictorial view along the central axis of this coating machine, and from a plane above the food-product carrying upper run of the main conveyor, with the hood opened up, and showing rotary spray head in accordance with the invention (indicated by an arrow) which might optionally be provisioned with a multitude of flat spray nozzles mounted along the arms from hub to the outboard ends thereof.

Figure 48:
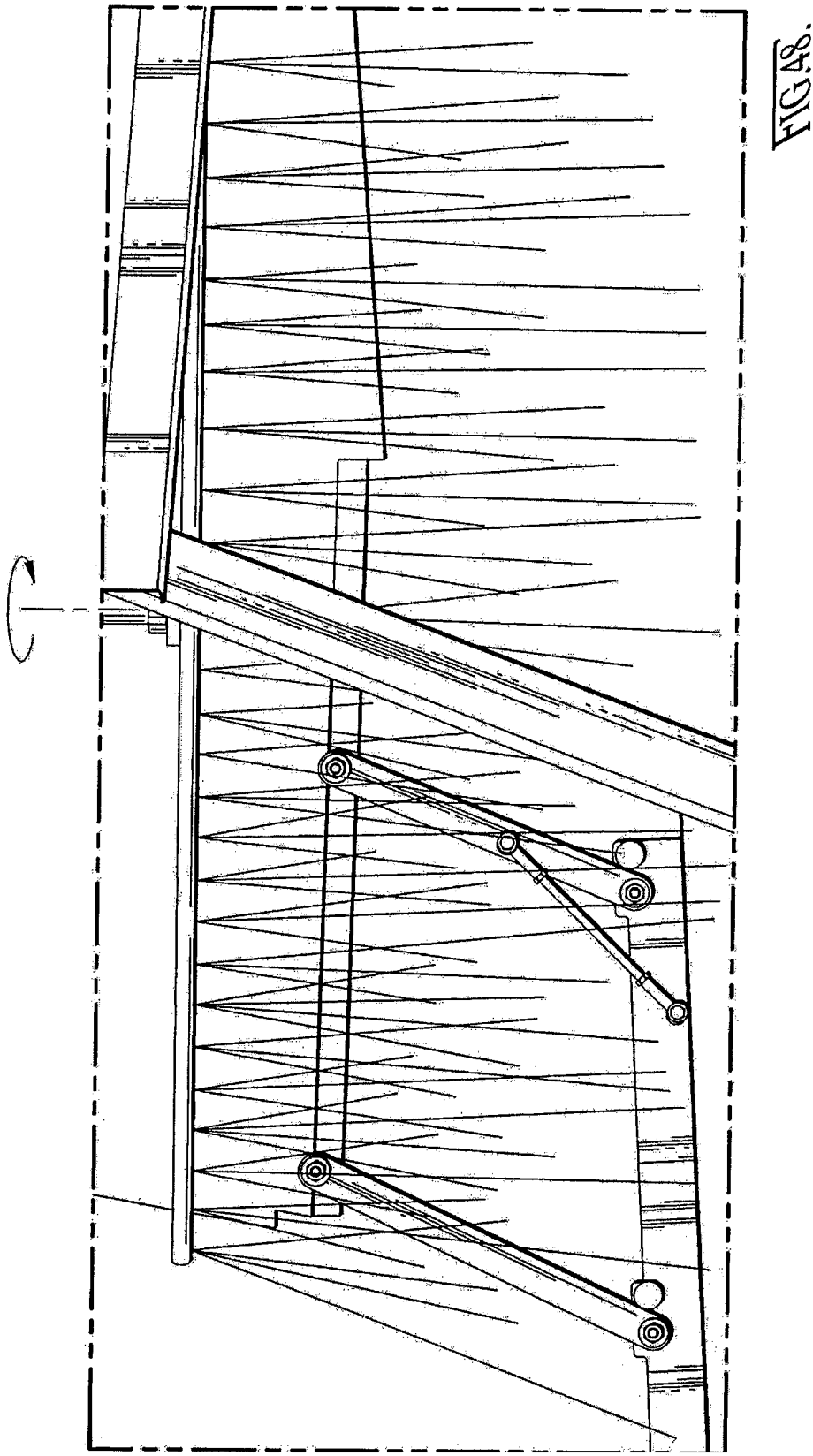
FIG. 48 is a pictorial view of the rotary spray head in FIG. 47 shown during a washing operation, wherein this vantage point is to one side of the coating apparatus.
Figure 49:
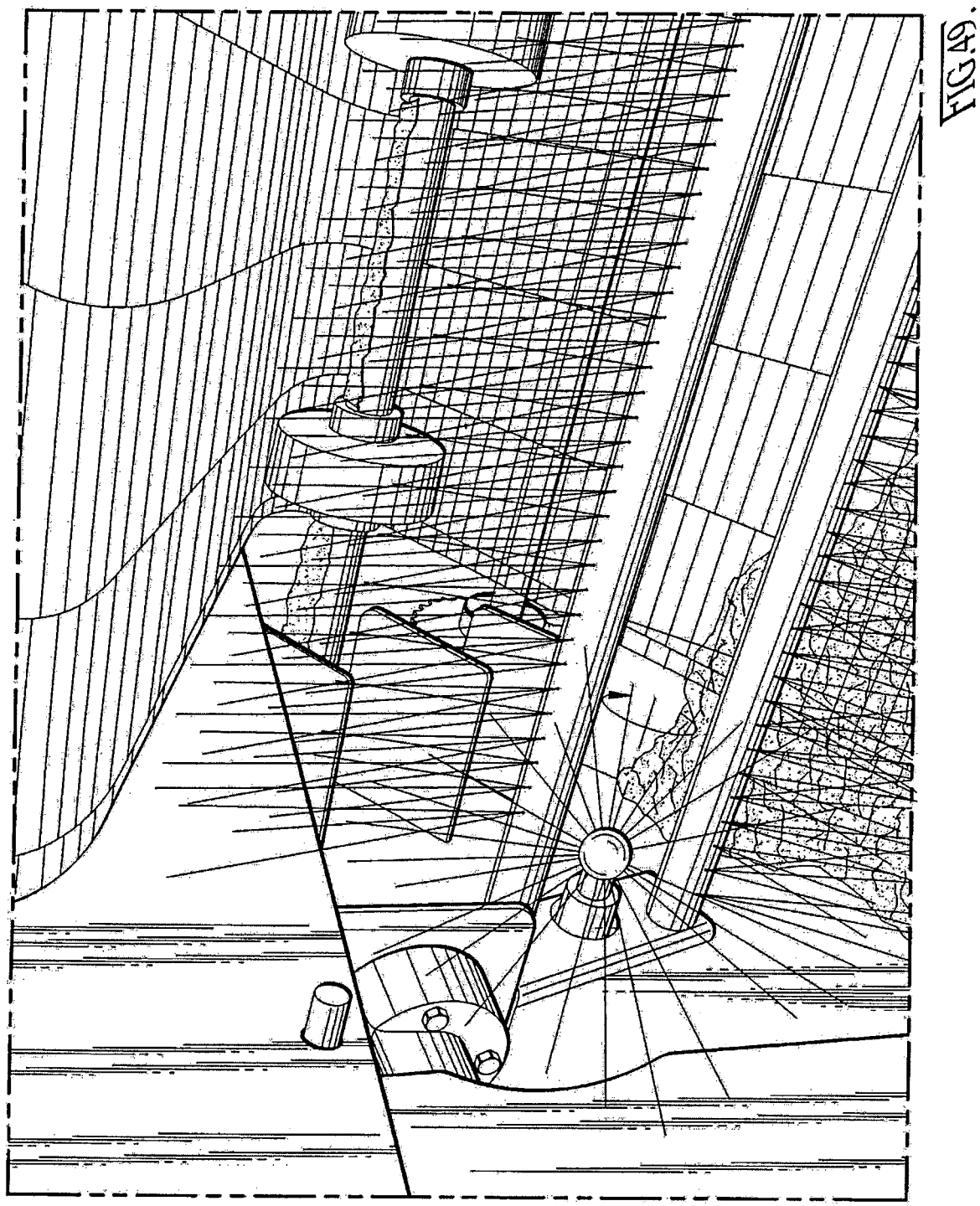
FIG. 49 is a pictorial view showing (1) not only a spherical spray nozzle in accordance with the invention (indicated by one arrow) mounted in a fixed position on an interior sidewall of the coating apparatus, (2) but also a rotary frame of two spaced parallel manifold tubes in accordance with the invention that rotate about a common axis between the two (and each tube is indicated by an arrow)

FIG. 48 is a pictorial view of the rotary spray head in FIG. 47 shown during a washing operation, wherein this vantage point is to one side of the coating apparatus. FIG. 49 is a pictorial view showing (1) not only a spherical spray nozzle in accordance with the invention (indicated by one arrow) mounted in a fixed position on an interior sidewall of the coating apparatus, (2) but also a rotary frame of two spaced parallel manifold tubes in accordance with the invention that rotate about a common axis between the two (and each tube is indicated by an arrow).

This rotary frame might be alternatively referred to as a barrel turbine the tubes alternatively referred to as vanes.

Figure 50:
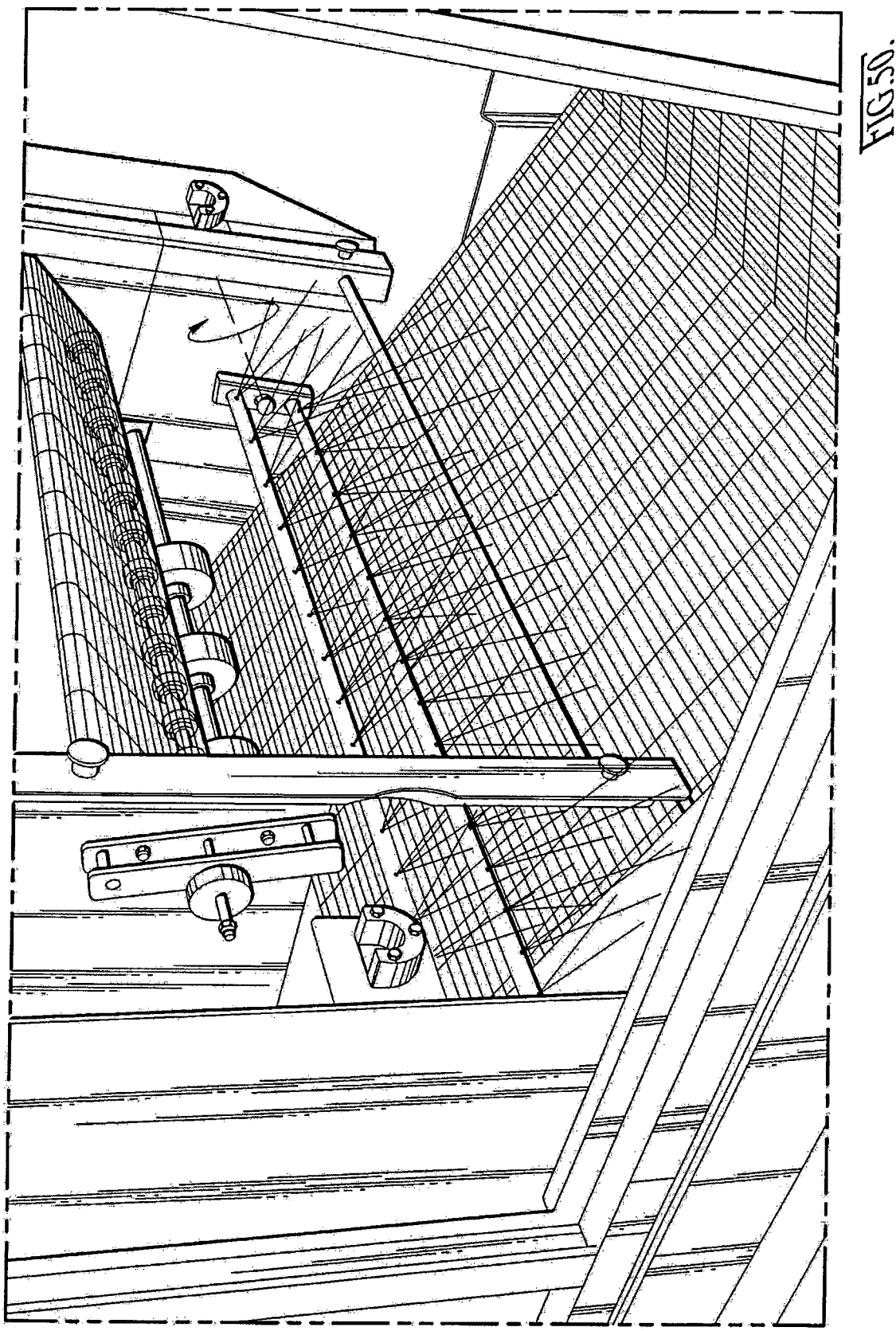
FIG. 50 is a pictorial view of the rotary frame of FIG. 49 which has two spaced parallel manifold tubes that rotate about a common axis between the two, shown during a wash operation.

FIG. 50 is a pictorial view of the rotary frame of FIG. 49 which has two spaced parallel manifold tubes that rotate about a common axis between the two, shown during a wash operation.

Figure 51:
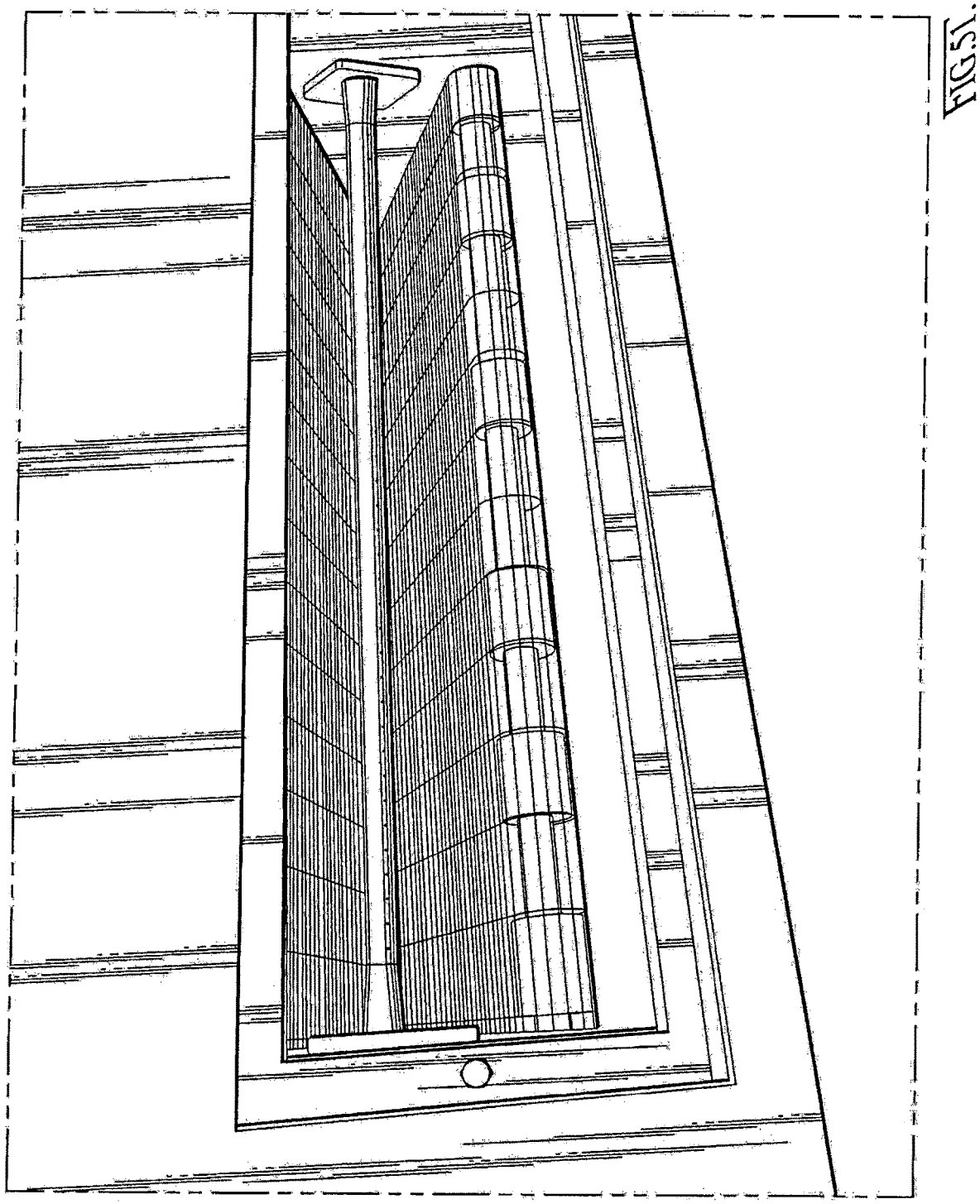
FIG. 51 is a pictorial view of a tubular (cylindrical) rotary manifold in accordance with the invention (indicated by an arrow) with multiple ports or nozzles distributed at spaced locations on its outer sidewall (eg., skin), and as shown during (or perhaps just after) a wash operation.

FIG. 51 is a pictorial view of a tubular (cylindrical) rotary manifold in accordance with the invention (indicated by an arrow) with multiple ports or nozzles distributed at spaced locations on its outer sidewall (eg., skin), and as shown during (or perhaps just after) a wash operation.

Figure 52:
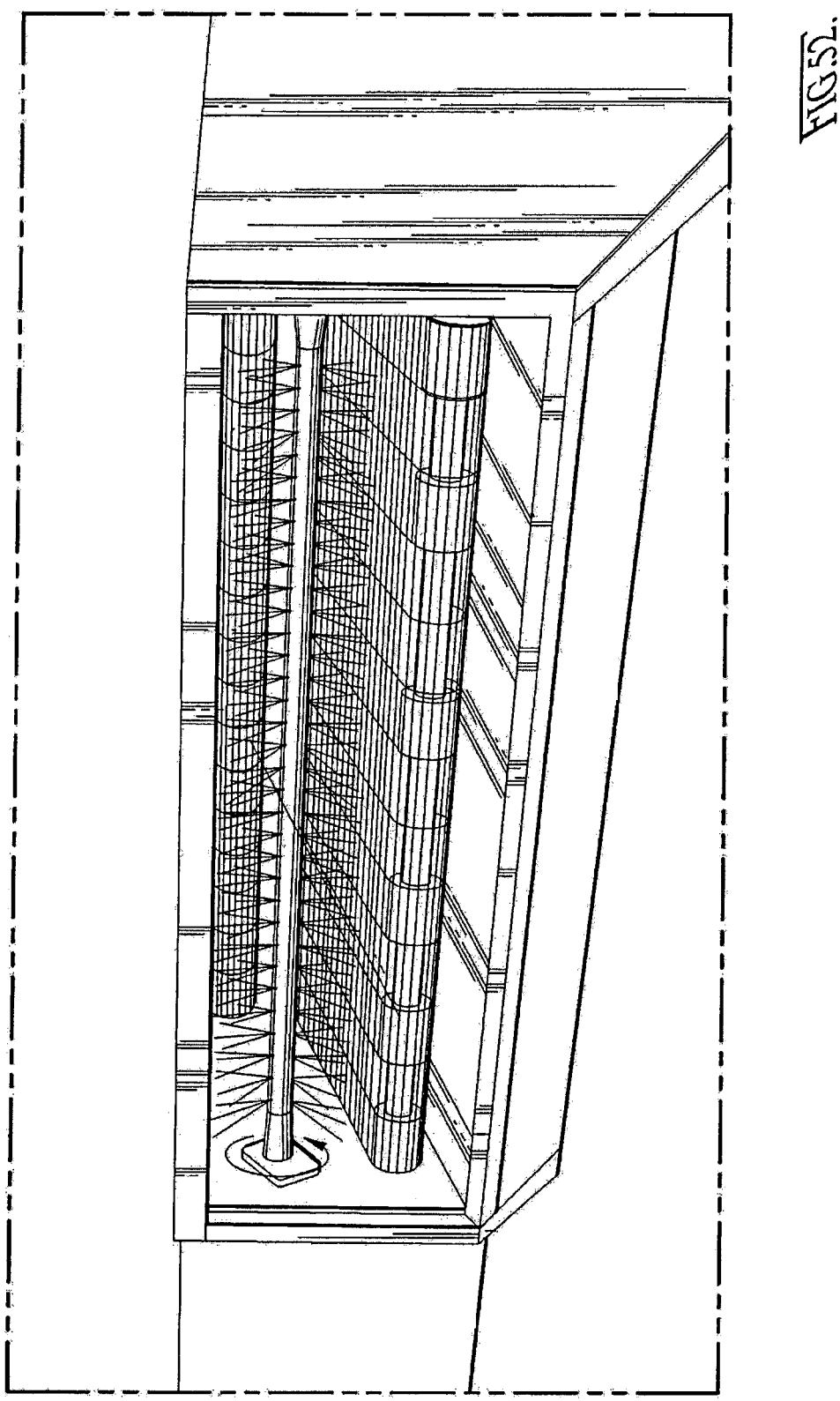
FIG. 52 is a pictorial view comparable to FIG. 51 and showing a tubular (cylindrical) rotary manifold in accordance with the invention (indicated by an arrow) with multiple ports or nozzles distributed at spaced locations on its outer sidewall (eg., skin), except probably in a different location in the coating apparatus from the location in FIG. 51, and as definitely shown during a wash operation.

FIG. 52 is a pictorial view comparable to FIG. 51 and showing a tubular (cylindrical) rotary manifold in accordance with the invention (indicated by an arrow) with multiple ports or nozzles distributed at spaced locations on its outer sidewall (eg., skin), except probably in a different location in the coating apparatus from the location in FIG. 51, and as definitely shown during a wash operation.

Figure 53:
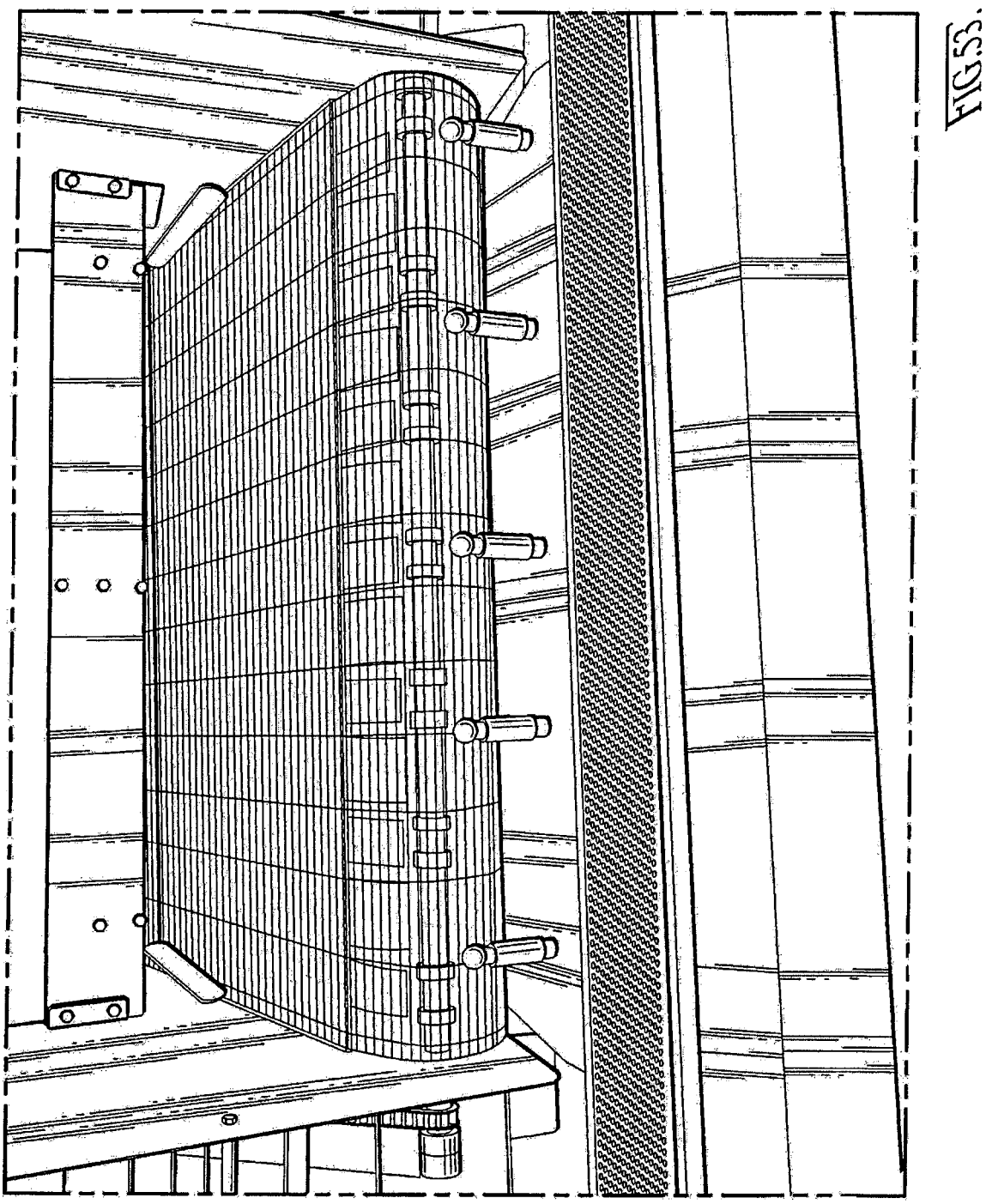
FIG. 53 is a pictorial view of a series of columnar pickets in accordance with the invention (each indicated by one of the five arrows), and each columnar picket carrying a spherical spray nozzle in accordance with the invention like in FIG. 49, which nozzle might optionally have flat-spray apertures and/or be rotary or oscillating.

FIG. 53 is a pictorial view of a series of columnar pickets in accordance with the invention (each indicated by one of the five arrows), and each columnar picket carrying a spherical spray nozzle in accordance with the invention like in FIG. 49, which nozzle might optionally have flat-spray apertures and/or be rotary or oscillating.

Figure 54:
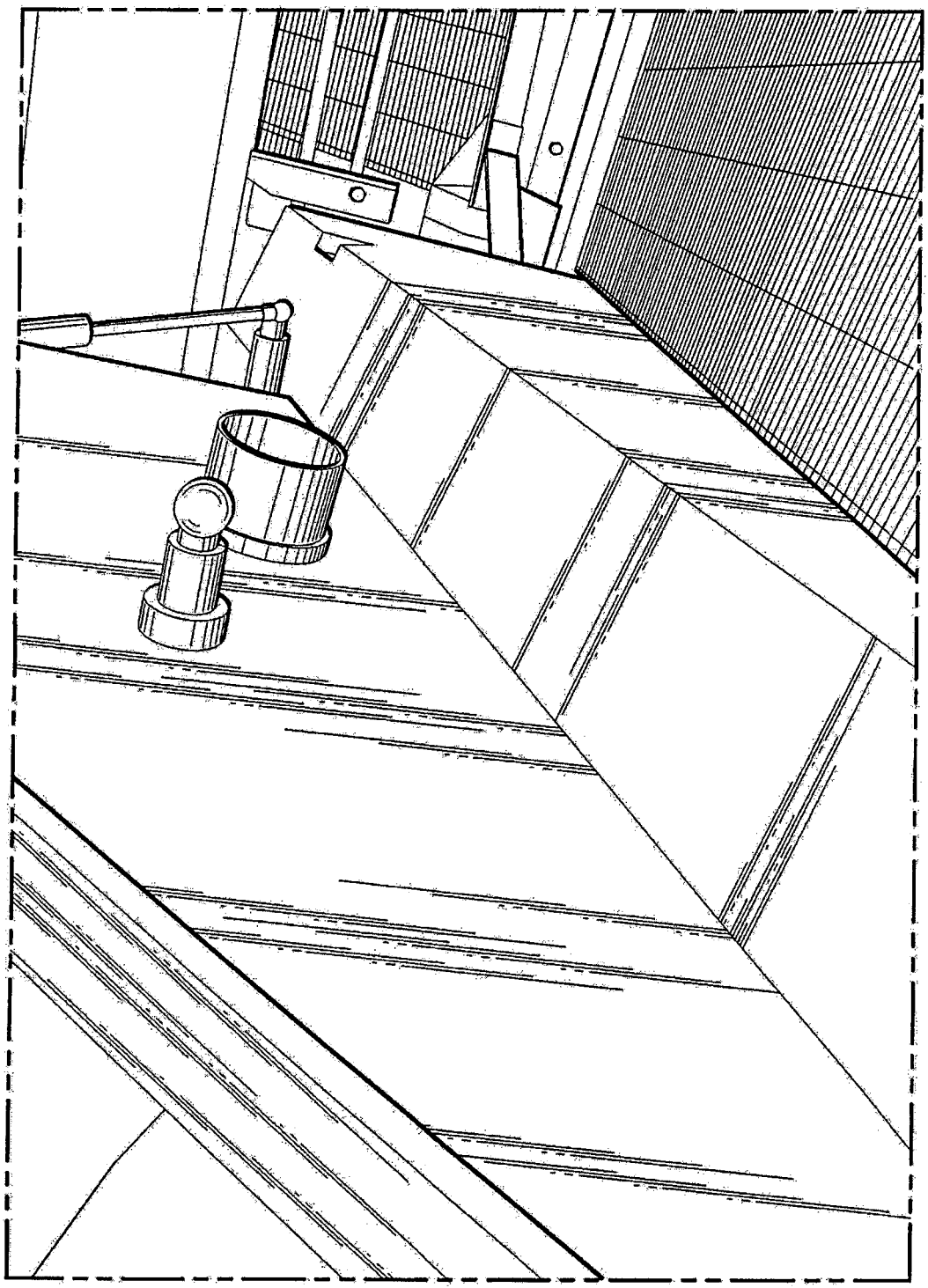
FIG. 54 is a pictorial view of a spherical spray nozzle in accordance with the invention like in FIGS. 49 and 53, mounted in an interior sidewall of the coating apparatus above either the food-product carrying upper run of the main conveyor or the return lower run, and which nozzle might optionally have flat-spray apertures and/or be rotary or oscillating.

FIG. 54 is a pictorial view of a spherical spray nozzle in accordance with the invention like in FIGS. 49 and 53, mounted in an interior sidewall of the coating apparatus above either the food-product carrying upper run of the main conveyor or the return lower run, and which nozzle might optionally have flat-spray apertures and/or be rotary or oscillating.

Figure 55:
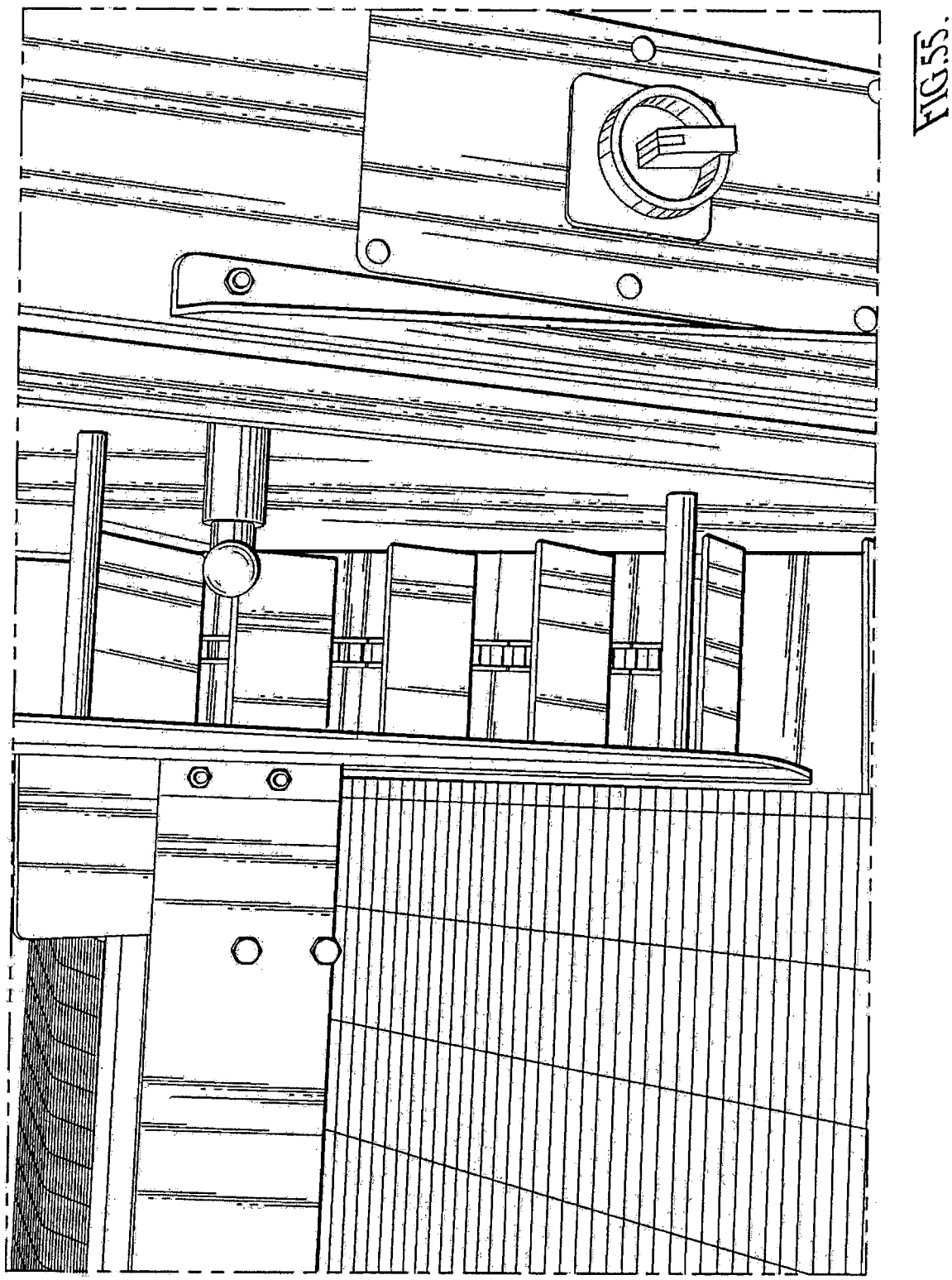
FIG. 55 is a pictorial view of a spherical spray nozzle in accordance with the invention like in FIGS. 49. 53 and 54, mounted in an interior sidewall of the coating apparatus above an elevator conveyor in the coating material recirculation system which flanks the main conveyor, and which nozzle might optionally have flat-spray apertures and/or be rotary or oscillating.

FIG. 55 is a pictorial view of a spherical spray nozzle in accordance with the invention like in FIGS. 49, 53 and 54, mounted in an interior sidewall of the coating apparatus above an elevator conveyor in the coating material recirculation system which flanks the main conveyor, and which nozzle might optionally have flat-spray apertures and/or be rotary or oscillating.

The invention relates to coating apparatus in food process lines that apply a particulate coating to a stream of food product passing continuously through it.

As an aside, the term "on-line" as used herein refers to the state of the food process line in a "run mode," and in contrast to "off-line," which means the food process line is "off" and perhaps partly disassembled as for the frequent cleaning cycles. So the term "on-line" here does not have reference to things on the Internet.

Typically the particulate is any of wheat flour, corn flour, other flours or flour mixtures, seasoning, spices and so on without limitation. The range of fineness to coarseness of the particulate coating material includes without limitation ranging from finely sifted particulate to ground bread or cracker crumbs and the like. With the coarser texture particulate, there is usually a likelihood that come fraction of the coarsest particles will break apart into finer particles by the nature of the coating process of the given coating equipment.

Coating apparatus for food process lines typically handle food products (for human consumption) including without limitation chicken, fish, seafood, pork, beef, or vegetable pieces, balls, cakes or patties for that matter, and so on. The particulate coating material commonly might range in composition from a finely-sifted flour mixture to a coarse bread-crumb mixture. The various kinds of coating material allow inclusion of seasonings, spices or flavorings within the mixture.

Briefly, such coating apparatus are characterized by an intake system, which is where the main coating activity takes. The coating apparatus might have any variety of a tumbling system (or not) for ensuring more even application of the coating material as well as for knocking off excess coating material.

It is preferred to bypass the tumbling option for delicate food such as beef patties or fish cakes and the like (eg., "formed" food product), which would otherwise disintegrate if tumbled.

It is an object of the invention to provide a coating apparatus with an onboard, on-line dust (eg., coating material) collection, containment and/or recirculation system.

Ideally, the coating material is confined with the "confines" of the housing of the coating machine. Escape into the atmosphere of the food-process line plant is not only waste, it is also foreign matter that must eventually be cleaned away during the periodic frequent wash downs of the food-process line equipment.

Therefore it is another object of the invention to confine to a fairly high degree the coating material and/or the even finer particulate that may disintegrate out of the coating material within the select containers, chambers and/or conduits for the coating material within the specific coating machine, or the supply lines of the coating material for that coating machine.

A number of additional features and objects will be apparent in connection with the following discussion of the preferred embodiments and examples with reference to the drawings.

Figure 56:
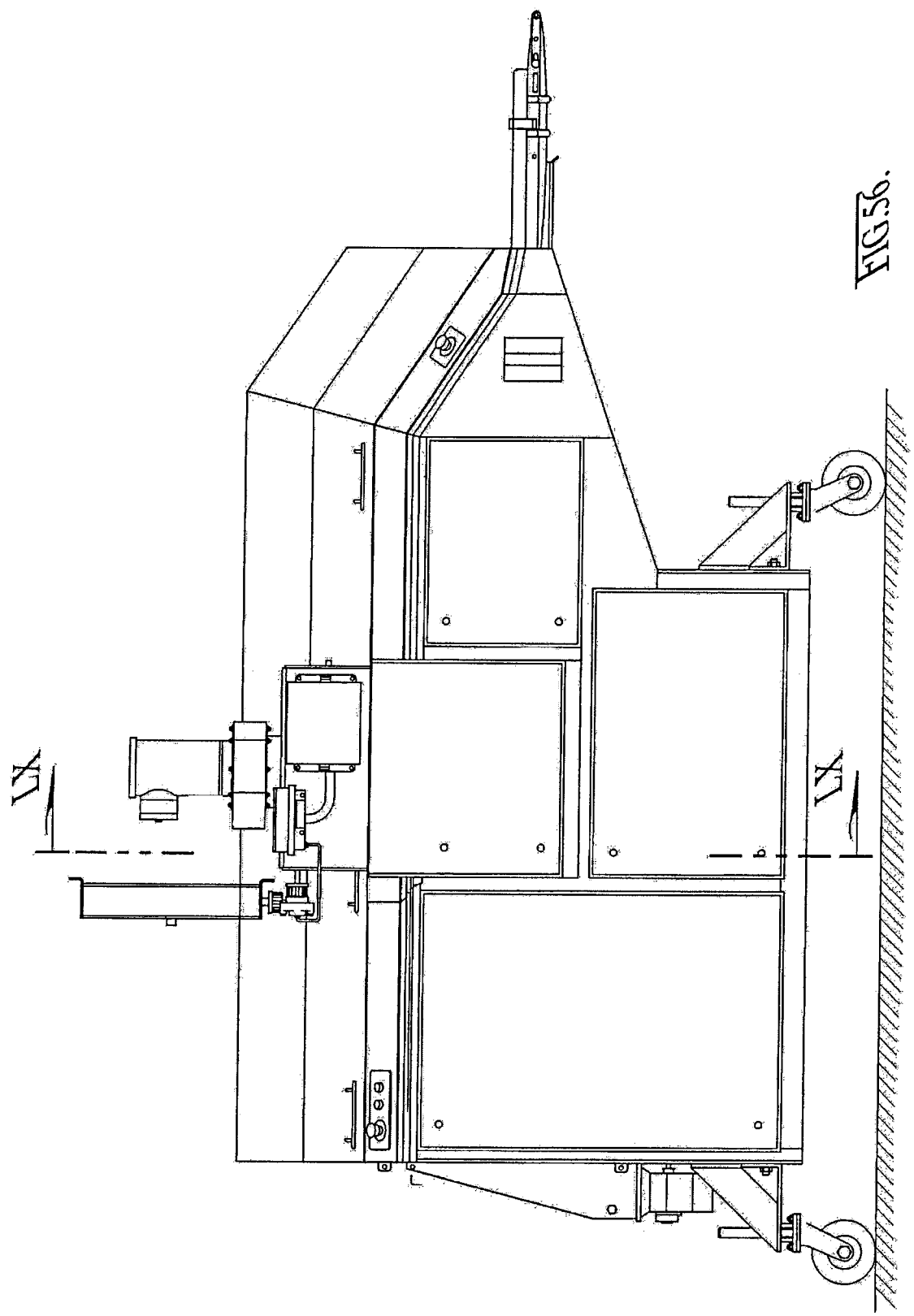
FIG. 56 is a right side elevational view of a combination of (1) a coating machine in accordance with the invention, shown with the hoods closed, and as in combination with (2) an onboard, on-line dust collection, containment and/or recirculation system in accordance with the invention.

FIG. 56 is a side elevational view of a combination of (1) a coating machine in accordance with the invention apparatus in a food process line, as in combination with (2) an onboard, on-line dust collection, containment and/or recirculation system in accordance with the invention.

The coating machine in accordance with the invention receives an intake of food product pieces (for example and without limitation, chicken tenders) from the left on typically a wire mesh (or alternatively a drag link) conveyor belt. One standard width of conveyor belts is four feet (~1.2 m) wide. Preferably the pieces are spread out without touching each other, but otherwise are fairly densely packed across the width of the inflow conveyor belt. The food product pieces will receive an application of coating material within the coating machine, and be discharged to the right in FIG. 56 to further downline processes. So if this is a pre-dust machine, the next machine in succession might be a batter machine, followed by a bread-crumb coating machine, fryer, freeze, and onward.

The dust collection, containment and/or recirculation system in accordance with the invention comprises a main housing which is the upper central panel in this FIG. 56. Observe that the coating machine has four panels, the centers of which are arranged in a diamond pattern (eg., a baseball diamond). The main housing is the upper central panel, whose center would be "second base" on the imaginary baseball diamond.

Figure 57:
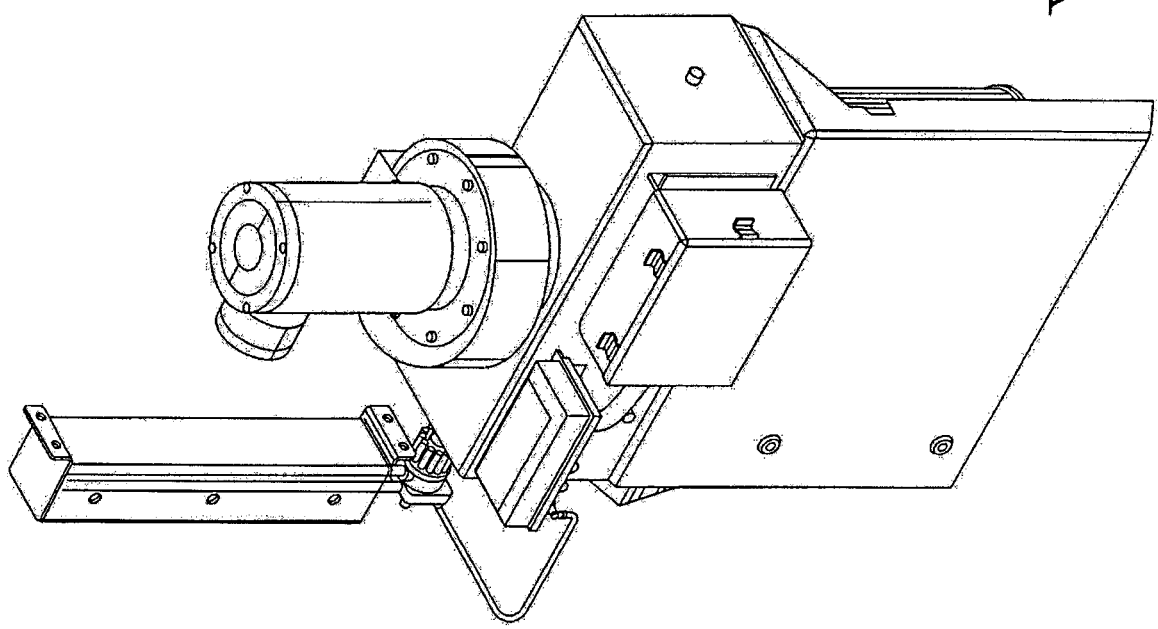
FIG. 57 is an outboard perspective view of the onboard, on-line dust collection, containment and/or recirculation system of FIG. 56 in isolation.
Figure 58:
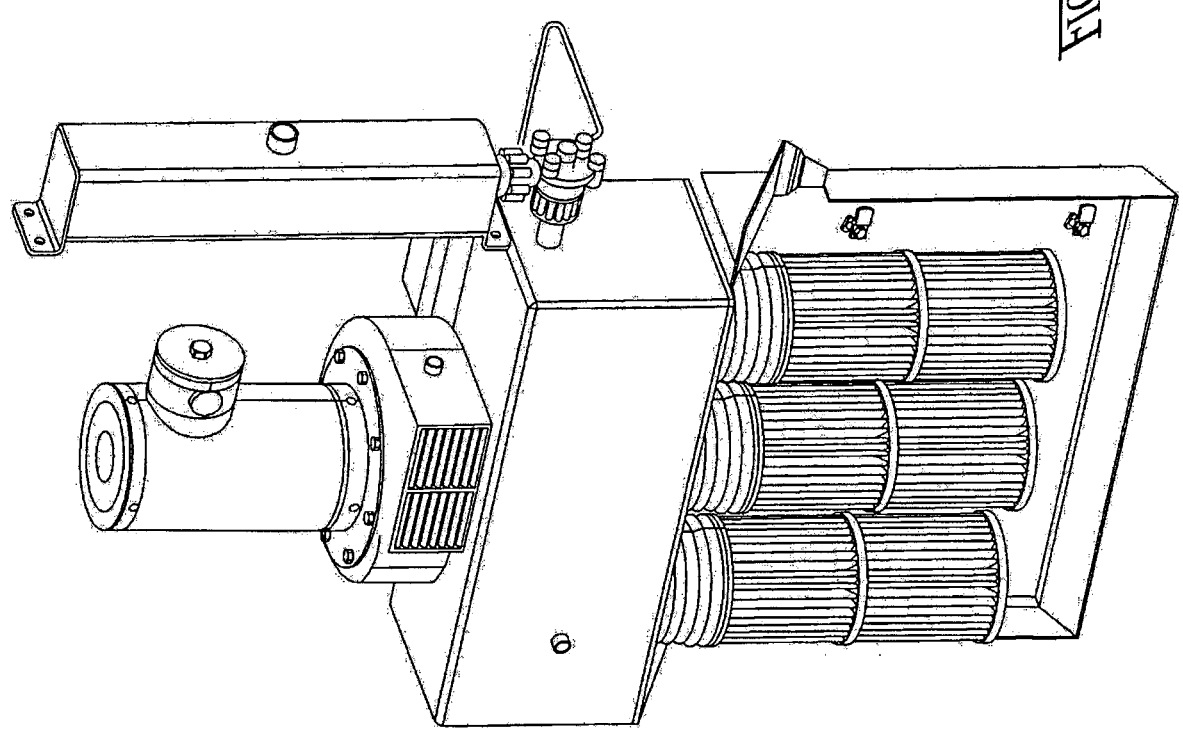
FIG. 58 is a perspective view comparable to FIG. 57 except from an inboard perspective.

As FIGS. 56-58 show, the main housing is generally rectangular, although it can be reckoned as partitioned into distinct sub-parts as described more particularly next.

Staying in FIGS. 56-58, for the dust collection, containment and/or recirculation system in accordance with the invention comprises:— a bank of cylindrical pleated-media air filters (three shown here, and there are the "main" air filters), wherein each "main" air filter is suspended vertically side-by-side among one another and has a pleated media cylindrical sidewall extending between a closed bottom end and an open top end;

an upper rectangular manifold having spaced inboard and outboard sidewalls, spaced front and back end walls, and a spaced top and bottom wall;

the bottom wall is formed with a respective opening and seal-forming connection for the top end of each of the main air filters;

the top wall carries a centrifugal exhaust fan (the exhaust outlet is shown in FIG. 58) with an electric drive motor mounted vertically on top of the exhaust fan (eg., air blower);

the bottom wall further suspends a rectangular vertical side closure that has a (relatively) solid bottom panel extending between (relatively) solid spaced front and back end panels all framing a (relatively) solid outboard panel, but otherwise the inboard side of the vertical side closure is open; and a vertically-elongated, compressed air blow-off system standing vertically up off of a horizontal air conduit plumbed to (or extending through) the front end wall of the manifold.

Figure 59:
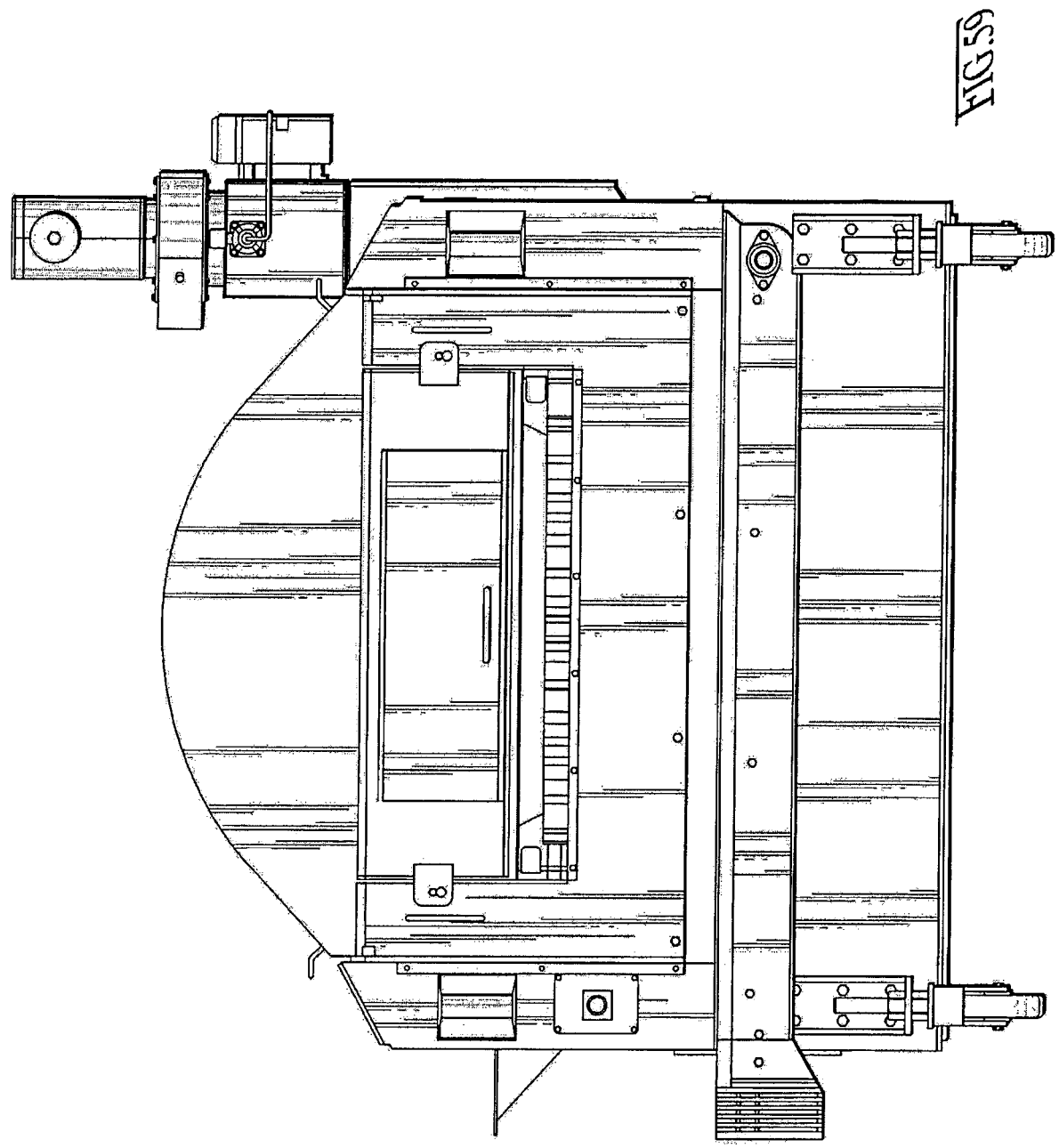
FIG. 59 is an intake end, end elevational view of FIG. 56.

FIG. 59 shows better that the dust collection, containment and/or recirculation system in accordance with the invention mounts to the coating machine in accordance with the invention in the following manner:— to one side of the coating machine (the right side here), up relatively high on the right sidewall of the coating machine, and as FIG. 56 shows better, about centered on the coating machine.

This can be likened to the "island" of an aircraft carrier, which according to USN convention is situated amidships between the bow and stern, always on the starboard side, and projecting well above the flight deck (so that the bridge is up high).

FIG. 59 shows that the inlet opening for entering food product is a horizontally elongated slot. The slot is as wide as the conveyor and its height is adjustable by a vertically-adjustable sill so that the height of the slot is carefully adjusted to allow every piece of food product to pass under, but without much excess after that.

Figure 60:
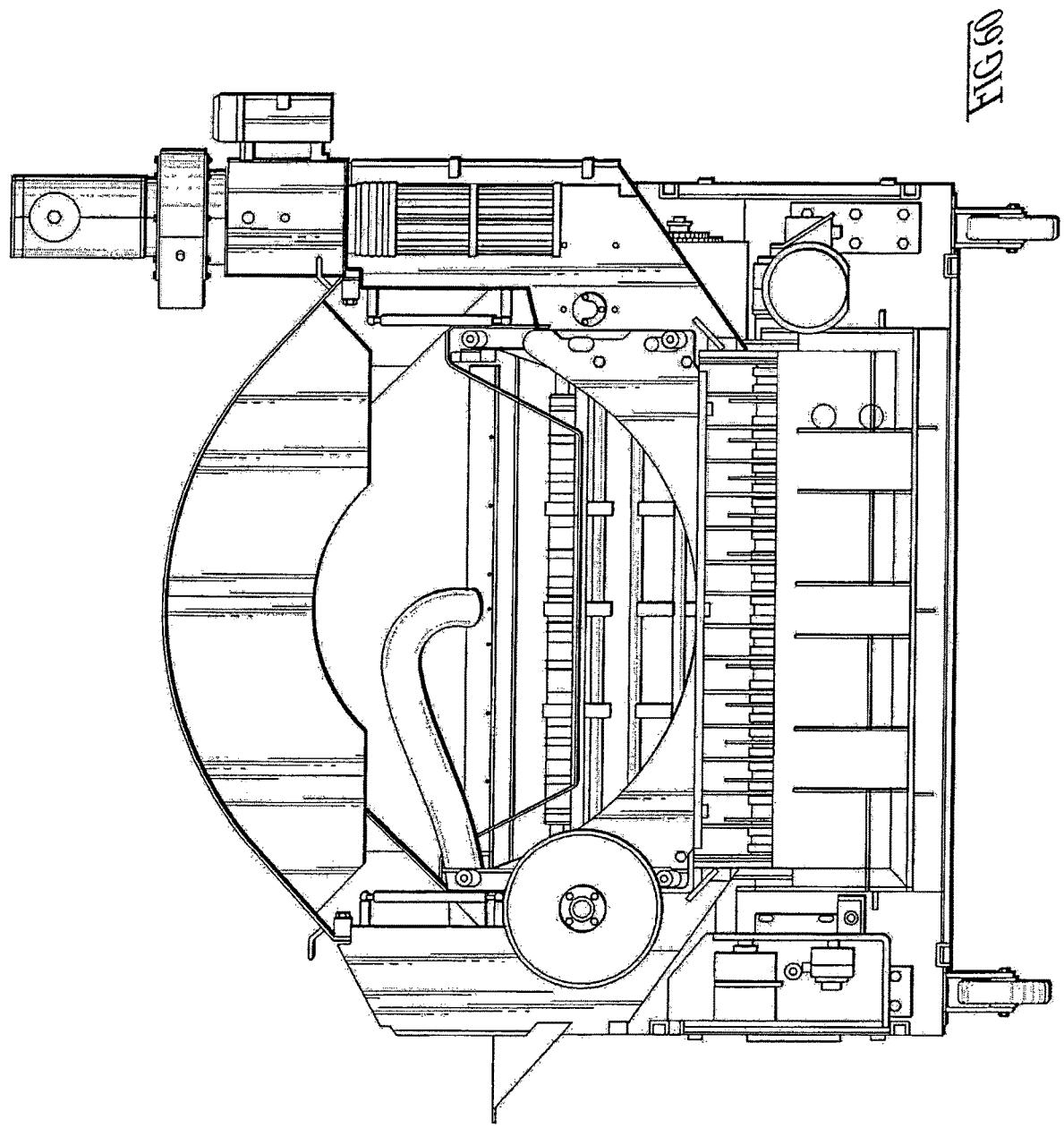
FIG. 60 is a section view take along line V-V in FIG. 56.

FIG. 60 shows that the outlet slot is also a horizontally-elongated slot but not so vertically narrow (vertically short) as the inlet slot.

Hence, the food-product inlet and outlet slots aside, the coating machine defines a substantially enclosed chamber. The dust collection, containment and/or recirculation system mounts to the right sidewall of the coating machine with seals to further ensure that the only substantial ways air can leak into or out of the interior confines of the coating machine is through the horizontally elongated food-product inlet and outlet slots.

Figure 61:
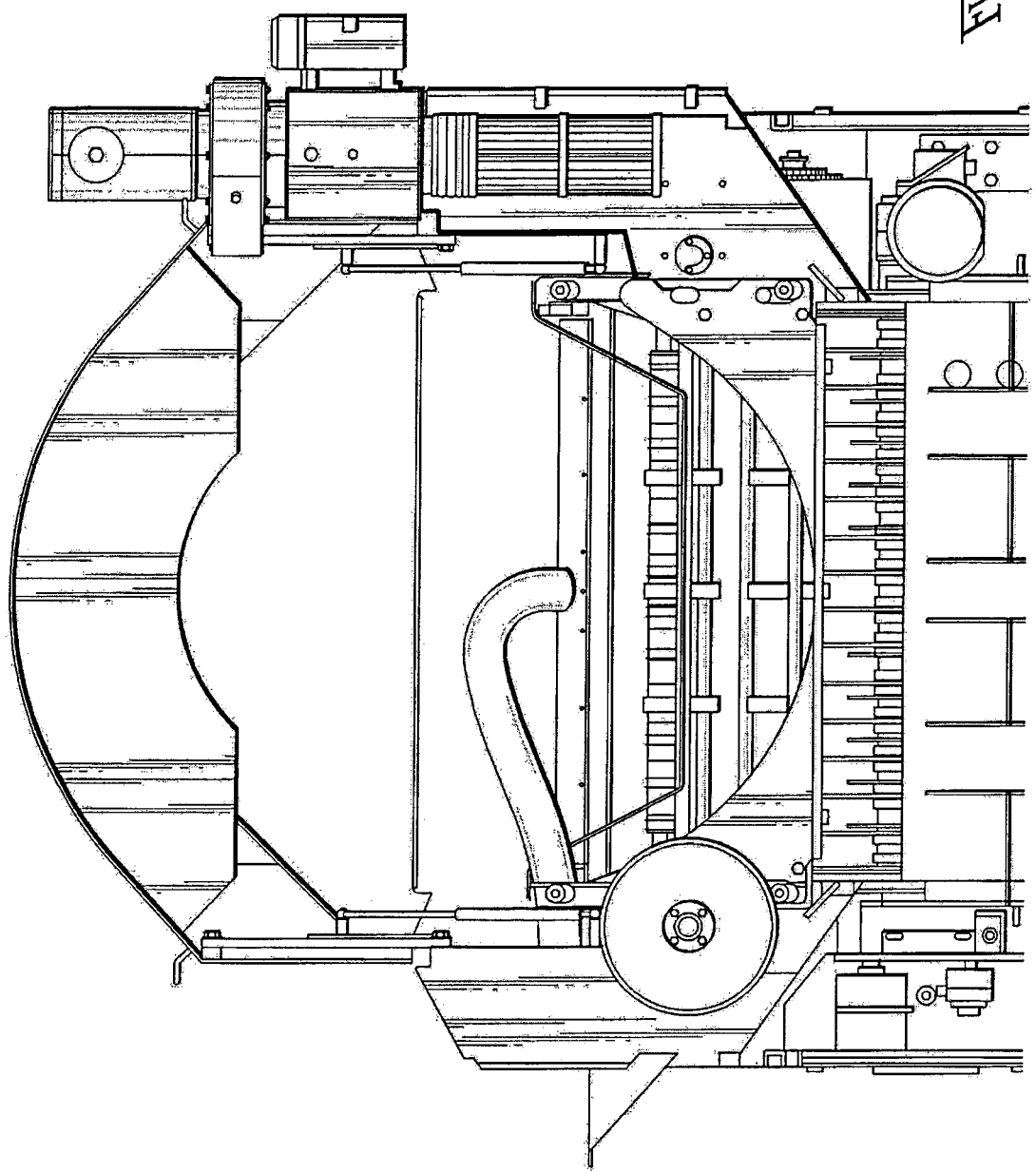
FIG. 61 is a section view comparable to FIG. 60 except with the hoods open.
Figure 62:
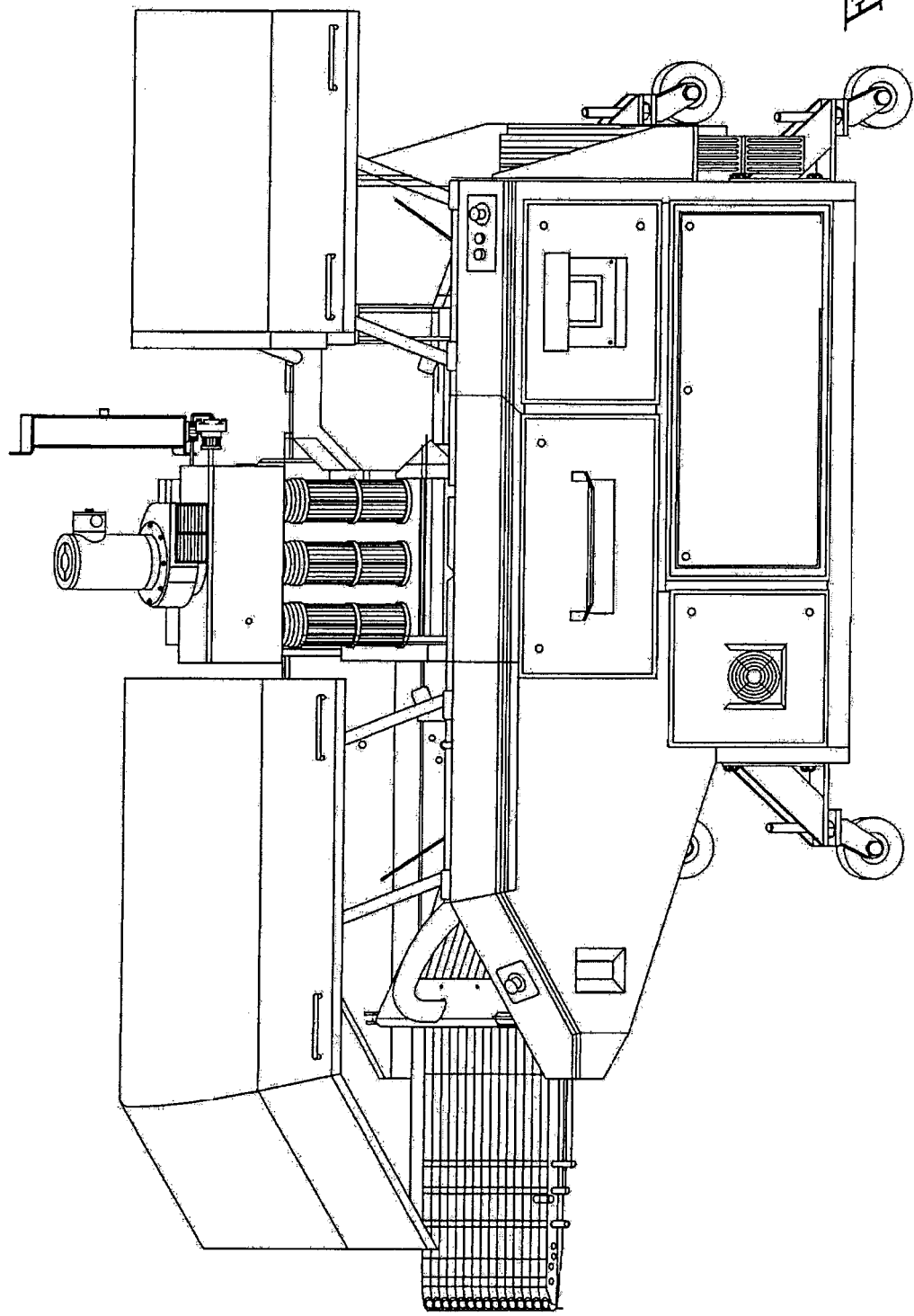
FIG. 62 is a left side perspective view of FIG. 56, except with the hoods open.

FIGS. 60-62 show a horizontally-elongated vacuum nozzle disposed:— elevated above the plane of the food-product carrying run of the belt conveyor;

transverse to the longitudinal run direction of the belt conveyor; and proximate the discharge end of the coating machine.

As FIG. 60 shows best, preferably the horizontally-elongated vacuum nozzle is disposed just inside the upper sill of the horizontally-elongated food-product outlet slot.

FIGS. 60 and 61 show best that situated on the port side of the machine (and in the left in these two views as well) is a horizontally mounted air blower (eg., exhaust or vacuum-forming fan). This fan is independent of the centrifugal exhaust fan mounted on the top wall of the manifold. This vacuum fan provides the suction source for the horizontally-elongated nozzle just above and inside the sill of the horizontally-elongated food-product outlet slot. This vacuum fan exhausts into the interior of the coating machine.

In use, the vacuum fan is constantly inducing the vacuuming up of wafting particulate at the horizontally-elongated food-product outlet slot. The vacuum fan simply returns the vacuumed up air stream into the middle of the coating machine.

The centrifugal fan on top of the manifold runs separately and preferably runs at a higher capacity than the vacuum fan. The centrifugal fan on top of the manifold draws interior air inside the coating machine through the three main filter cartridges, and exhausts the filtered air into the atmosphere of the food process plant. Preferably the exhaust is aimed so as not to wash into the eyes or faces of bystanders.

Given the foregoing, the main centrifugal pumps keeps a slightly negative pressure inside the coating machine. Streams of fresh air will constantly be drawn in through both the horizontally-elongated food-product inlet and outlet slots, always tending to blow wafting particulate back inside the coating machine rather than allow it escape. The horizontally-elongated vacuum nozzle which just returns vacuumed air back into the inside of the coating machine merely provides double insurance of containing the wafting particulate.

As mentioned previously, this apparatus in accordance with the invention includes a vertically-elongated, compressed air blow-off system. It can be seen in the figures standing vertically up off of a horizontal air conduit plumbed to (or extending through) the front end wall of the manifold.

During "run" times (again when the food process line is "on-line"), the main air filter cartridges may clog to where they impair the effectiveness of the ability of the main centrifugal exhaust fan to maintain the desired negative pressure. All that needs to be done is clear the main air filter cartridges, and this can be readily accomplished with a brief blast of compressed air from the inside.

However, it is undesirable to take the food process line "off-line" (eg., shut it down) to do this. Accordingly, compressed air blow-off system allows just such a means of providing a short blast of compressed air, into the manifold, and out through the air filter cartridges into the interior of the coating machine. Preferably the blast of air is sufficiently short and forceful to dislodge caked-up particulate, but otherwise is of a rather minuscule capacity as to start blowing wafting particulate out of the coating machine and forming a blizzard of particulate in the atmosphere of the food process plant.

Preferably, "shop air" as used for pneumatic tools is not used. "Shop air" is not a reliably clean supply. The vertical housing for the compressed air blow-off system houses apparatus for providing a compressed air supply other than "shop air." This could include for example a rechargeable compressed air tank that is slowly recharged over time by a small air compressor and then quickly discharged by a complete release blow down.

The invention relates to coating apparatus in food process lines that apply a particulate coating to a stream of food product passing continuously through it.

Typically the particulate is any of wheat flour, corn flour, other flours or flour mixtures, seasoning, spices and so on without limitation. The range of fineness to coarseness of the particulate coating material includes without limitation ranging from finely sifted particulate to ground bread or cracker crumbs and the like. With the coarser texture particulate, there is usually a likelihood that come fraction of the coarsest particles will break apart into finer particles by the nature of the coating process of the given coating equipment.

Coating apparatus for food process lines typically handle food products (for human consumption) including without limitation chicken, fish, seafood, pork, beef, or vegetable pieces, balls, cakes or patties for that matter, and so on. The particulate coating material commonly might range in composition from a finely-sifted flour mixture to a coarse bread-crumb mixture. The various kinds of coating material allow inclusion of seasonings, spices or flavorings within the mixture.

Briefly, such coating apparatus are characterized by an intake system, which is where the main coating activity takes. The coating apparatus might have any variety of a tumbling system (or not) for ensuring more even application of the coating material as well as for knocking off excess coating material.

It is preferred to bypass the tumbling option for delicate food such as beef patties or fish cakes and the like (eg., "formed" food product), which would otherwise disintegrate if tumbled. Still, excess coating material is shaken off by a variety of techniques.

Excess coating material is recirculated with the coating apparatus to be applied afresh to incoming food product pieces that either (1) have not been coated or (2) have not been coated with the subject coating material within the respective coating apparatus.

It is an object of the invention to provide improvements in a coating material recirculation system and the elevators therefor.

A number of additional features and objects will be apparent in connection with the following discussion of the preferred embodiments and examples with reference to the drawings.

Figure 63:
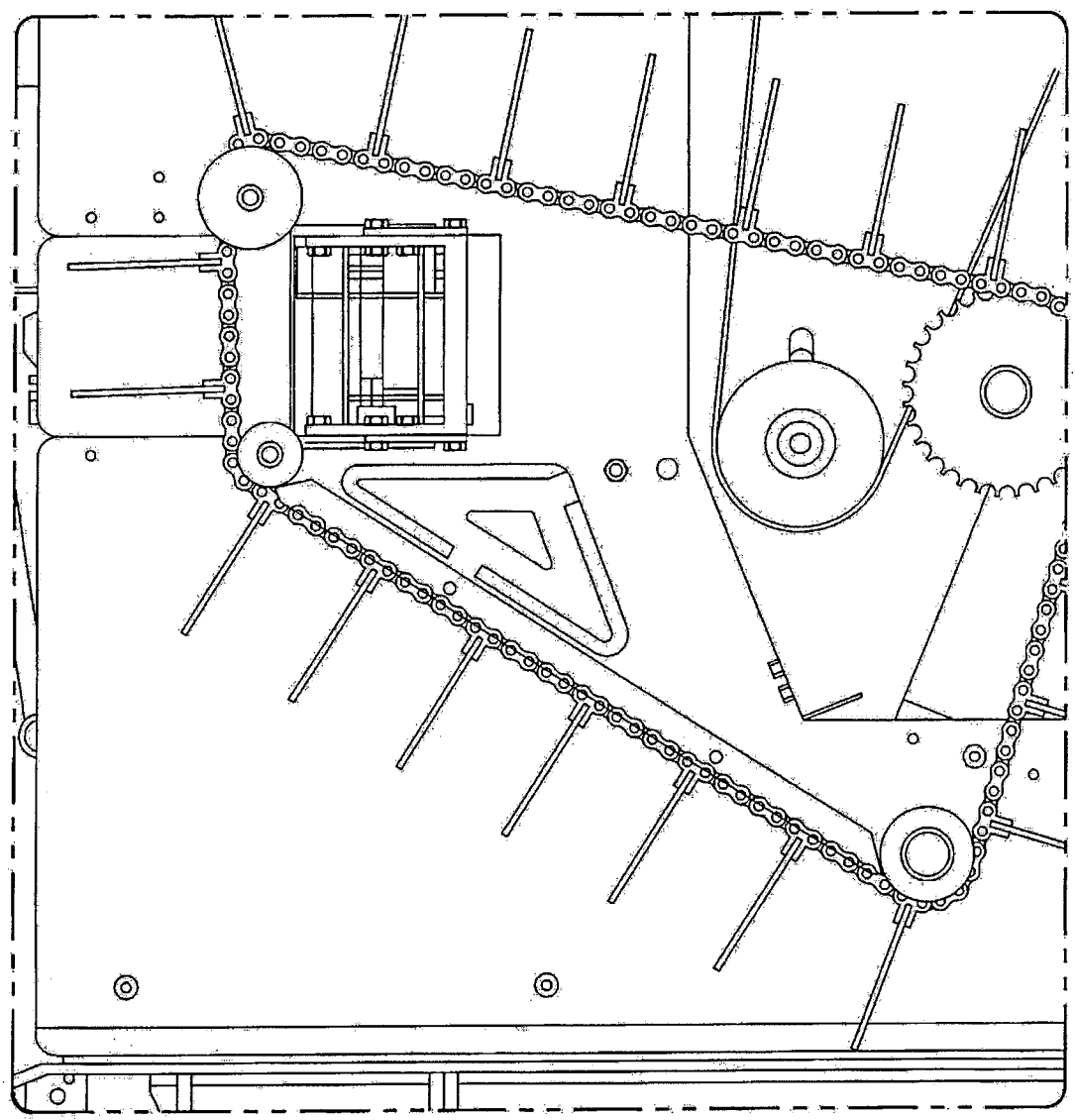
FIG. 63 is a right side elevational view of an elevator system in accordance with the invention in a coating material recirculation system in accordance with the invention for food process line coating apparatus in accordance with the invention.

FIG. 63 is a right side elevational view of an elevator system in accordance with the invention in a coating material recirculation system in accordance with the invention for food process line coating apparatus in accordance with the invention.

Food product pieces enter the coating apparatus from the left of the view (this in not shown) and are conveyed to the right in the view to a discharge end (not shown). The elevator comprises an pair of laterally spaced endless chains running a trapezoidal loop carrying projecting paddles (only the near-side, or outboard, chain is in view such that the far-side inboard chain is hidden by the near-side outboard chain). The chains comprise a lower coating-material motivating run that is inclined upwardly to the left in the view, an up-traveling inclined coating-material carrying run, an upper horizontal run that dumps out the coating material carried by the carrying run, and a down-traveling return run on the right-side of the view that is empty of coating material. The lower motivating run is spaced from a solid (scraper) surface that traps the coating material in the interspaces between adjacent paddles. The carrying run is reverse inclined such that it carries coating material as a water wheel.

Figure 64:
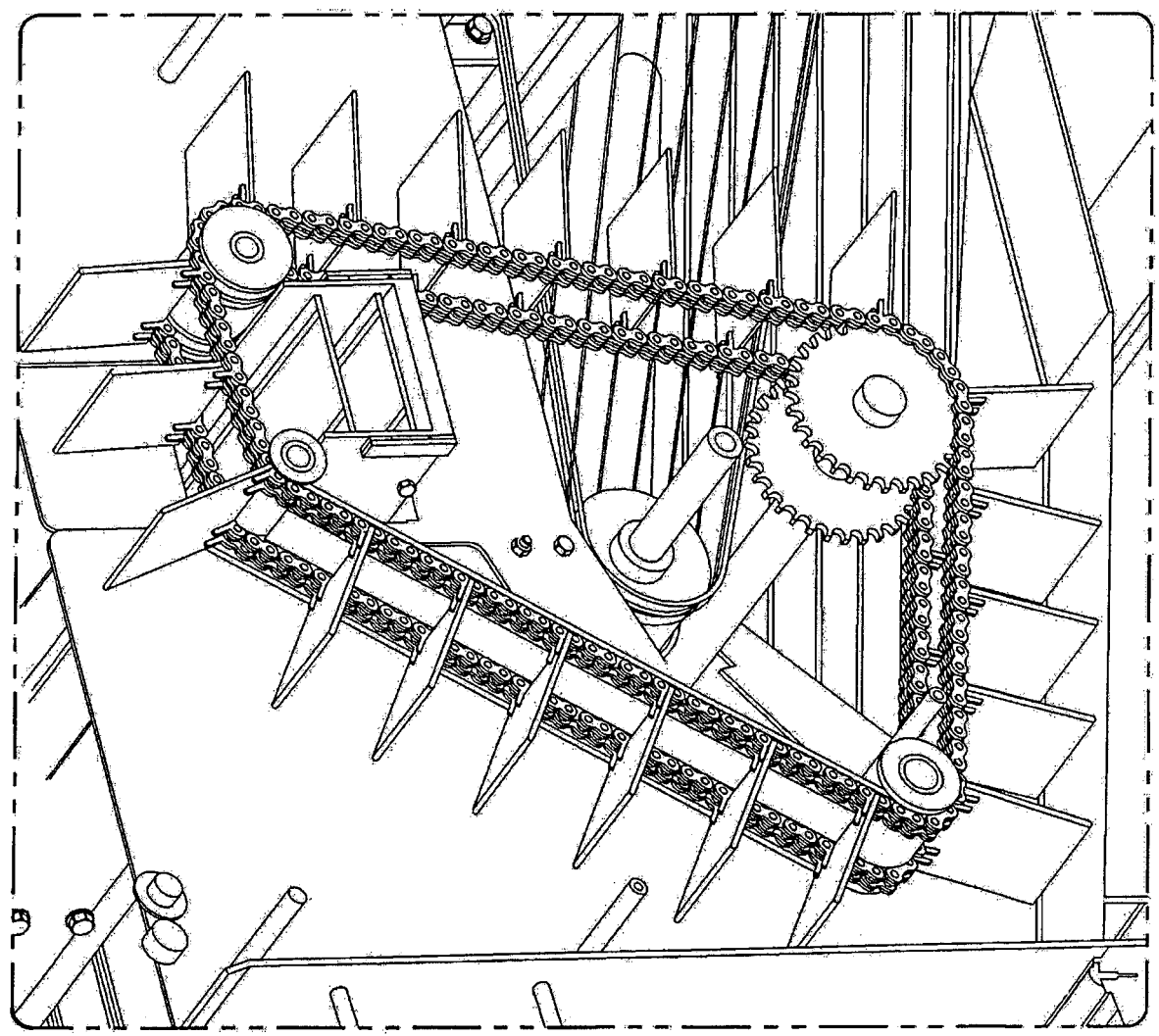
FIG. 64 is a perspective view showing the spaced parallel pair of chains.

FIG. 64 is a perspective view showing the spaced parallel pair of chains.

Figure 65:
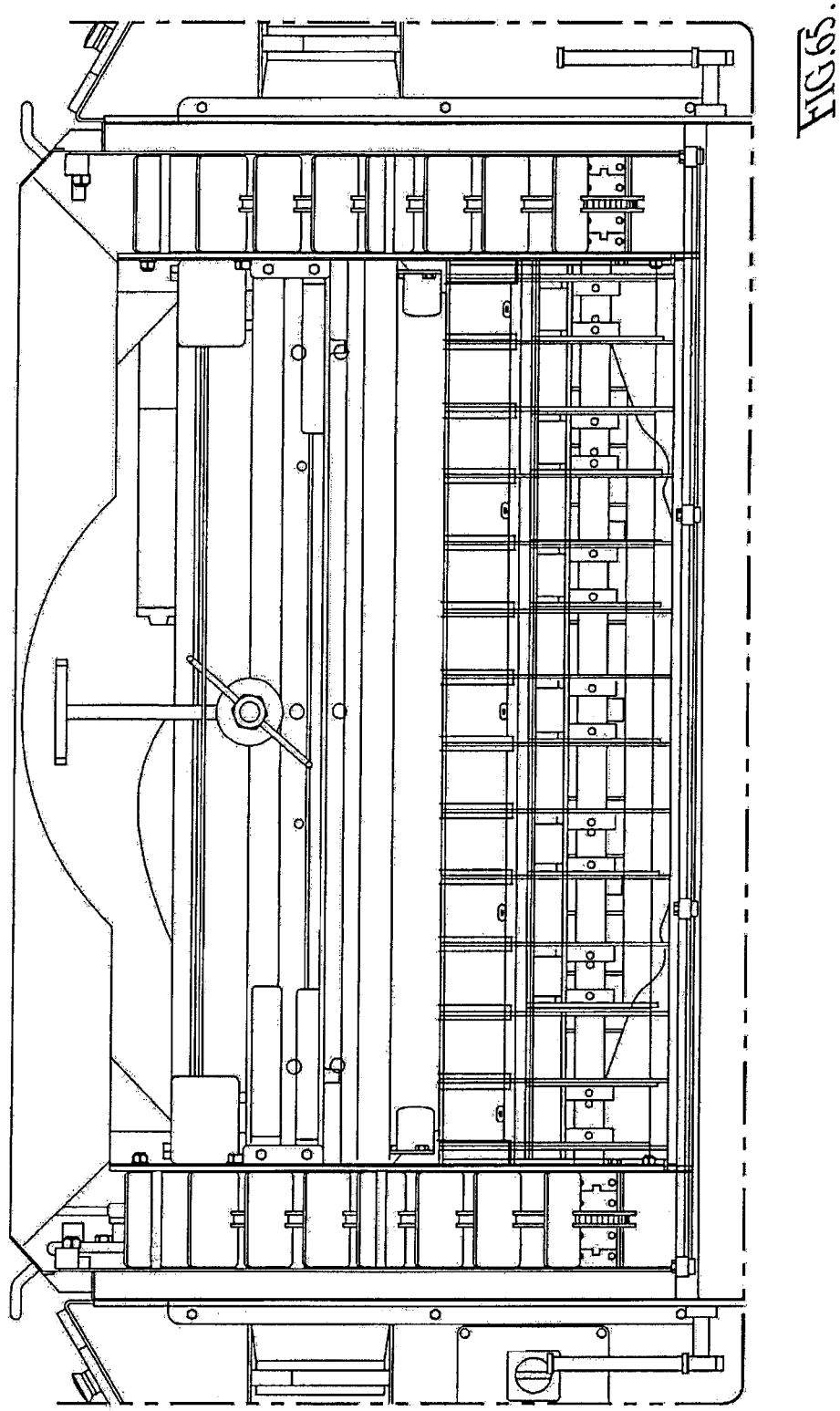
FIG. 65 is an end elevational view of the intake end of the coating apparatus showing an alternative embodiment of elevator systems therefor in accordance with the invention.

FIG. 65 is an end elevational view of the intake end of the coating apparatus showing an alternative embodiment of elevator systems therefor in accordance with the invention.

The coating apparatus has a main food-product conveying conveyor, typically an endless wire-mesh belt. The main conveyor is flanked left and right by a pair of mirror opposite (or identical) elevator system. The elevator system shown in FIGS. 63 and 64 could likewise be arranged as flanking counterparts to the main conveyor.

However, in this FIG. 65 each of the chain-driven elevators is configured with a single chain configuration, rather than the pair of chains for a single elevator as shown by FIGS. 63 and 64.

Figure 66:
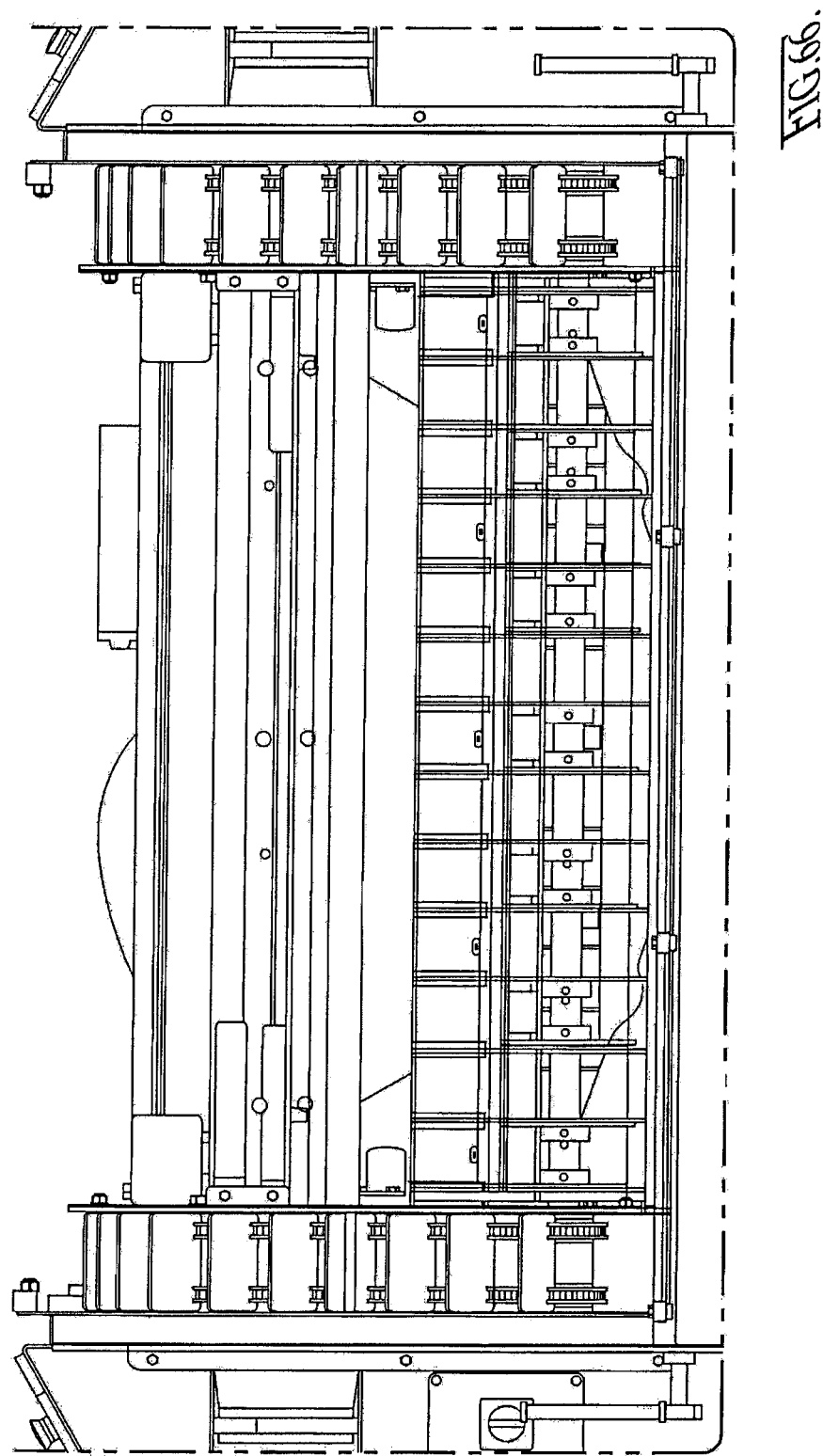
FIG. 66 is an end elevational view comparable to FIG. 65 except showing the pair of elevators configured with the dual chain configuration of FIGS. 63 and 64.

FIG. 66 is an end elevational view comparable to FIG. 65 except showing the pair of elevators configured with the dual chain configuration of FIGS. 63 and 64.

Figure 67:
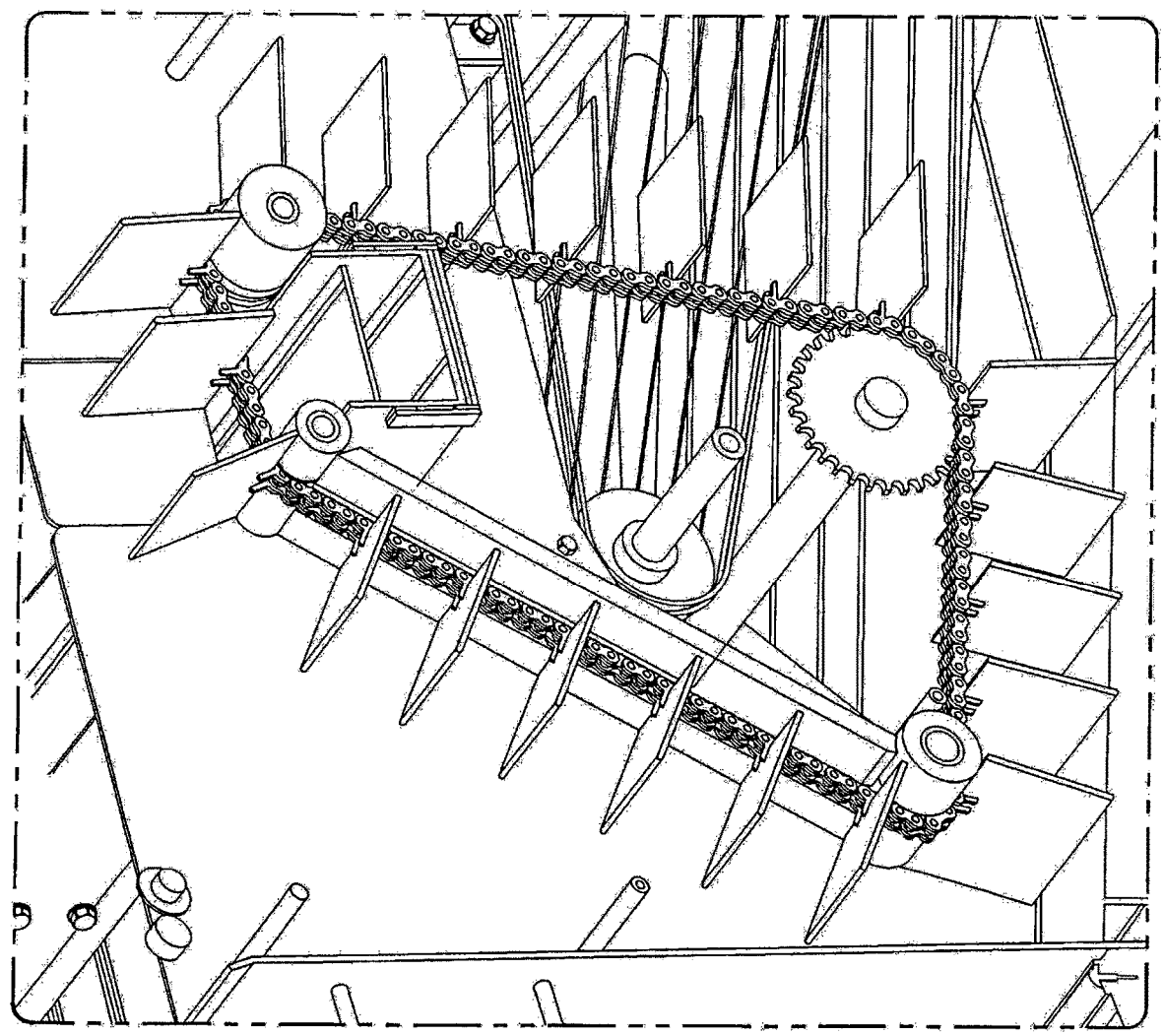
FIG. 67 is a perspective view comparable to FIG. 64 except showing the single-chain configuration of an elevator as shown in FIG. 65.

FIG. 67 is a perspective view comparable to FIG. 64 except showing the single-chain configuration of an elevator as shown in FIG. 65.

Figure 68:
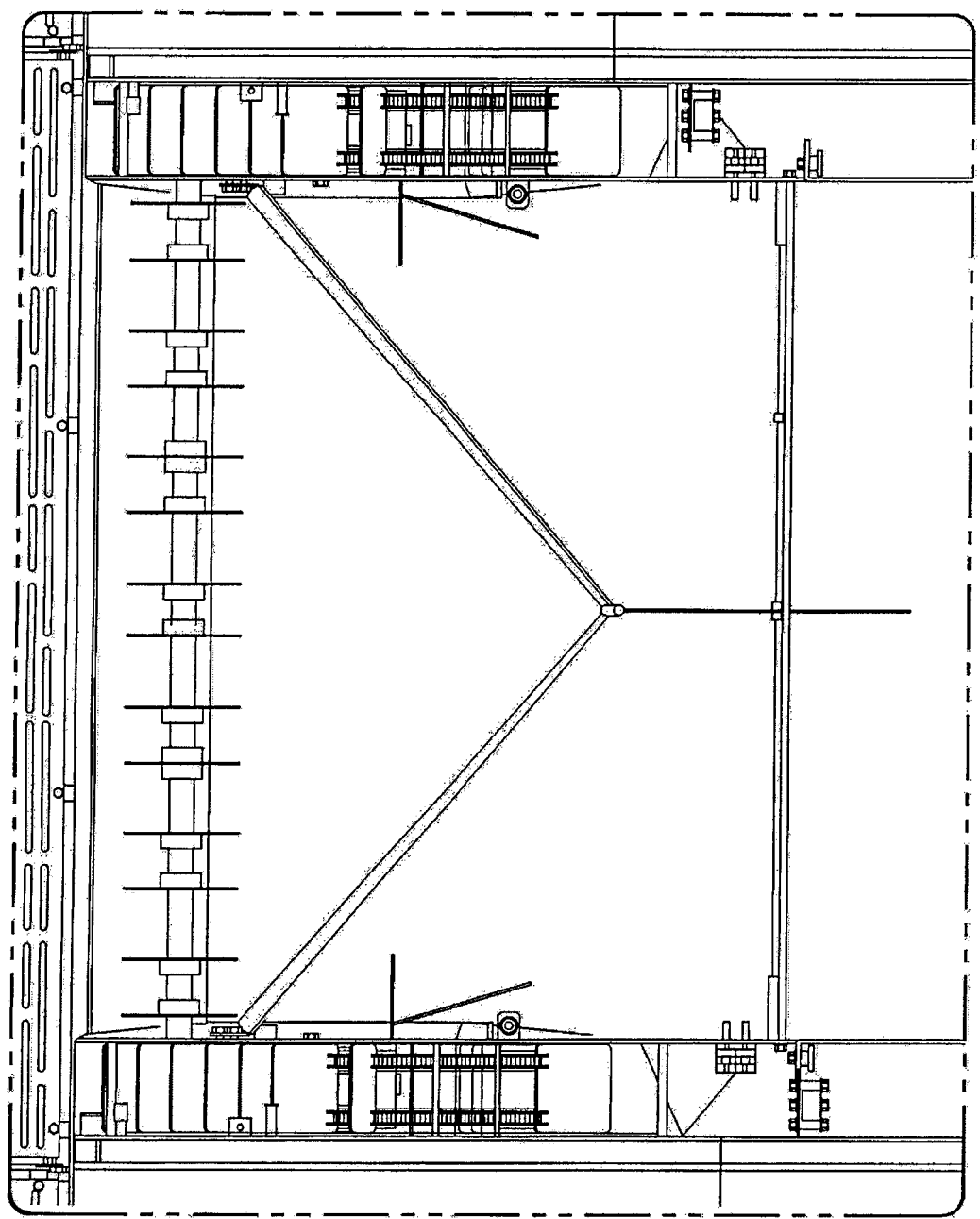
FIG. 68 is a top plan view of a plow for urging coating material underway in the reverse direction of the food product travel from infeed end to discharge end, and which would be underneath the main conveyor and being motivated by the lower return run of the main conveyor—wherein, the plow splits the stream of coating material (which originally is as wide as the main conveyor), or to start over, the plow splits the stream of coating material into two, and urges the coating material into the motivating (and pick-up) runs of the flanking elevators—not that the flanking elevators shown here are of the dual-chain configuration.

FIG. 68 is a top plan view of a plow for urging coating material underway in the reverse direction of the food product travel from infeed end to discharge end, and which would be underneath the main conveyor and being motivated by the lower return run of the main conveyor. Wherein, the plow splits the stream of coating material (which originally is as wide as the main conveyor), or to start over, the plow splits the stream of coating material into two, and urges the coating material into the motivating (and pick-up) runs of the flanking elevators. Not that the flanking elevators shown here are of the dual-chain configuration.

Figure 69:
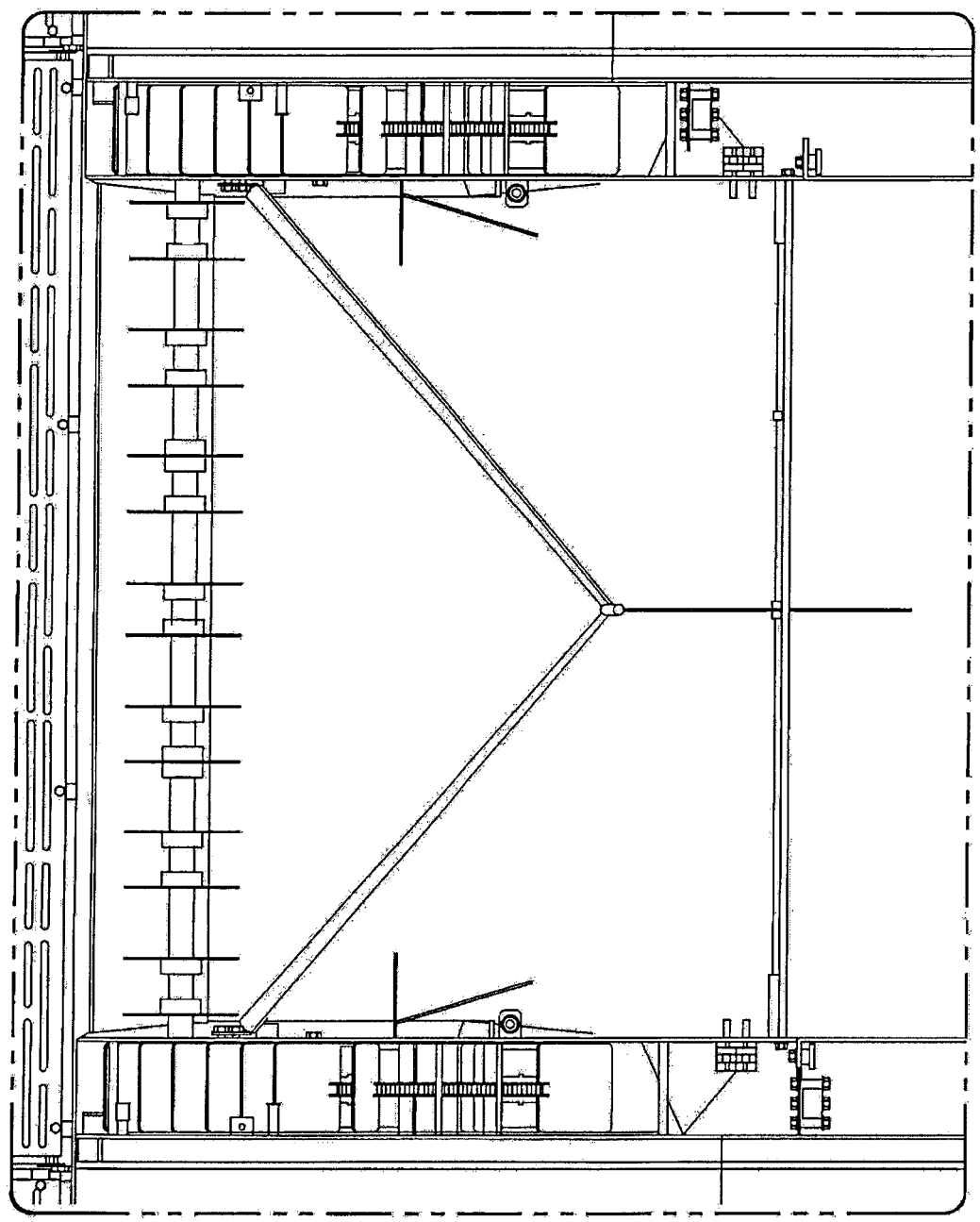
FIG. 69 is a top plan view comparable to FIG. 68 except showing elevators of the single-chain configuration.

FIG. 69 is a top plan view comparable to FIG. 68 except showing elevators of the single-chain configuration.

The invention generally relates to automatic and/or mechanized food-process line equipment and, more particularly, to robotic cleaning apparatus for such automatic and/or mechanized food process lines.

It is a preferred aspect of the invention if any such robotic cleaning apparatus is self-propelled.

It is a further preferred aspect of the invention if such robotic cleaning apparatus is designed and produced in specific versions customized perhaps for excelling at specific tasks that other versions are not as proficient at, but each having its own specialized proficiency in any case. Such specific versions of robotic cleaning apparatus can coordinate operations and effectively work as coordinated cleaning crew, albeit a robotic cleaning crew.

A number of additional features and objects will be apparent in connection with the following discussion of the preferred embodiments and examples with reference to the drawings.

Figure 70:
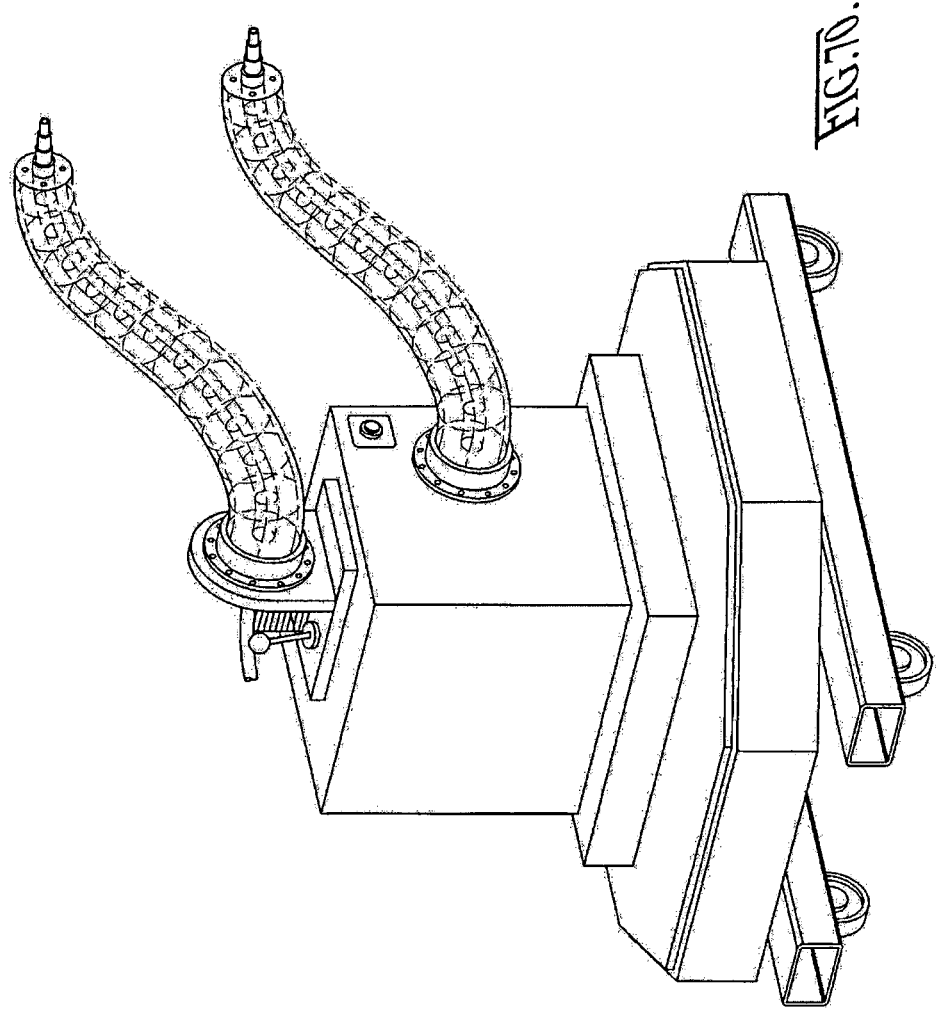
FIG. 70 is a perspective view of a first embodiment of robotic cleaning apparatus in accordance with the invention.

FIG. 70 shows a first embodiment of robotic cleaning apparatus in accordance with the invention. It has a body or chassis mounted on a wheeled base. The body and base provide storage for water tanks, cleaning compounds, batteries, electric-powered motors, electric-powered pumps, an electric-powered control system, electric-powered video cameras and electric-powered wireless communication links (eg., radio communications).

Preferably the robotic cleaning apparatus hereof, once its batteries are charged, is self-propelled and can drive and steer itself across the factory floor to selected positions. It has a camera eye in one sidewall and a pair of high-pressure nozzles mounted at the ends of robotic arms cantilevered from the sidewall and/or top wall of the body. The robotic arms can reach into food-process line production equipment, or underneath components thereof, and provide highly-directed blast spraying against select targets.

FIG. 71 shows a second embodiment of robotic cleaning apparatus in accordance with the invention. It too has a pair of nozzles mounted at the ends of robotic arms but it also features a pair of brushes. One brush extends out of a sidewall is configured on a cylindrical geometry and is mounted on the end of a robotic arm and driven to spin like a drill bit. The other brush extends out of the top wall is configured on a disk geometry and is mounted on the end of its robotic arm and is driven to spin like a cutting wheel.

FIG. 72 shows a third embodiment of robotic cleaning apparatus in accordance with the invention is fairly similar to the second embodiment, it just omitting the top brush.

Figure 73:
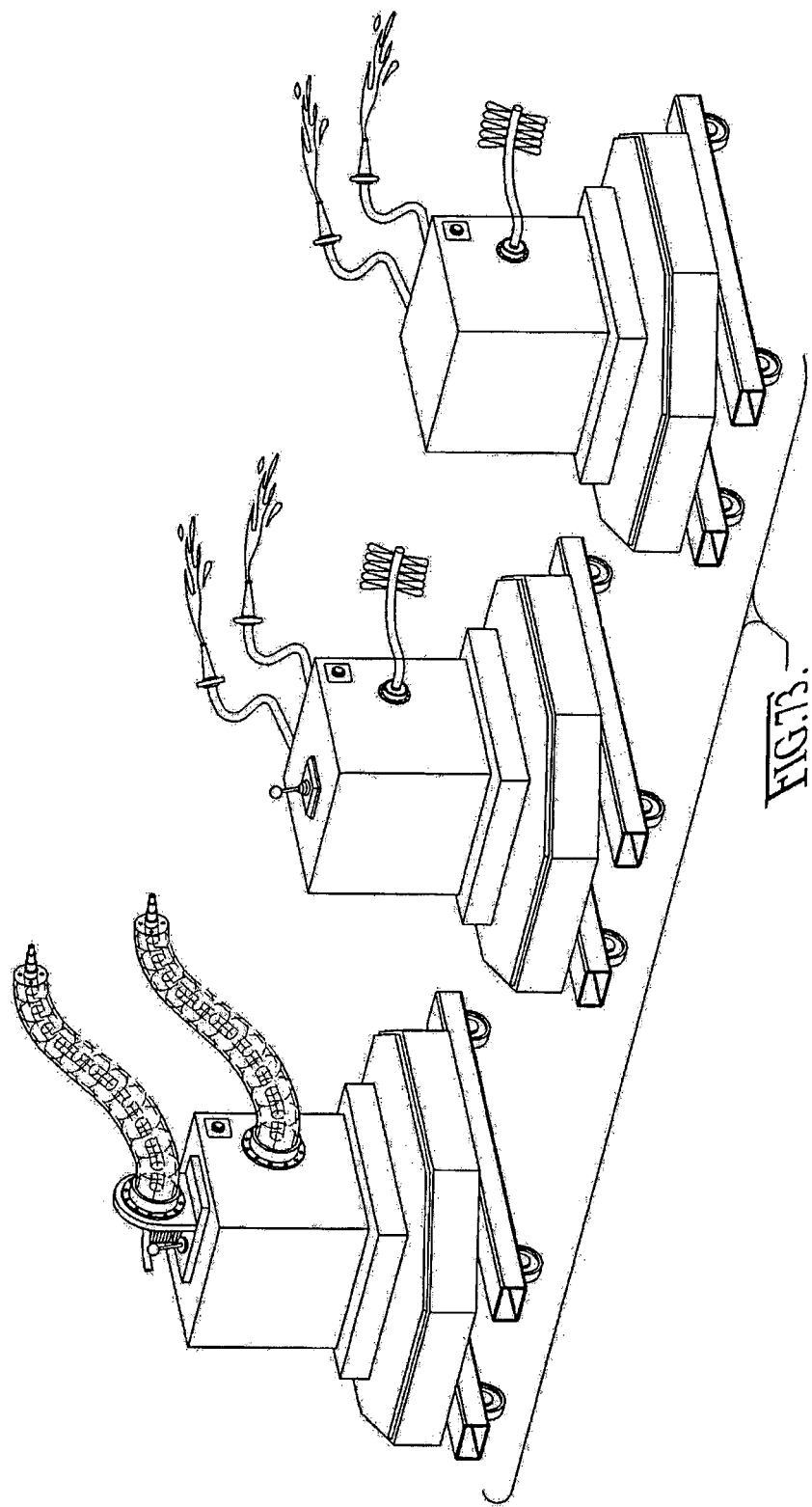
FIG. 73 is a perspective view of the first, second and third embodiments of robotic cleaning apparatus in accordance with the invention operating in a coordinated operation and thereby effectively working as coordinated cleaning crew, albeit a robotic cleaning crew.

FIG. 73 shows the first, second and third embodiments of robotic cleaning apparatus in accordance with the invention operating in a coordinated operation and thereby effectively working as coordinated cleaning crew, albeit a robotic cleaning crew.

Figure 74:
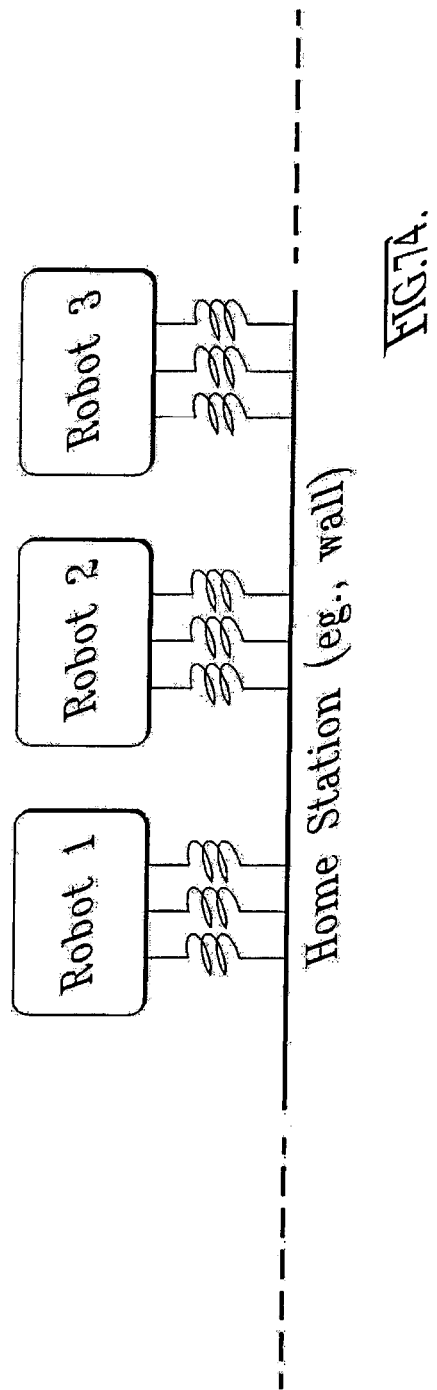
FIG. 74 is a top plan block diagram view of a first, second and third robotic cleaning machine in accordance with the invention and perhaps comparable to without limitation to like what is shown in FIG. 73, wherein Robot 1, 2 and 3 hereof are shown parked (or docked) in a home station as between cleaning operations (ie., during non-cleaning down-time periods), and are hooked up to (or plugged into) various communication ports, electric power utility, water and/or cleaning agent supply lines and the like for re-charging/re-filling the robots for one or more subsequent cleaning operations.

FIG. 74 is a top plan block diagram view of a first, second and third robotic cleaning machine in accordance with the invention and perhaps comparable to without limitation to like that apparatus that is shown in FIG. 73, wherein Robots 1, 2 and 3 hereof are shown parked (or docked) in a home station.

The time when Robots hereof would be parked (or docked) in each one's home station would be between cleaning operations (ie., during non-cleaning down-time periods), Needless to say, the non-cleaning down-time periods most generally correspond to the food product process line production time producing a throughput of food product according a series of food product process operation. Robots 1, 2 and 3 are hooked up to (or plugged into) various communication ports, electric power utility, water and/or cleaning agent supply lines and the like for re-charging/re-filling the robots for one or more subsequent cleaning operations (in the future, and most likely in the 'near' future).

Figure 75:
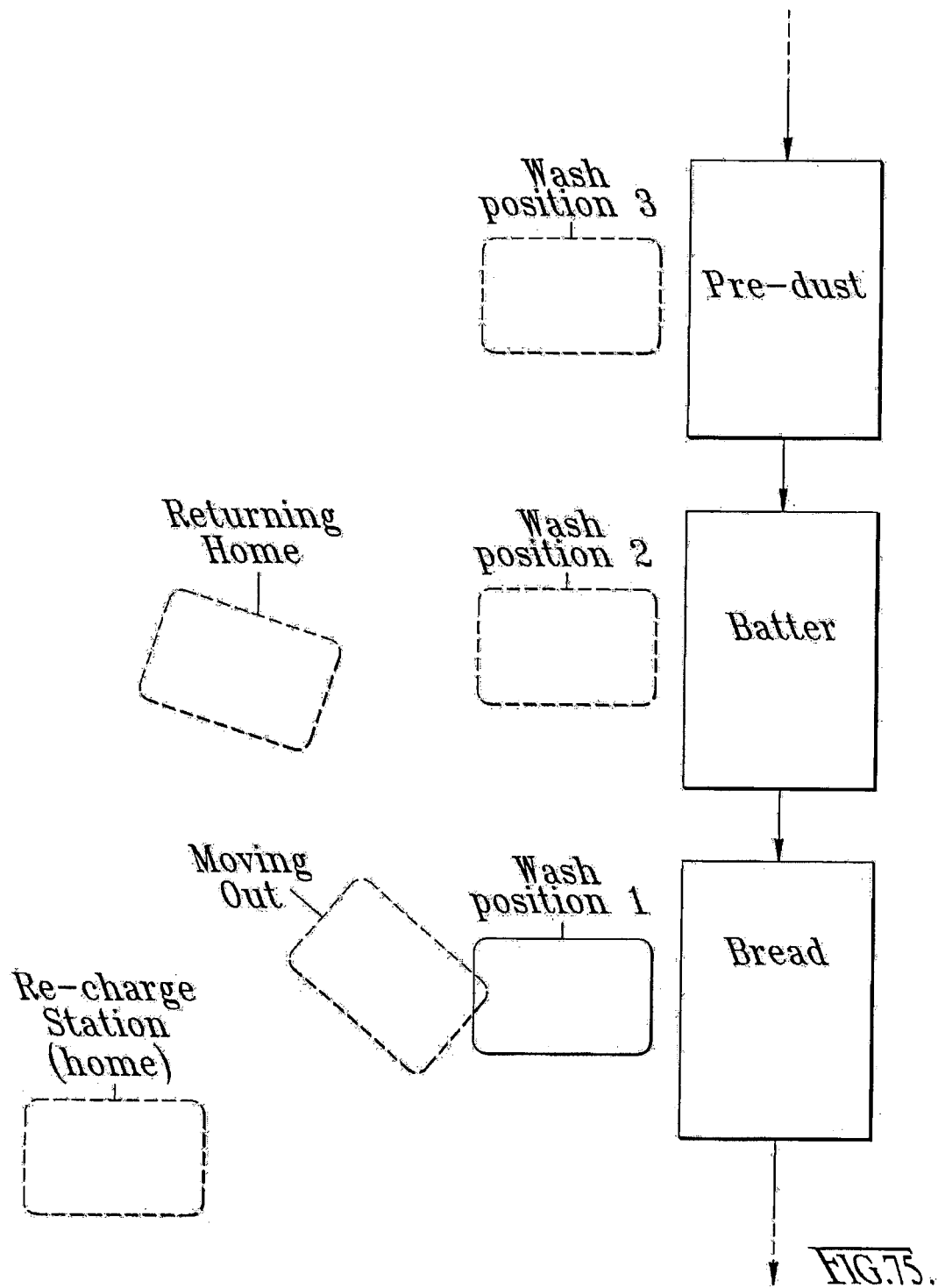
FIG. 75 is a top plan block diagram view of a representative, conventional automatic and/or mechanized food-process line, in which food product (only as represented by arrows) is conveyed serially through a pre-dust machine, a batter machine, and then a breading-material coating machine (after which the food product is presumably conveyed onward to a fryer or oven or the like), wherein during non-production time periods, a single mechanized robotic cleaning machine moves out of its recharge station, serially cleans each of the breading machine, then the batter machine and finally the pre-dust machine before returning to its home station (its re-charge station)

FIG. 75 is a top plan block diagram view of a representative, conventional automatic and/or mechanized food-process line, in which food product (only as represented by arrows) is conveyed serially through a pre-dust machine, a batter machine, and then a breading-material coating machine (after which the food product is presumably conveyed onward to a fryer or oven or the like). During non-production time periods, a single mechanized robotic cleaning machine moves out of its recharge station (home station), serially cleans each of the breading machine, then the batter machine and finally the pre-dust machine before returning to its home station (its re-charge station). Although not shown, preferably these machines open themselves up partly to allow the robotic arm(s) of the mechanized robotic cleaning machine to reach therein. That is, as the pre-dust and batter as well as breading machine are likely to have hoods and conveyor belts, preferably the machines elevate their hoods and then partly elevate their conveyor belts to allow better access for the robotic arms to reach therein.

It is an aspect of the invention to distribute a distributed array of markers on and in the pre-dust and batter as well as breading machine, such as for example and without limitation RFID markers. Each mechanized robotic cleaning machine would be provided with RFID reading circuitry to find the markers. The mechanized robotic cleaning machine would have received control instructions from the home port during re-charging, or else live-time control instructions over the wireless communications links, to hunt and find the markers in some order, and perform such and such operations on the encounter with each marker. Whereas RIFD technology is disclosed above as an example and without limitation, other ranging and/or distancing technologies can as readily effectively be utilized instead.

Figure 76:
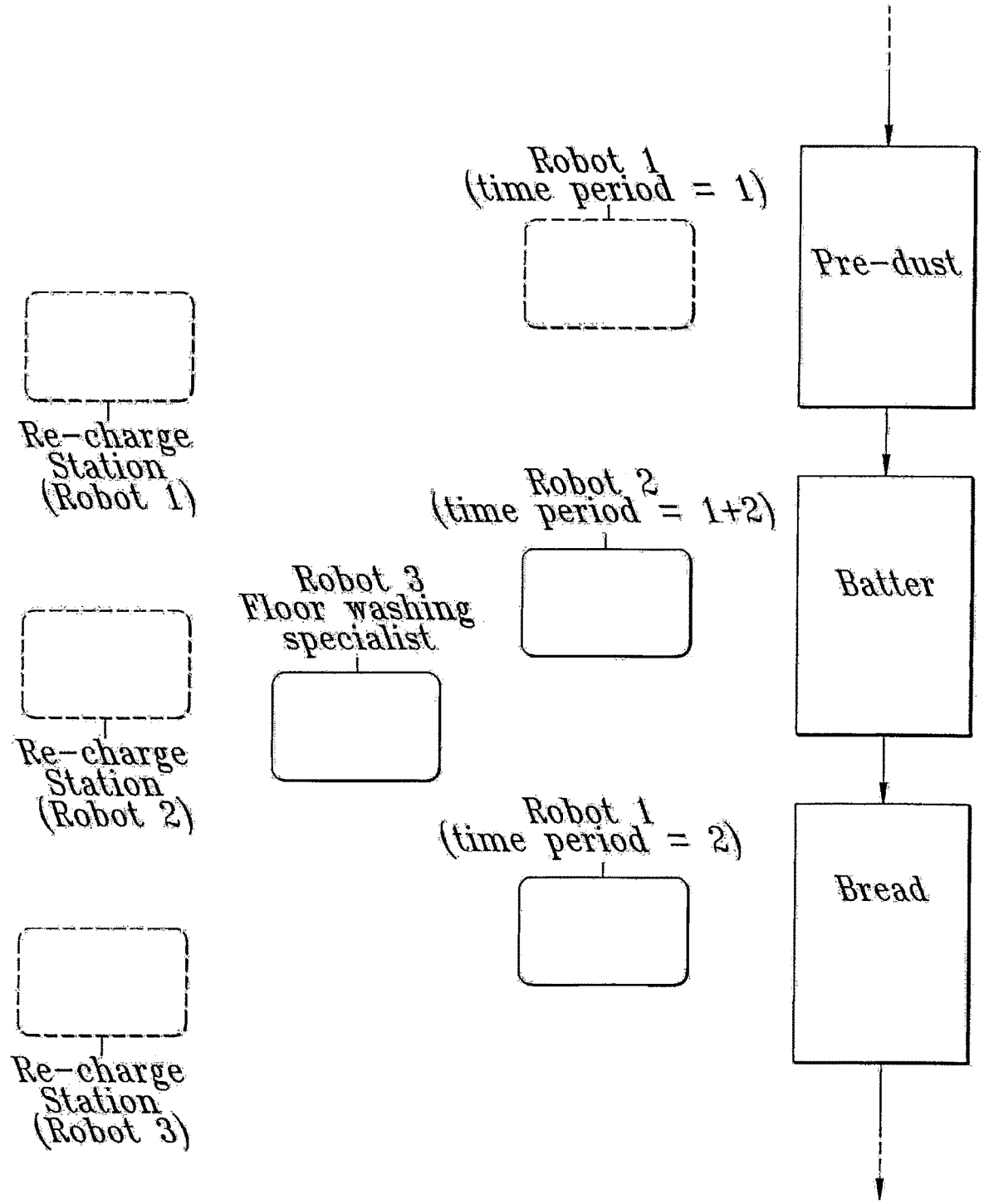
FIG. 76 is a top plan block diagram view of a representative, conventional automatic and/or mechanized food-process line and comparable to FIG. 75 except showing the coordination of three robots, each configured for a different specialty and three complementing the operations of the other.

FIG. 76 is a top plan block diagram view of a representative, conventional automatic and/or mechanized food-process line and comparable to FIG. 75 except showing the coordination of three robots, each configured for a different specialty and three complementing the operations of the other. Robot 2 is a specialist at cleaning wet coating product machines, like the batter machine. Robot 1 is a specialist at cleaning dry coating product machines, like the pre-dust and breading machine. Robot 1 can clean either the pre-dust machine or the breading machine in roughly half the time it takes Robot 2 to merely clean the batter machine. Hence the coordinated effort has Robot 1 starting on the pre-dust machine for time period=1, whereas Robot 2 moves to the batter machine for the beginning of time period=1. But at the end of time period=1, Robot 1 is through with the pre-dust machine. Hence for time period=2, Robot 1 moves over to the breading machine, but Robot 2 remains at the batter machine. Robot 3 is a floor cleaning specialist and moves in after Robot 1 has left the pre-dust machine. Robot 3 cleans up around the pre-dust machine. At the end of time period=2, Robots 1 and 2 return to their re-charge (home) stations while Robot 3 cleans up behind them before likewise returning to its re-charge (home) station.

FIG. 77 is a side elevation block diagram view of an alternate embodiment of robotic cleaning apparatus in accordance with the invention, one which has a festooned bundle of permanent connections of any of communication lines, electric power lines, supply conduits and the like. That is, perhaps the amount of electric power and the amount of washing fluid that will be required to perform an effective cleaning operation is too great to be stored onboard a battery-operated cart. Accordingly, the robotic cleaning apparatus of this embodiment can drag along with its movement a festooned bundle of permanent connections of any of communication lines, electric power lines, supply conduits and the like drawing directly from public utility power, public utility water, and/or any food processing plant feeds of fluid or particulate agents, presumably cleaning agents, in accordance with the draw of robotic cleaning apparatus operating on pre-stored or remotely-fed instructions.

Various aspects of the invention might be summarized in the following non-exclusive list of bullet points.

When a robotic cleaning apparatus is docked at its home station (or perhaps all the home stations are more or less generic), the robotic cleaning apparatus can be characterized as doing any of the following:
  plug-into communications network;
  upload data, download data (including instructions);
  re-charge batteries;
  re-fill water tanks;
  re-fill cleaning agents;
  receive thermal input to pre-heat hot fluids; and
  receive cleaning operations.

Note that, the robot itself has to be cleaned as well, and this takes place after the food process line equipment has been cleaned by it.

When a robotic cleaning apparatus is on the move (presumably executing cleaning operation instructions), the robotic cleaning apparatus can be characterized as doing any of the following:
  establish wireless communications link;
  provide
    reports on operations,
    status of carrying out instructions,
    status of components,
    status of battery and fluid levels;
    video feed (in both visible and other-than-visible light spectrums),
    audio feed,
  range and distance detection of targets blazed on the machine(s);
  receive
    program-interrupting instructions such as
      where to aim cameras,
      where to aim brushes, abraders,
      where to aim jets
      adjust to certain jet/pray patterns and/or oscillations,
      when to heat cleaning fluids to higher temperatures,
      when batteries are low, when to plug into factory power (and/or festoon), as well as
    talk and coordinate with floor-washing robots to follow behind.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

What is claimed is:

1. A method of determining in a mechanized food-process line a weight pick-up or loss value of a flowrate of food product pieces through a selected food-process line coating machine; said method comprising the steps of:

providing a mechanized food-process line comprising a plurality of food-process line machines arranged in a series from an upline end to a downline end, and providing the plurality of food process lines with a conveyance that moves the flowrate of the food product pieces therealong, wherein:

either (1A) the selected food-process line coating machine provides coating application operations for application of dry coating material to the flowrate of food product pieces, or (1B) the selected food-process line coating machine provides coating application operations for application of wet coating material to the flowrate of food product pieces, and wherein:

(2) the mechanized food-process line comprises at least one other food-process line machine optionally providing coating operations, or if not then an other food-process line process to the flowrate of food process pieces;

the selected food-process line coating machine providing or being provided with:

a primary coating operation within the selected food-process line coating machine that provides coating application of the respective coating material, wet or dry, to the flowrate of food product pieces;

a weighing intake conveyor for the selected food-process line coating machine, the weighing intake conveyor having an upper food-product carrying run and a lower return run, and extending between an intake end for intake of the flowrate of food product pieces from upline processes in said mechanized food-process line and a discharge end for transfer of the flowrate of the food product pieces to the primary coating operation; and a weighing outflow conveyor for the selected food-process line coating machine, the weighing outflow conveyor having an upper food-product carrying run and a lower return run, and extending between a receiving end for receipt of the flowrate of the food product pieces from the primary coating operation within said selected food-process line coating machine and a discharge end for discharge of the flowrate of the food product pieces to a downline process in said mechanized food-process line;

receiving an inflow of the food product pieces in one state of processing and receiving the inflow of the food product pieces in the one state of processing on the upper, food-product carrying run of the weighing intake conveyor;

transferring the inflow of the food product pieces into the primary coating operation;

conveying an outflow of the food product pieces from the primary coating operation on the upper, food-product carrying run of the weighing outflow conveyor;

providing a monitoring machine;

the weighing intake conveyor providing the monitoring machine with a weight-flow flowrate value of the inflow of food product pieces in the one state of processing;

the weighing outflow conveyor providing the monitoring machine with a weight-flow flowrate value of the outflow of food product pieces;

the monitoring machine differencing the value provided by the weighing outflow conveyor and the value provided by the weighing intake conveyor and whereby, with the value provided by the weighing intake conveyor, determining the weight pick-up or loss percent of the respective coating material to the flowrate of food product pieces through the selected food-process line coating machine.

2. The method of claim 1, wherein:

the food product pieces comprise any of:
  chicken tenders,
  other pieces of chicken, or
  pieces of other meats;

the dry coating material comprises any of:
  breading,
  corn flour, or
  spices; and the wet coating material comprises any of:
  batter mixed from dry batter mix.

3. The method of claim 2, wherein:

the one state of the food product pieces conveying on the upper, food-product carrying run of the weighing intake comprises any of:
  raw;
  previously coated in a dry coating material;
  previously coated in a wet coating material; or
  previously coated in any combination of at least one dry coating material and at least one wet coating material.

4. The method of claim 1, wherein:

the monitoring machine further comprises a feedback control system; and said method further comprises the steps of:

providing the feedback control system with a specified weight pick-up or loss percent for the flowrate of food product pieces out of the selected food-process line coating machine;

the feedback control system determining a pick-up or loss percent error between the specified weight pick-up or loss percent for the flowrate of food product pieces through the selected food-process line coating machine and the monitoring machine determined weight pick-up or loss percent therefor;

said feedback control system undertaking adjustment measures to bring the monitoring machine determined weight pick-up or loss percent therefor in closer agreement with the specified weight pick-up or loss percent therefor;

such adjustment measures comprising any of:

(1) adjusting a dwell time of the food product pieces within the selected food-process line coating machine; and/or (2A) if the selected food-process line coating machine applies a wet coating material, then thickening or thinning the wet coating material accordingly; else (2B) if the selected food-process line coating machine applies a dry coating material, then adjusting up or a level of intensity of tumbling or mixing provisions with the primary coating operation of dry coating material.

5. The method of claim 4, the step of the feedback control system undertaking adjustment measures further includes adjustment measures comprising any of:

(2A—further option 1) if the selected food-process line coating machine applies a dry coating material, replenishing the depleted dry coating material with a finer or coarser dry coating material accordingly;

(2A—further option 2) if the selected food-process line coating machine applies a dry coating material and if the upper food-product carrying run of the outflow conveyor is provided with agitation provisions, adjusting up or down or switching off a level of intensity of the agitation provisions as the food product pieces flow thereacross;

(2A—further option 3) if the selected food-process line coating machine applies a dry coating material and if the upper food-product carrying run of the outflow conveyor is provided with air knives aimed at the flowing food product transiting over the upper, food-product carrying run thereof, then adjusting up or down or switching off a flowrate of air out the air knives;

(2A—further option 4) if the selected food-process line coating machine applies a dry coating material and if the upper food-product carrying run of the outflow conveyor is provided with a compression roller rolling over the flowing food product pieces transiting over upper, food-product carrying run thereof, then adjusting an increase or decrease or else lifting off a level of pressure of the compression roller over the flowing food product pieces passing thereunder; or (2A—further option 5) if the selected food-process line coating machine applies a dry coating material and if the upper food-product carrying run of the outflow conveyor is provided with moisture misters aimed at the flowing food product transiting over upper, food-product carrying run thereof, then adjusting up or down or else switching off a flowrate of the moisture out of moisture misters.

6. The method of claim 1, wherein:

if the selected food-process line coating machine applies a wet coating material, the primary coating operation includes motivating through the flowrate of food product pieces through a pool of wet coating material;

if the selected food-process line coating machine applies a dry coating material, the primary coating operation includes mixing dry coating material with the flowrate of food product pieces, and with or without tumbling and/or flipping.

7. The method of claim 1, further comprising the steps of:

providing the selected food-process line coating machine with a carriage having pivot hardware pivotally supporting the selected food-process line coating machine off a ground comprising any of a floor, rails or other; and selectively pivoting the selected food-process line coating machine in place to thereby give better access to the selected food-process line coating machine apart from at least one of (A) immediately upline and/or (B) downline food-process line machines for washing and/or (C) maintenance operations.

8. The method of claim 1, further comprising the steps of:

providing the selected food-process line coating machine with a drum motor mounted to have a relatively stationary drive axis relative to the selected food-process line coating machine;

the outflow conveyor comprising an endless belt arranged to longitudinally course around an upline nose end where the outflow conveyor is driven by the drum motor, and, a downline nose end; and providing the selected food-process line coating machine with weight sensors comprising at least a laterally-spaced pair of load cells supporting the outflow conveyor cantilevered from the drum motor.

9. The method of claim 8, the step of providing the selected food-process line coating machine with weight sensors further comprises:

providing the weight sensors as a laterally-spaced near pair of load cells relative the drum motor, and a laterally-spaced distant pair of load cells relative the drum motor, all which load cells cooperatively support the outflow conveyor cantilevered from the drum motor.

10. The method of claim 9, further comprising the steps of:

the monitoring machine being programmed to provide information corresponding to a wide variety of reported values of the four load cells, even when all four load cells are reporting different values, such as the case when there is uneven distribution of food product pieces transiting across the outflow conveyor.

11. The method of claim 4, further comprising the steps of:

providing a downline transfer conveyor downline from the selected food-process line coating machine and not only receiving the flowrate of coated food product pieces from the selected food-process line coating machine but also control instructions from the feedback control system of the selected food-process line coating machine;

wherein the downline transfer conveyor has an upper food-product carrying run and a lower return run; and wherein the step of the feedback control system undertaking adjustment measures further includes adjustment measures comprising any of:

if the selected food-process line coating machine applies a dry coating material and if the upper food-product carrying run of the downline transfer conveyor is provided with agitation provisions, adjusting up or down or switching off a level of intensity of the agitation provisions as the food product pieces flow thereacross;

if the selected food-process line coating machine applies a dry coating material and if the upper food-product carrying run of the downline transfer conveyor is provided with air knives aimed at the flowing food product transiting over the upper, food-product carrying run thereof, then adjusting up or down or switching off a flowrate of air out the air knives;

if the selected food-process line coating machine applies a dry coating material and if the upper food-product carrying run of the downline transfer conveyor is provided with a compression roller rolling over the flowing food product pieces transiting over upper, food-product carrying run thereof, then adjusting an increase or decrease or else lifting off a level of pressure of the compression roller over the flowing food product pieces passing thereunder; or if the selected food-process line coating machine applies a dry coating material and if the upper food-product carrying run of the downline transfer conveyor is provided with moisture misters aimed at the flowing food product transiting over upper, food-product carrying run thereof, then adjusting up or down or else switching off a flowrate of the moisture out of moisture misters;

whereby the downline transfer conveyor and the selected food-process line coating machine are separate machines which can be moved apart and re-assembled with other machines at a later date for form a mechanized food-process line of a different assemblage of machines.

* * * * *